US012122656B1

(12) United States Patent
Lee et al.

(10) Patent No.: US 12,122,656 B1
(45) **Date of Patent: *Oct. 22, 2024**

(54) FLUID MATERIAL DISPENSING APPARATUS CAPABLE OF CONDUCTING AUTOMATIC SELF-CLEANING OPERATION

(71) Applicant: Botrista, Inc., Kent County, DE (US)

(72) Inventors: Yu-Min Lee, New Taipei (TW); Wu-Chou Kuo, Taipei (TW)

(73) Assignee: BOTRISTA, INC., Kent County, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/735,746

(22) Filed: Jun. 6, 2024

Related U.S. Application Data

(60) Division of application No. 17/589,253, filed on Jan. 31, 2022, now Pat. No. 12,037,235, which is a continuation-in-part of application No. 17/467,960, filed on Sep. 7, 2021, now Pat. No. 11,814,280, which is a continuation-in-part of application No. 17/218,314, filed on Mar. 31, 2021, now Pat. No. 11,597,642.

(60) Provisional application No. 63/143,217, filed on Jan. 29, 2021, provisional application No. 63/110,621, filed on Nov. 6, 2020.

(51) Int. Cl.
*B67D 1/08* (2006.01)

(52) U.S. Cl.
CPC .................................. *B67D 1/0837* (2013.01)

(58) Field of Classification Search
CPC ....... B67D 1/07; B67D 1/1277; B67D 1/0837
See application file for complete search history.

(56) References Cited

U.S. PATENT DOCUMENTS 6,669,051 B1 * 12/2003 Phallen ..................... B67C 3/28 222/394
6,695,168 B2 * 2/2004 Pinedjian ............. B67D 1/0086 222/54
10,689,239 B1 * 6/2020 Siegel .................. B67D 1/0842
2010/0176147 A1 * 7/2010 Segers ................. B67D 1/0837 222/1

(Continued)

FOREIGN PATENT DOCUMENTS

CN 102781293 B 8/2015
WO WO 2011/107574 A2 9/2011

OTHER PUBLICATIONS

Taiwanese Notice of Allowance dated Dec. 10, 2021 for Application No. 110133099 with an English translation.

(Continued)

*Primary Examiner* — Jeremy Carroll
(74) *Attorney, Agent, or Firm* — Birch, Stewart, Kolasch & Birch, LLP

(57) ABSTRACT

A fluid material dispensing apparatus capable of conducting an automatic self-cleaning operation includes: guiding a cleaning solution to flow into a fluid diverter; activate a pump to push residual fluid material in a material transmission pipe forward, so that the residual fluid material is discharged through an outlet connector; and guiding the cleaning solution in the fluid diverter to flow into a fluid connector through the detergent transmission pipe, and then flows into the material transmission pipe through the fluid connector.

11 Claims, 40 Drawing Sheets

(56) References Cited

U.S. PATENT DOCUMENTS

| | | | | |
|---|---|---|---|---|
| 2011/0049185 | A1* | 3/2011 | Buchik | B67D 1/1438 141/69 |
| 2016/0297665 | A1* | 10/2016 | Petermann | B67D 1/1422 |
| 2020/0247657 | A1* | 8/2020 | Christiansen | B67D 1/07 |
| 2021/0316979 | A1* | 10/2021 | Hayes-Pankhurst | B67D 1/0044 |
| 2022/0204333 | A1* | 6/2022 | McCann | B67D 1/0837 |
| 2022/0371874 | A1* | 11/2022 | Hartmann | B67D 1/0855 |

OTHER PUBLICATIONS

Taiwanese Notice of Allowance for Taiwanese Application No. 111104216, dated Oct. 19, 2022, with English translation.

Taiwanese Office Action and Search Report, dated Jul. 14, 2021, for Taiwanese Application No. 110112000, with a partial English translation of the Taiwanese Office Action and a full English translation of the Taiwanese Search Report.

U.S. Office Action for U.S. Appl. No. 18/735,958, dated Aug. 8, 2024.

* cited by examiner

FLUID MATERIAL DISPENSING APPARATUS CAPABLE OF CONDUCTING AUTOMATIC SELF-CLEANING OPERATION

CROSS-REFERENCE TO RELATED APPLICATIONS

This application is a Divisional of co-pending U.S. patent application Ser. No. 17/589,253, filed on Jan. 31, 2022, which is a Continuation-In-Part of and claims the benefit of priority to U.S. patent application Ser. No. 17/467,960, filed on Sep. 7, 2021, which is a Continuation-In-Part of and claims the benefit of priority to U.S. patent application Ser. No. 17/218,314, filed on Mar. 31, 2021; which claims the benefit of U.S. Provisional Application Ser. No. 63/110,621 filed on Nov. 6, 2020, and also claims the benefit of U.S. Provisional Application Ser. No. 63/143,217 filed on Jan. 29, 2021, the entirety of which is incorporated herein by reference for all purposes.

BACKGROUND

The disclosure generally relates to a fluid material dispensing technology and, more particularly, to a fluid material dispensing apparatus having automatic self-cleaning capability and/or automatic self-disinfection capability.

For many consumers, freshly made beverages are more attractive than factory-produced canned or bottled beverages in many aspects, such as freshness, taste, and/or flexibility of customizing ingredient combination. Therefore, many restaurants and beverage vendors offer a variety of freshly made beverages to meet the needs of their customers. As a result of rising labor costs and other factors (e.g., increased operating costs due to the impact of the pandemic or inflation), many restaurants and beverage vendors have begun to use a variety of machinery and equipment to provide or assist in the preparation of freshly-made beverages in order to reduce the required labor time and costs.

It is well known that a traditional beverage preparing machine is equipped with many tubes for transmitting material liquids and those tubes are placed inside the beverage preparing machine. These tubes have to respectively be connected to different material containers through suitable connectors, so that the beverage preparing machine can acquire various materials for preparing beverages. The quantity of the connectors employed in each beverage preparing machine increases as the quantity of the material containers connected to the beverage preparing machine increases. Since the traditional beverage preparing machine does not have an automatic cleaning functionality, it usually consumes a lot of labor and time to clean various components, tubes, and connectors inside the beverage preparing machine, so as to prevent the components, tubes, and connectors inside the beverage preparing machine from growing bacteria or generating toxins.

One of the difficulties in realizing the automatic cleaning functionality of the beverage preparing machine is that the traditional connector can only simply transmit the liquid from a material container to a corresponding tube. Therefore, the cleaner has to manually remove multiple connectors from different material containers one by one when cleaning the beverage preparing machine, then the cleaner manually cleans or utilizes other assisting equipment to clean the related components, multiple tubes, and multiple connectors. When the cleaning procedure is completed, multiple connectors shall be manually connected between corresponding material containers and tubes by the cleaner one by one. The aforementioned approach of manually removing multiple connectors one by one and finally connecting the multiple connectors back one by one not only consumes a lot of labor time, but also easily makes the surrounding environment dirty during removing the connectors, and usually causes the connectors to be scratched or even damaged.

SUMMARY

An example embodiment of a fluid material dispensing apparatus capable of conducting automatic self-cleaning operation is disclosed. The fluid material dispensing apparatus comprises: an outlet connector; a fluid connector, detachably connected to a target material container of the multiple material containers, and comprising a material tube; a material transmission pipe, coupled between the material tube and the outlet connector; a detergent transmission pipe; a pump, coupled between the material transmission pipe and the outlet connector; and a fluid diverter, comprising a liquid input terminal and multiple liquid output terminals, wherein a target output terminal of the multiple liquid output terminals is coupled with the detergent transmission pipe. The proposed automatic self-cleaning operation comprises: guiding a cleaning solution to flow into the fluid diverter; activating the pump to push residual fluid material in the material transmission pipe forward, so that the residual fluid material is discharged through the outlet connector; and guiding the cleaning solution in the fluid diverter to flow into the fluid connector through the detergent transmission pipe, and then flows into the material transmission pipe through the material tube of the fluid connector.

Another example embodiment of a fluid material dispensing apparatus capable of conducting automatic self-disinfection operation is disclosed. The fluid material dispensing apparatus comprises: an outlet connector; a fluid connector, detachably connected to a target material container of the multiple material containers, and comprising a material tube; a material transmission pipe, coupled between the material tube and the outlet connector; a detergent transmission pipe; a pump, coupled between the material transmission pipe and the outlet connector; and a fluid diverter, comprising a liquid input terminal and multiple liquid output terminals, wherein a target output terminal of the multiple liquid output terminals is coupled with the detergent transmission pipe. The automatic self-disinfection operation comprises: guiding a disinfectant solution to flow into the fluid diverter; activating the pump to push residual cleaning solution in the material transmission pipe forward, so that the residual cleaning solution is discharged through the outlet connector; and guiding the disinfectant solution in the fluid diverter to flow into the fluid connector through the detergent transmission pipe, and then flows into the material transmission pipe through the material tube of the fluid connector.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
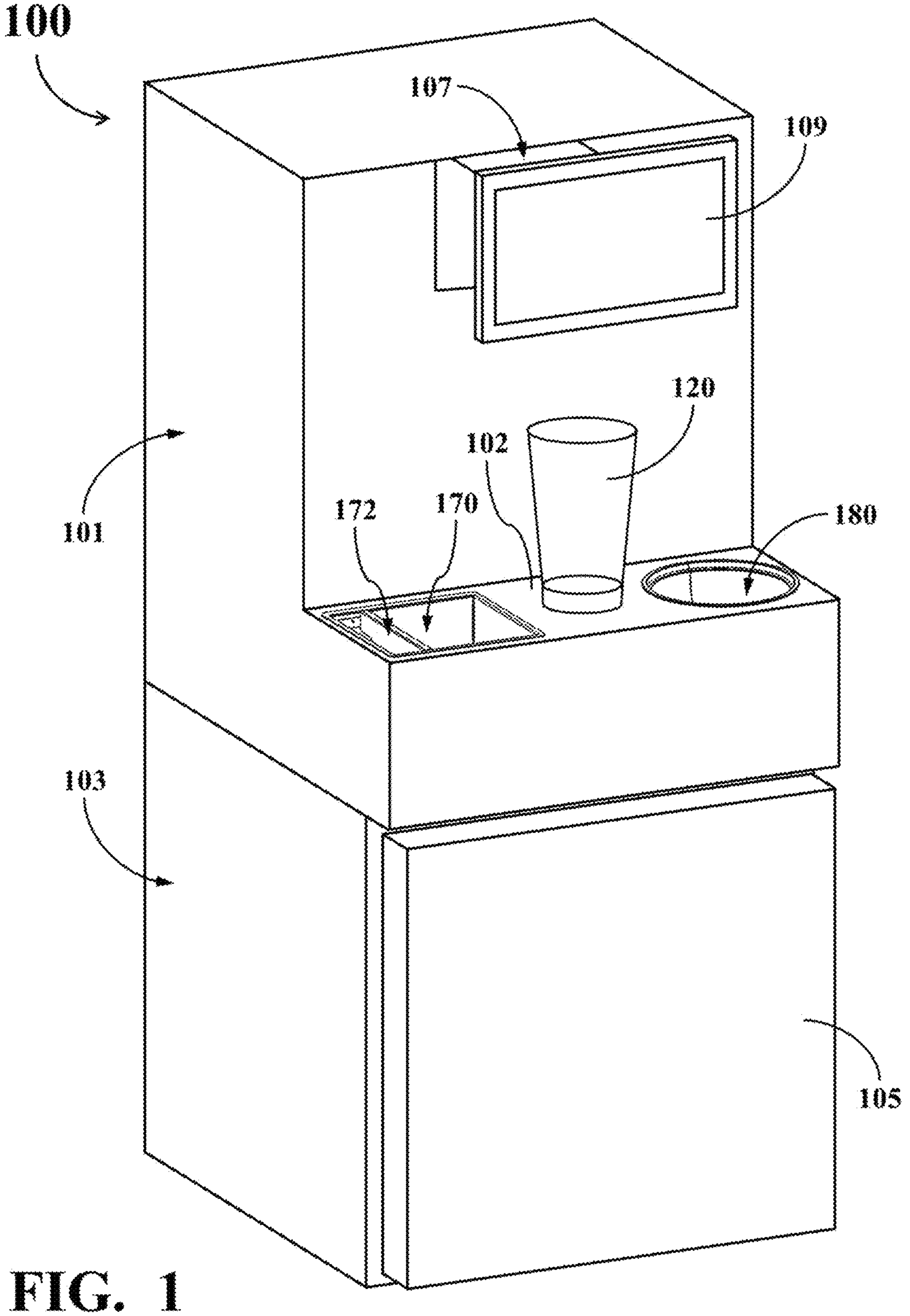
FIG. 1 shows a simplified schematic diagram of a fluid material dispensing apparatus according to one embodiment of the present disclosure.
Figure 2:
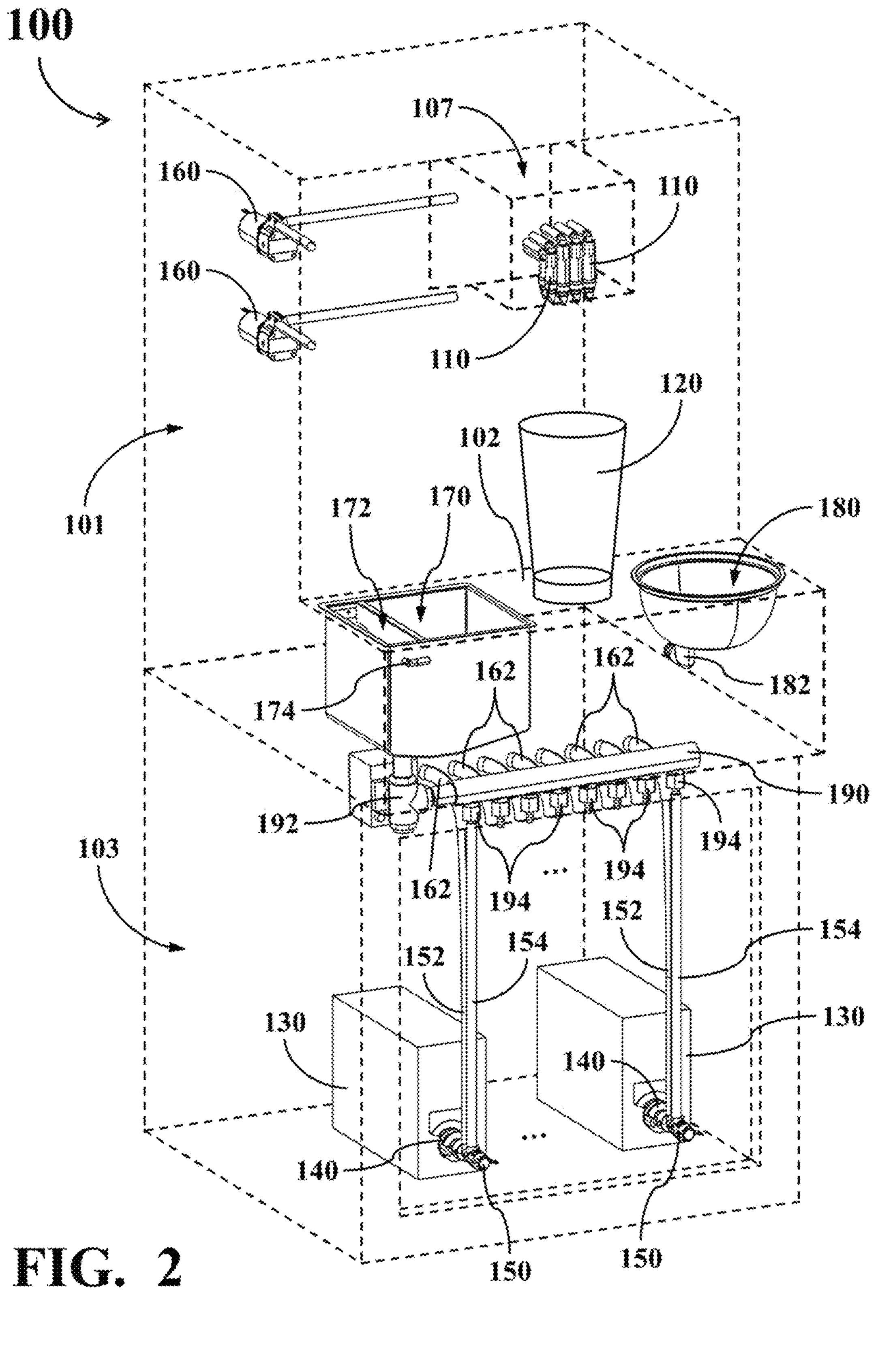
FIG. 2 shows a simplified schematic perspective diagram of the fluid material dispensing apparatus of FIG. 1.

Please refer to FIG. 1 and FIG. 2. FIG. 1 shows a simplified schematic diagram of a fluid material dispensing apparatus 100 according to one embodiment of the present disclosure. FIG. 2 shows a simplified schematic perspective diagram of the fluid material dispensing apparatus 100 of FIG. 1. The fluid material dispensing apparatus 100 may be utilized to output various fluid materials for use in beverage preparation or food seasoning.

As shown in FIG. 1 and FIG. 2, the fluid material dispensing apparatus 100 comprises an upper chamber 101, a working platform 102, a lower chamber 103, a door 105, a neck chamber 107, a control panel 109, and multiple outlet connectors 110.

In order to reduce the complexity of the drawing contents, the door 105 and the control panel 109 of the fluid material dispensing apparatus 100 are deliberately omitted, and an outline of the fluid material dispensing apparatus 100 is deliberately represented by broken lines in FIG. 2, while some internal objects to be further described in the following are depicted with solid lines. Please note that the appearance shape of the fluid material dispensing apparatus 100 shown in FIG. 1 and FIG. 2 is merely a simplified schematic diagram for the purpose of explanatory convenience, rather than a restriction to the actual appearance of the fluid material dispensing apparatus 100.

The upper chamber 101 of the fluid material dispensing apparatus 100 may be connected to the neck chamber 107, and may be connected to the lower chamber 103 through appropriate connection channels. Relevant wires, signal lines, connectors, material transmission pipes, and detergent transmission pipes may be arranged inside the fluid material dispensing apparatus 100 in a variety of appropriate ways.

As shown in FIG. 1 and FIG. 2, the fluid material dispensing apparatus 100 further comprises multiple pumps 160, a cleaning sink 170, a drainage sink 180, and one or more fluid diverters 190.

The aforementioned multiple pumps 160 may be respectively connected to other components through various suitable material transmission pipes (e.g., the exemplary material transmission pipe 152 shown in FIG. 2) and relevant connectors (e.g., the exemplary connector 162 shown in FIG. 2), and may be installed within the upper chamber 101 and/or the lower chamber 103 in a variety of appropriate spatial arrangements, without being restricted to the spatial arrangement shown in FIG. 2.

Each pump 160 is arranged to operably apply pressure to received fluid materials in order to push the fluid material forward. In practice, each pump 160 may be realized with various suitable liquid pump devices capable of pushing fluid forward, such as a peristaltic pump, a diaphragm pump, a rotary diaphragm pump, or the like.

In addition, multiple damper devices (not shown in the figures) and multiple flowmeters (not shown in the figures) may be arranged inside the fluid material dispensing apparatus 100. The damper devices and the flowmeters may be respectively connected to other components through various suitable material transmission pipes and connectors, and may be installed within the upper chamber 101, the lower chamber 103, and/or the neck chamber 107 in a variety of appropriate spatial arrangements.

The aforementioned multiple outlet connectors 110 may be respectively connected to other components through various suitable material transmission pipes and connectors, and may be installed in the neck chamber 107 in a variety of appropriate spatial arrangements, without being restricted to the spatial arrangement shown in FIG. 2.

The aforementioned multiple outlet connectors 110 may be detachably arranged on a connection plate (not shown in the figures) through various appropriate connections, and the connection plate may be detachably arranged beneath the neck chamber 107 through various appropriate connections. The output terminals of respective outlet connectors 110 and the connection plate may be exposed outside the neck chamber 107 to facilitate the user to carry out relevant cleaning procedures.

As shown in FIG. 2, multiple material containers 130 may be placed within the lower chamber 103 of the fluid material dispensing apparatus 100. Different material container 130 may be utilized to store different fluid material. Each material container 130 is equipped with an outlet check valve 140, which is utilized as an output connector. In other words, multiple dual-mode fluid connectors 150 are utilized in the fluid material dispensing apparatus 100.

For example, the aforementioned fluid material may be common beverage base material, such as water, sparkling water, black tea, green tea, soy milks, milk, milk-based liquids, coffee, nut pulps, various fruit-based concentrates, various vegetable-based concentrates, or the like.

For another example, the aforementioned fluid material may be various syrups, such as agave syrup, dulce de leche, fructose, golden syrup, lemonade syrups, maltose syrup, maple syrup, molasses, orgeat, and/or palm syrup, or the like.

For yet another example, the aforementioned fluid material may be various alcoholic beverages, such as beer, cocktails, and/or sake, or the like.

For yet another example, the aforementioned fluid material may be various sauces or fluid condiments, such as apple sauce, chutneys, cranberry sauce, salad dressings, fruit coulis, ketchup, tomato sauce, mayonnaise, meat gravies, miso sauce, hummus, pasta sauce, piccalilli, soya sauce, spices sauce, spicy sauce, and/or ginger jam, or the like.

For yet another example, the aforementioned fluid material may be various fluid materials, such as fruit juices containing fruit fibers, tea liquids with small particles (e.g., pearl or tapioca balls), honey, cooking oils, vinegar, jams, marmalade, pressed fruit paste, beer vinegar, buttercream, condensed milk, and/or cream, or the like.

As can be appreciated from the foregoing descriptions, the fluid material that the fluid material dispensing apparatus 100 can output may be fluid having higher viscosity than water, and may be fluid having lower viscosity than water.

In practice, all of or some of the material containers 130 may be placed within the upper chamber 101, without being restricted to the spatial arrangement shown in FIG. 2.

In the embodiment of FIG. 2, a disinfectant container 172 is installed in the cleaning sink 170, and the cleaning sink 170 is further coupled with a water injection connector 174. The disinfectant container 172 may be fixed in the cleaning sink 170, and may be detachably connected within the cleaning sink 170. The drainage sink 180 is connected to a drainage pipe 182. The fluid diverter 190 comprises a liquid input terminal and multiple liquid output terminals. A switch 192 is coupled between the liquid input terminal of the fluid diverter 190 and a liquid outlet of the cleaning sink 170.

In addition, in the embodiment of FIG. 2, the fluid material dispensing apparatus 100 further comprises multiple check valves 194, respectively coupled with the multiple liquid output terminals of the fluid diverter 190. Each check valve 194 is coupled between one of the liquid output terminals of the fluid diverter 190 and a corresponding detergent transmission pipe 154, and utilized to prevent fluid in the detergent transmission pipe 154 from flowing back into the fluid diverter 190.

The aforementioned multiple dual-mode fluid connectors 150 may be detachably connected to the outlet check valve 140 on different material container 130. In addition, each dual-mode fluid connector 150 may be connected to a corresponding pump 160 or damper device through various suitable manners (e.g., a combination of a material transmission pipe 152, a connector 162, and other related pipes), and may connected to a corresponding cleaning solution resource (e.g., the aforementioned cleaning sink 170) through various suitable manners (e.g., a combination of a detergent transmission pipe 154, a check valve 194, the fluid diverter 190, and the switch 192).

Various suitable material transmission devices (e.g., a combination of a material transmission pipe 152, a connector 162, and a relevant pump 160, a damper device, and/or a flowmeter) may be arranged in the fluid material dispensing apparatus 100 to transmit the fluid materials from respective material containers 130 to the output terminals of corresponding outlet connectors 110 through corresponding dual-mode fluid connectors 150. In addition, various suitable detergent transmission devices (e.g., a combination of the aforementioned cleaning sink 170, the fluid diverter 190, a detergent transmission pipe 154, a material transmission pipe 152, and a corresponding pump 160) may be arranged in the fluid material dispensing apparatus 100 to transmit cleaning solution and/or disinfectant solution to respective dual-mode fluid connectors 150.

In practice, appropriate refrigeration equipment may be installed within the fluid material dispensing apparatus 100 to extend the storage time of various fluid materials in the material container 130 within the lower chamber 103. In addition, when the door 105 is closed, the lower chamber 103 may be isolated from the external environment, which is conducive to maintaining the low temperature state in the lower chamber 103, and may avoid foreign objects such as insects or small animals from invading the lower chamber 103.

In order to reduce the complexity of the drawing contents, other structures and devices within the fluid material dispensing apparatus 100 are not shown in FIG. 2, such as the internal damper devices, flowmeters, control circuit, electrical wires, signal lines, refrigeration equipment, power supply apparatus, some material transmission pipes, some detergent transmission pipes, relevant components and frames for supporting or securing the above components, or the like.

In the embodiment where the fluid material dispensing apparatus 100 is utilized as an automated beverage preparation apparatus, a user may place a target container 120 on a predetermined position of the working platform 102 (e.g., a position beneath the aforementioned multiple outlet connectors 110) and manipulate the control panel 109 to configure one or more production parameters for the required freshly made beverages, such as beverage item, cup size, beverage volume, sugar level, ice level, and/or quantity of cups, or the like.

Then, the fluid material dispensing apparatus 100 would operate based on the parameters configured by the user to automatically utilizes one or more pumps 160 to extract the fluid materials from one or more material containers 130, and to transmit the extracted fluid materials toward corresponding outlet connectors 110 through respective transmission pipes. With the continuous operation of respective pump, the fluid material within the outlet connector 110 will be outputted to the target container 120 through corresponding outlet connector 110.

Freshly made beverage of a variety of flavors can be obtained by mixing different fluid materials together in the target container 120 according to a particular ratio, or by simple stirring after mixing the fluid materials. In practice, the target container 120 may be designed to support or have a blending functionality to increase the speed and uniformity of mixing the fluid materials. In the embodiment where the fluid material dispensing apparatus 100 is utilized as a sauce dispensing apparatus, the user may place the target container 120 or other containers on a predetermined position of the working platform 102 (e.g., a position beneath the aforementioned multiple outlet connectors 110) and manipulate the control panel 109 to configure species and output amount of the sauce to be dispensed.

Similarly, the fluid material dispensing apparatus 100 would operate based on the parameters configured by the user to automatically utilizes one or more pumps 160 to extract the fluid materials from one or more material containers 130, and to transmit the extracted fluid materials toward corresponding outlet connectors 110 through respective transmission pipes. With the continuous operation of respective pump, the fluid material dispensing apparatus 100 is enabled to output a specific amount of one or more sauces to the target container 120 or other containers through corresponding outlet connector 110.

Please note that the quantity of the outlet connector 110, the material container 130, the dual-mode fluid connector 150, the material transmission pipe 152, the detergent transmission pipe 154, the pump 160, and the fluid diverter 190 shown in FIG. 2 is merely an exemplary embodiment, rather than a restriction to the practical implementations.

Figure 3:
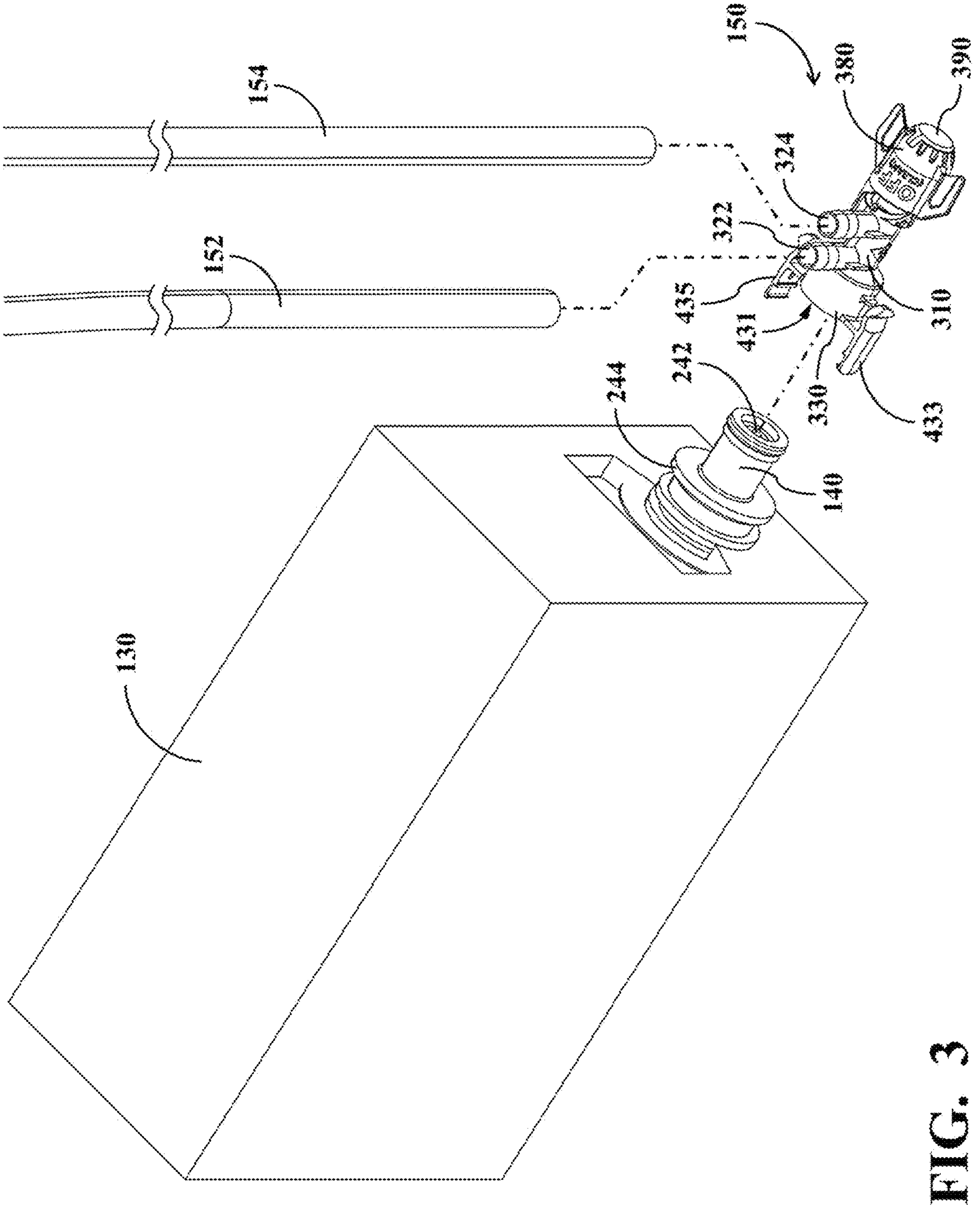
FIG. 3 shows a simplified schematic diagram of a dual-mode fluid connector and a material container when they are detached from each other according to one embodiment of the present disclosure.
Figure 4:
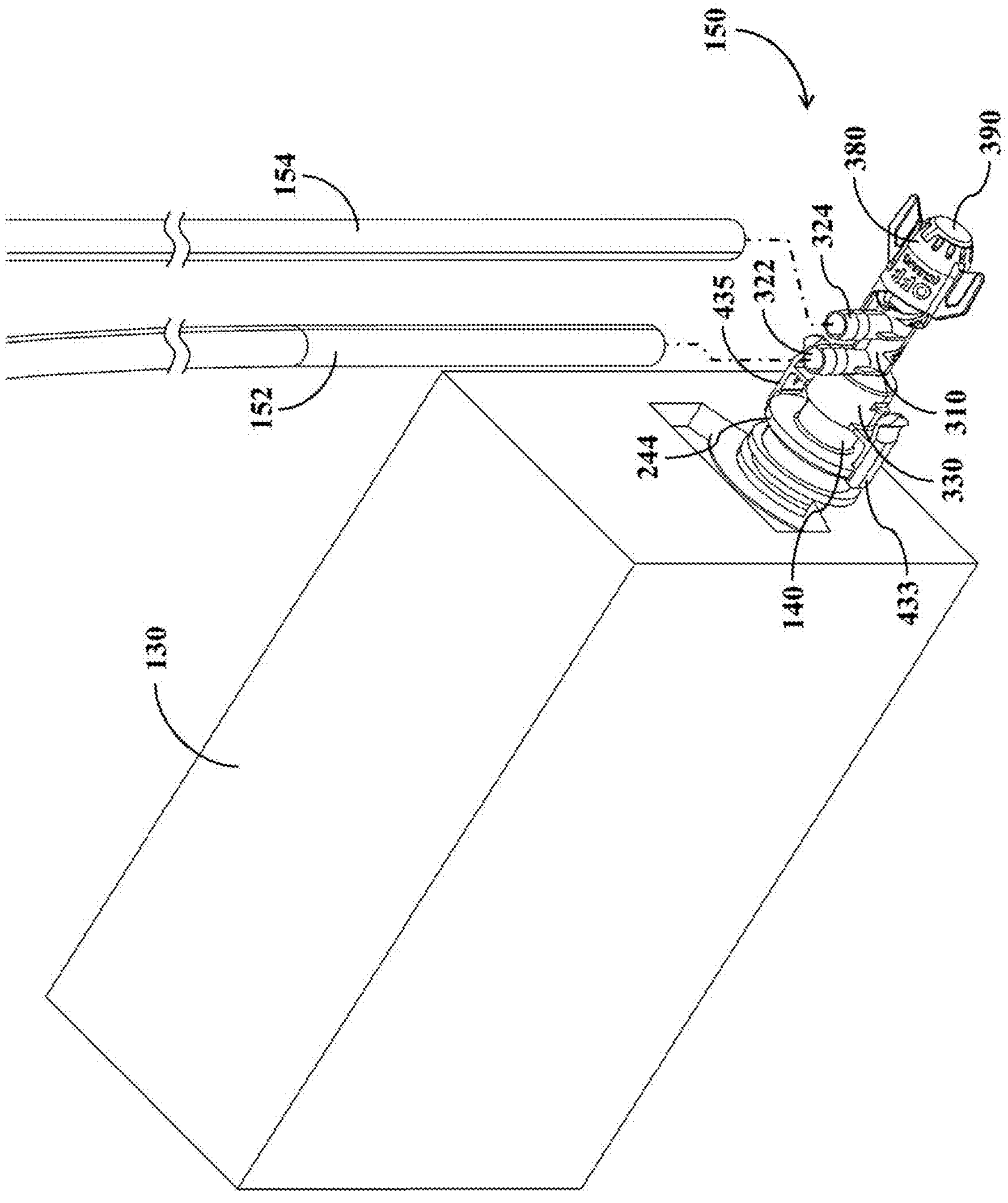
FIG. 4 shows a simplified schematic diagram of the dual-mode fluid connector and the material container of FIG. 3 when they are connected to each other.

Please refer to FIG. 3 and FIG. 4. FIG. 3 shows a simplified schematic diagram of the dual-mode fluid connector 150 and the material container 130 when they are detached from each other according to one embodiment of the present disclosure. FIG. 4 shows a simplified schematic diagram of the dual-mode fluid connector 150 and the material container 130 of FIG. 3 when they are connected to each other.

As shown in FIG. 3, the outlet check valve 140 on the material container 130 comprises a stopper 242 and a protruding portion 244 protruding outward from an outer surface of the outlet check valve 140. The dual-mode fluid connector 150 comprises a hollow connecting element 310, a material tube 322, a cleaning tube 324, a head portion 330, a rotatable element 380, and a plug 390.

The stopper 242 of the outlet check valve 140 may be realized with various suitable spheres, plugs, or lumps. The protruding portion 244 may be realized with a single ring element or may be realized with multiple separated protruding structures. A spring (not illustrated in FIG. 3 and FIG. 4) is usually arranged inside the outlet check valve 140 and may apply a force on the stopper 242 to push the stopper 242 outward.

Before the outlet check valve 140 is connected to the dual-mode fluid connector 150, the force applied on the stopper 242 by the aforementioned spring renders the stopper 242 to block the output terminal of the outlet check valve 140, so that the output terminal of the outlet check valve 140 remains in a close status to prevent the fluid material in the material container 130 from leaking.

In the dual-mode fluid connector 150, the material tube 322 and the cleaning tube 324 are both positioned on the hollow connecting element 310, while the head portion 330 is positioned on one terminal of the hollow connecting element 310 and comprises a connecting opening 431, a first clamp element 433, and a second clamp element 435.

As shown in FIG. 3 and FIG. 4, the first clamp element 433 and the second clamp element 435 are respectively connected to two opposite sides of the head portion 330. When the connecting opening 431 is detachably connected to the outlet check valve 140, the first clamp element 433 and the second clamp element 435 will engage with the protruding portion 244 of the outlet check valve 140 to thereby improve the connection stability between the dual-mode fluid connector 150 and the outlet check valve 140.

The dual-mode fluid connector 150 has two operation modes, which are a serve mode and a clean mode. The user (e.g., the cleaner or the operator of the fluid material dispensing apparatus 100) may easily switch the dual-mode fluid connector 150 between the serve mode and the clean mode.

In one embodiment, when the dual-mode fluid connector 150 operates in the serve mode, the dual-mode fluid connector 150 manipulates the stopper 242 of the outlet check valve 140, so that the output terminal of the outlet check valve 140 stays in an open status. In the meantime, the dual-mode fluid connector 150 also isolates or blocks the transmission channel between the head portion 330 and the cleaning tube 324. Therefore, under the serve mode, the fluid material in the material container 130 is enabled to flow into the dual-mode fluid connector 150 through the outlet check valve 140, but the fluid material received by the dual-mode fluid connector 150 can only flow into the material tube 322 and the material transmission pipe 152 connected to the material tube 322 through the hollow connecting element 310 and cannot flow into the cleaning tube 324 through the hollow connecting element 310.

On the other hand, when the dual-mode fluid connector 150 operates in the clean mode, the dual-mode fluid connector 150 stops manipulating the stopper 242 of the outlet check valve 140, so that the output terminal of the outlet check valve 140 resumes to be in a close status. Therefore, the fluid material in the material container 130 cannot flow into the dual-mode fluid connector 150 through the outlet check valve 140. In the meantime, the dual-mode fluid connector 150 also resumes the transmission channel between the head portion 330 and the cleaning tube 324. Under the clean mode, the dual-mode fluid connector 150 may receive the cleaning solution through the cleaning tube 324 and the detergent transmission pipe 154 connected to the cleaning tube 324, and the cleaning solution is not only allowed to flow into the inner space of the dual-mode fluid connector 150, but also allowed to flow into the material tube 322 and the material transmission pipe 152 connected to the material tube 322 through the hollow connecting element 310.

Please note that when the dual-mode fluid connector 150 operates in the clean mode, the output terminal of the outlet check valve 140 is in a close status, thus the cleaning solution received by the dual-mode fluid connector 150 does not flow into the material container 130 through the outlet check valve 140. In other words, even if the dual-mode fluid connector 150 is still connected to the outlet check valve 140, it can effectively prevent the cleaning solution from flowing into the material container 130 and polluting the fluid material by switching the dual-mode fluid connector 150 to the clean mode. Therefore, the user does not need to detach the dual-mode fluid connector 150 from the outlet check valve 140 of the material container 130 before switching the dual-mode fluid connector 150 to the clean mode.

The structures and functionalities of respective components of the dual-mode fluid connector 150 and how to configure the dual-mode fluid connector 150 to operate in the serve mode will be further described below by reference to FIG. 5 through FIG. 22.

Figure 5:
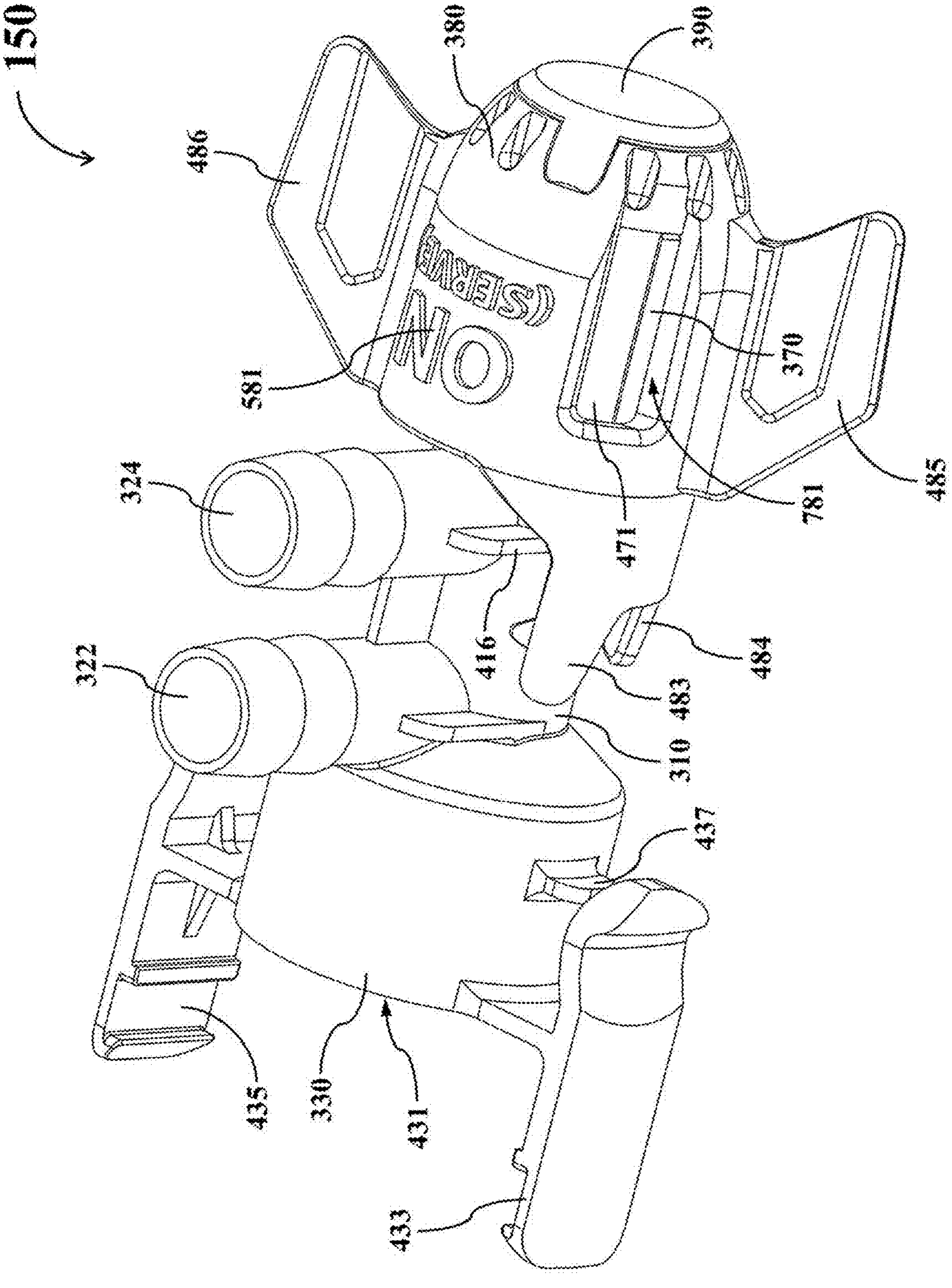
FIG. 5 and FIG. 6 show simplified schematic diagrams of the dual-mode fluid connector operating in a serve mode from different viewing angles according to one embodiment of the present disclosure.
Figure 6:
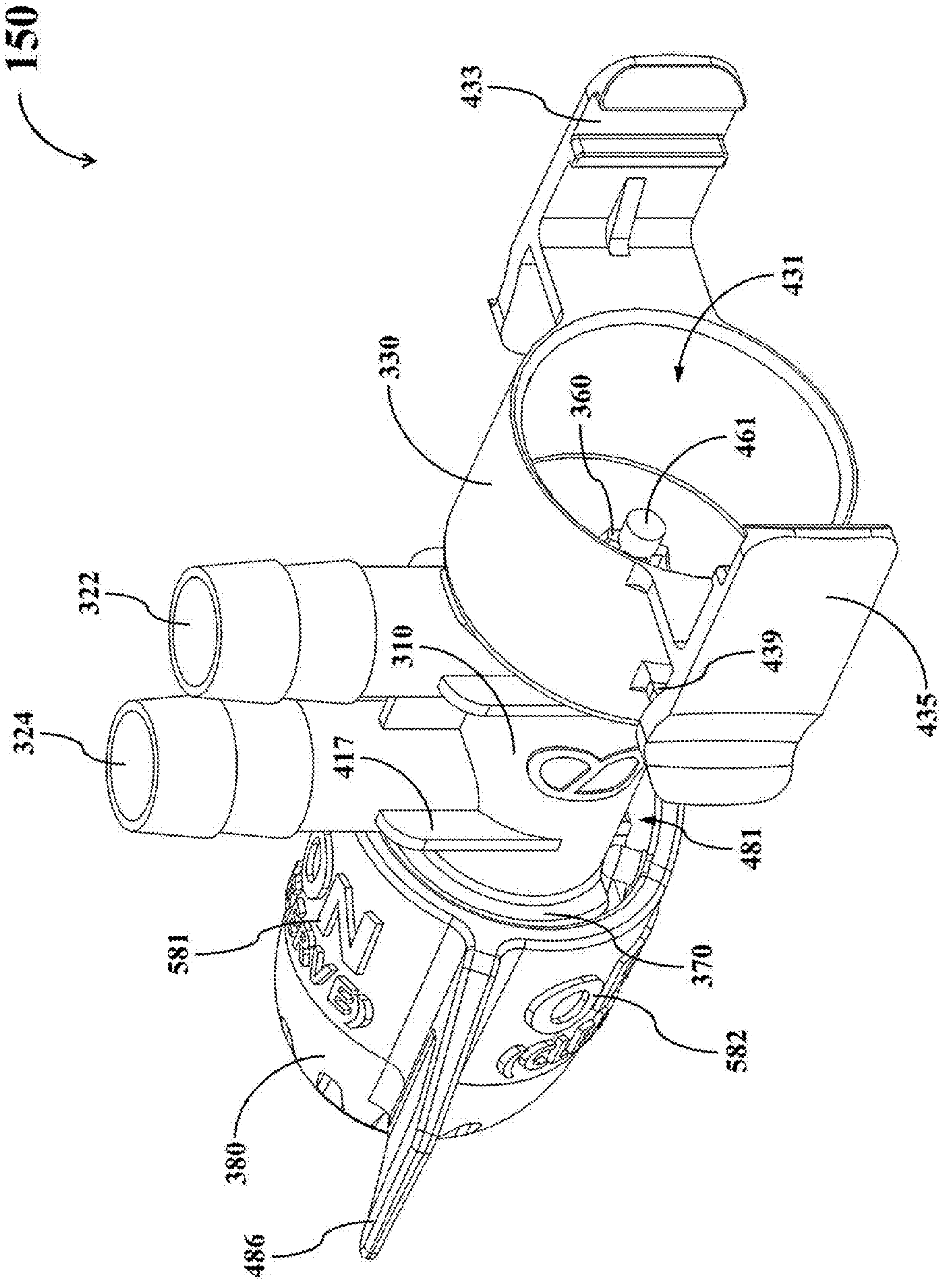
Figure 7:
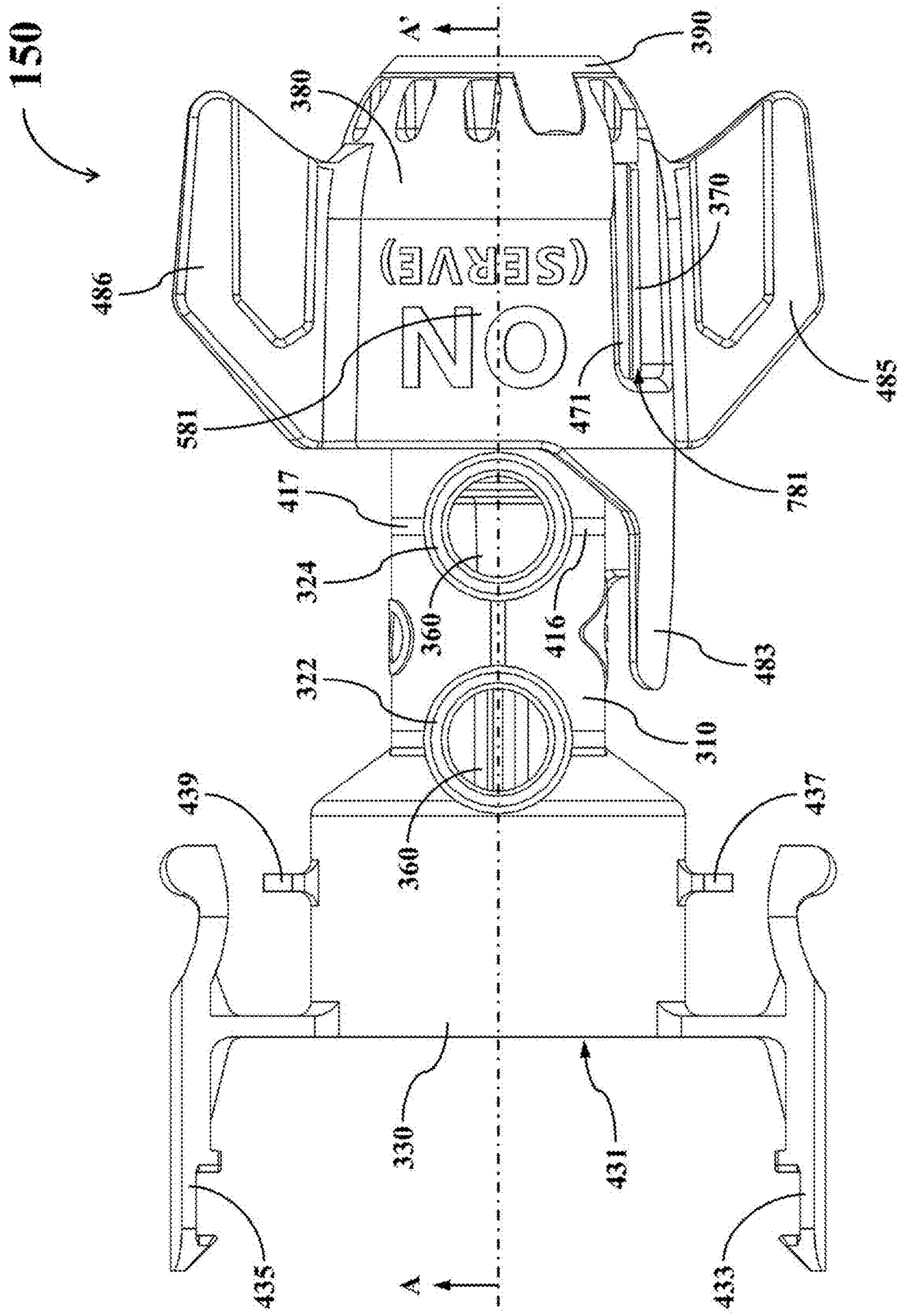
FIG. 7 shows a schematic top view diagram of the dual-mode fluid connector operating in the serve mode according to one embodiment of the present disclosure.
Figure 8:
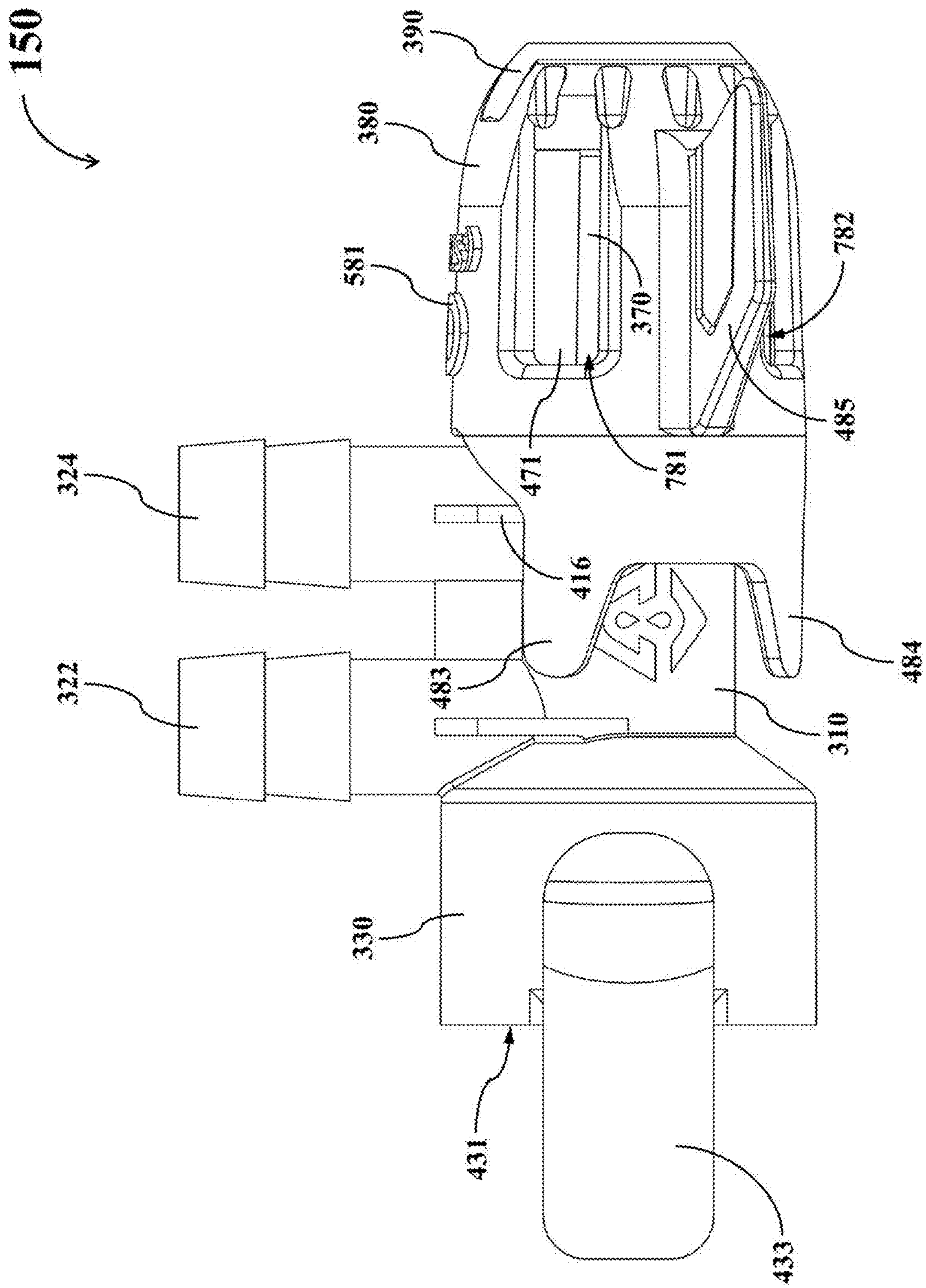
FIG. 8 shows a schematic side view diagram of the dual-mode fluid connector operating in the serve mode according to one embodiment of the present disclosure.
Figure 9:
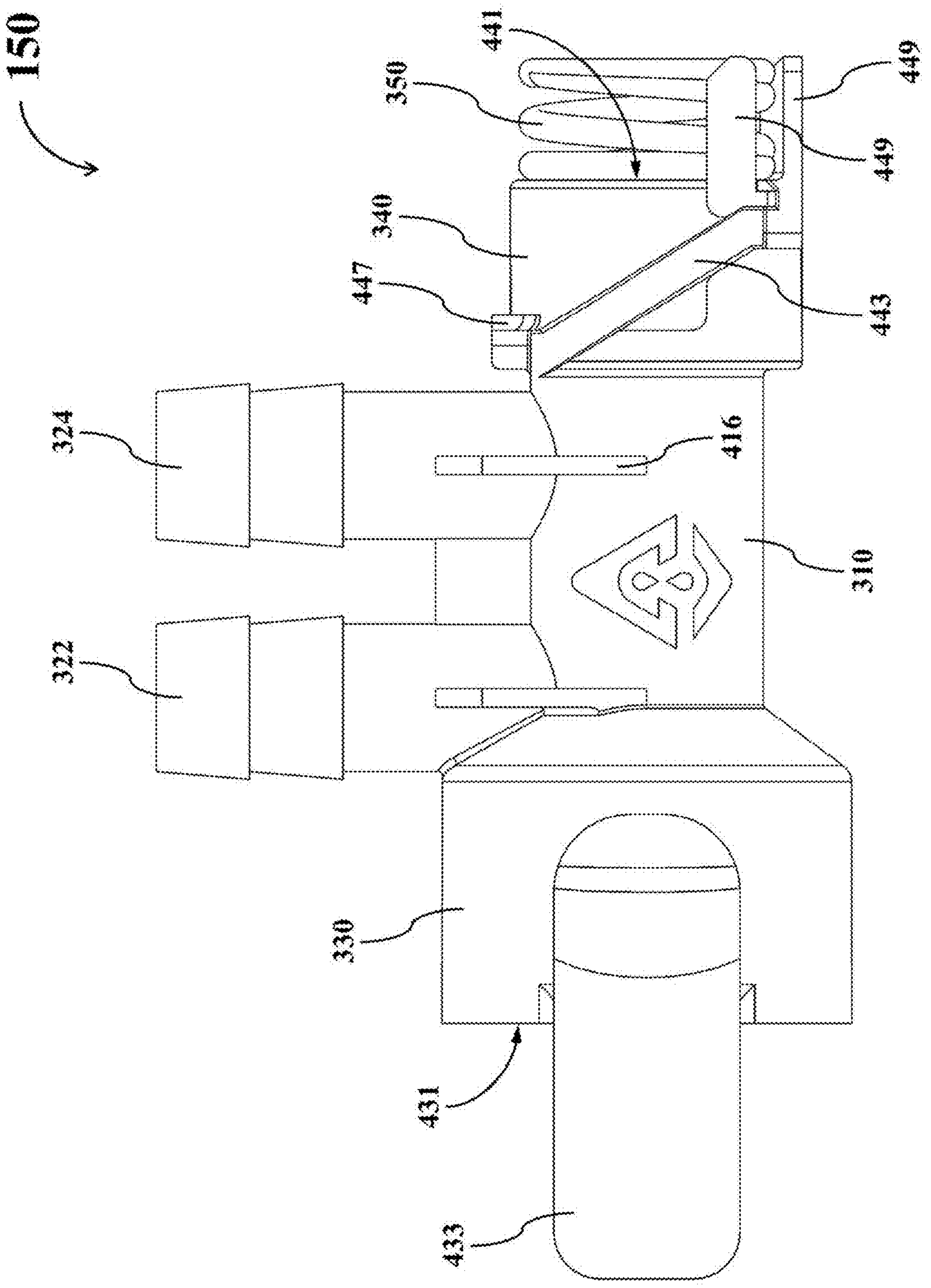
FIG. 9 shows a simplified schematic side view diagram of the dual-mode fluid connector of FIG. 8.
Figure 10:
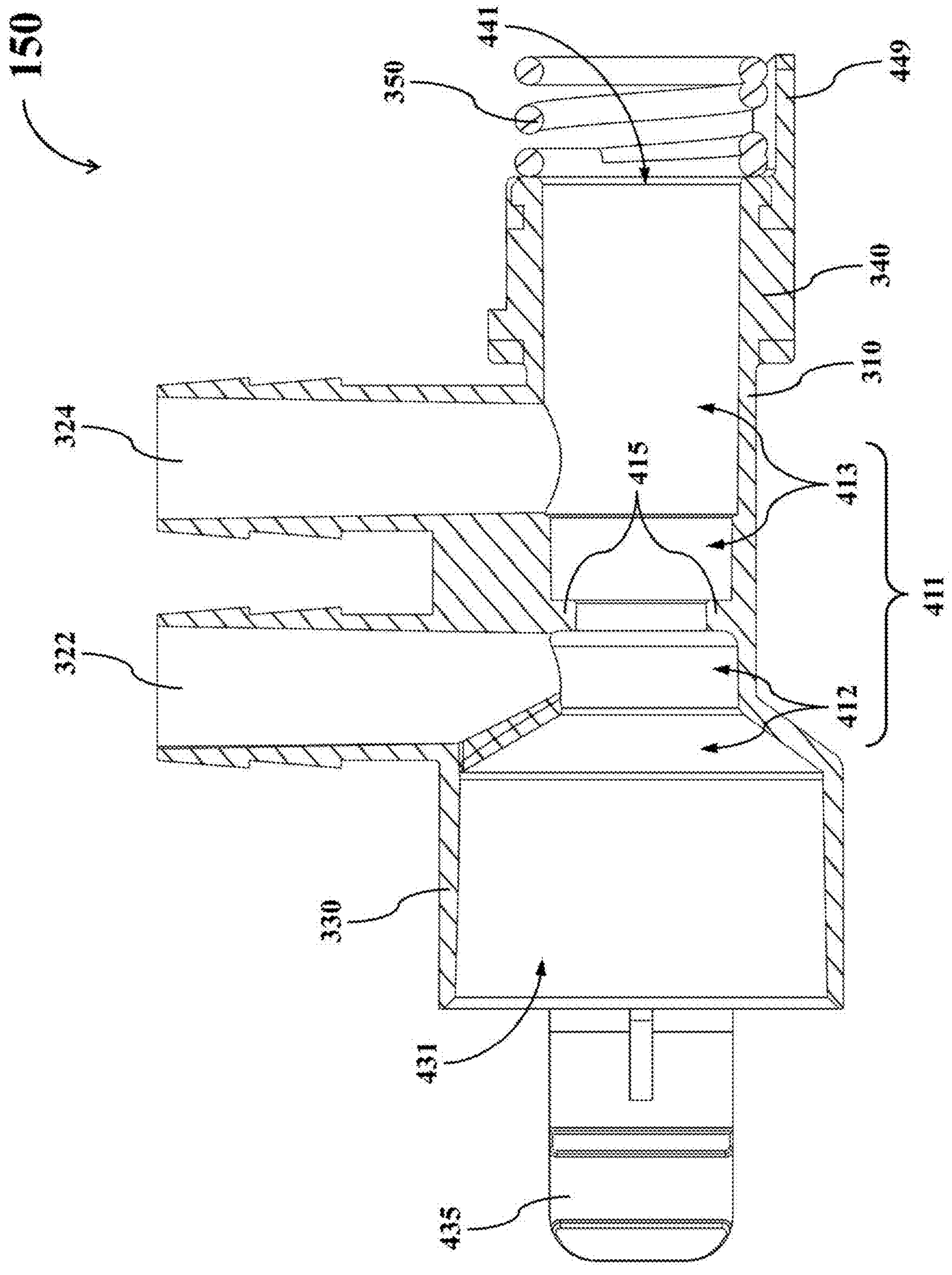
FIG. 10 shows a schematic cross-sectional diagram of the dual-mode fluid connector along the direction A-A' of FIG. 7.
Figure 11:
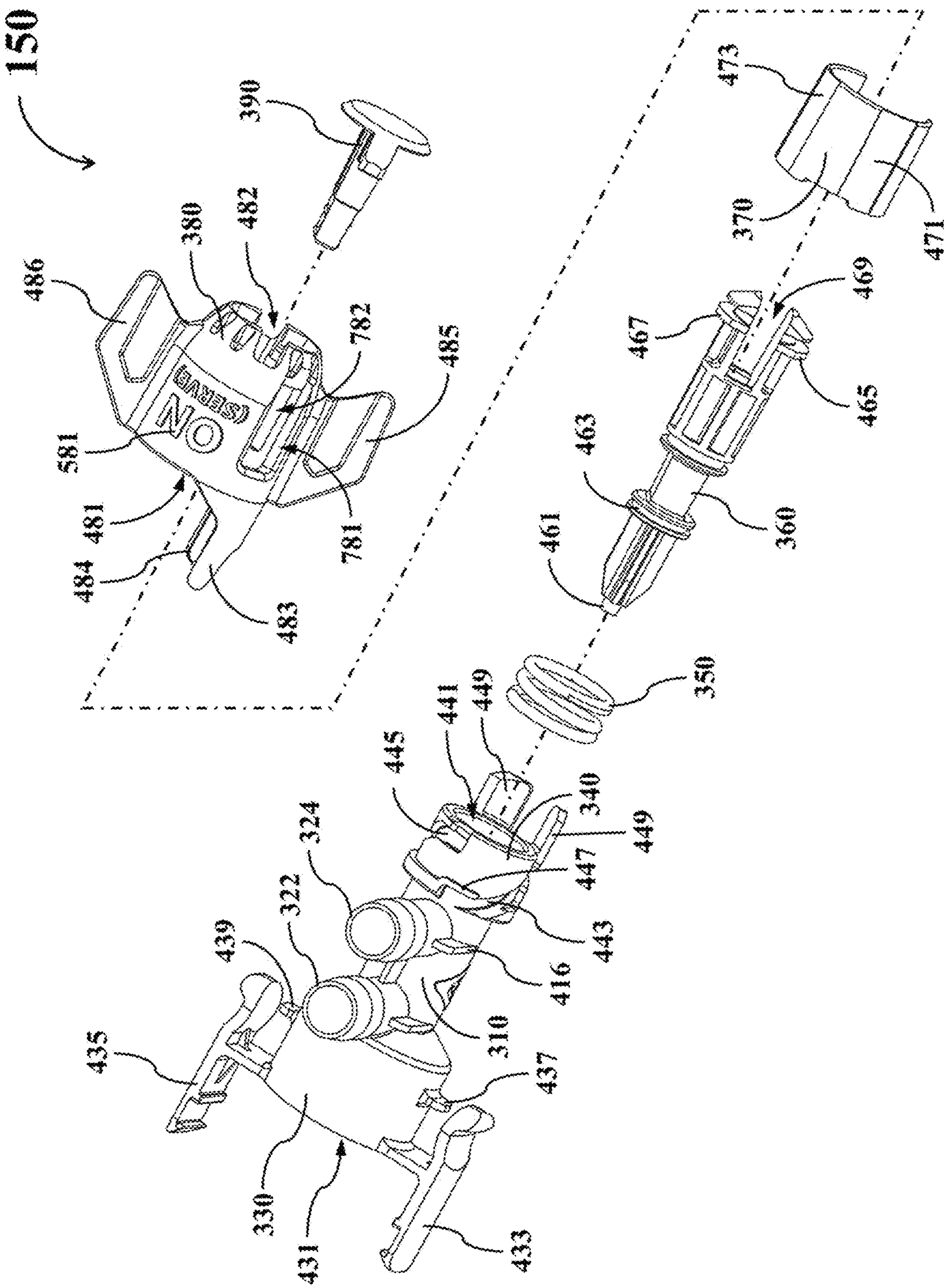
FIGS. 11~12 show simplified schematic decomposed diagrams of the dual-mode fluid connector from different viewing angles according to one embodiment of the present disclosure.
Figure 12:
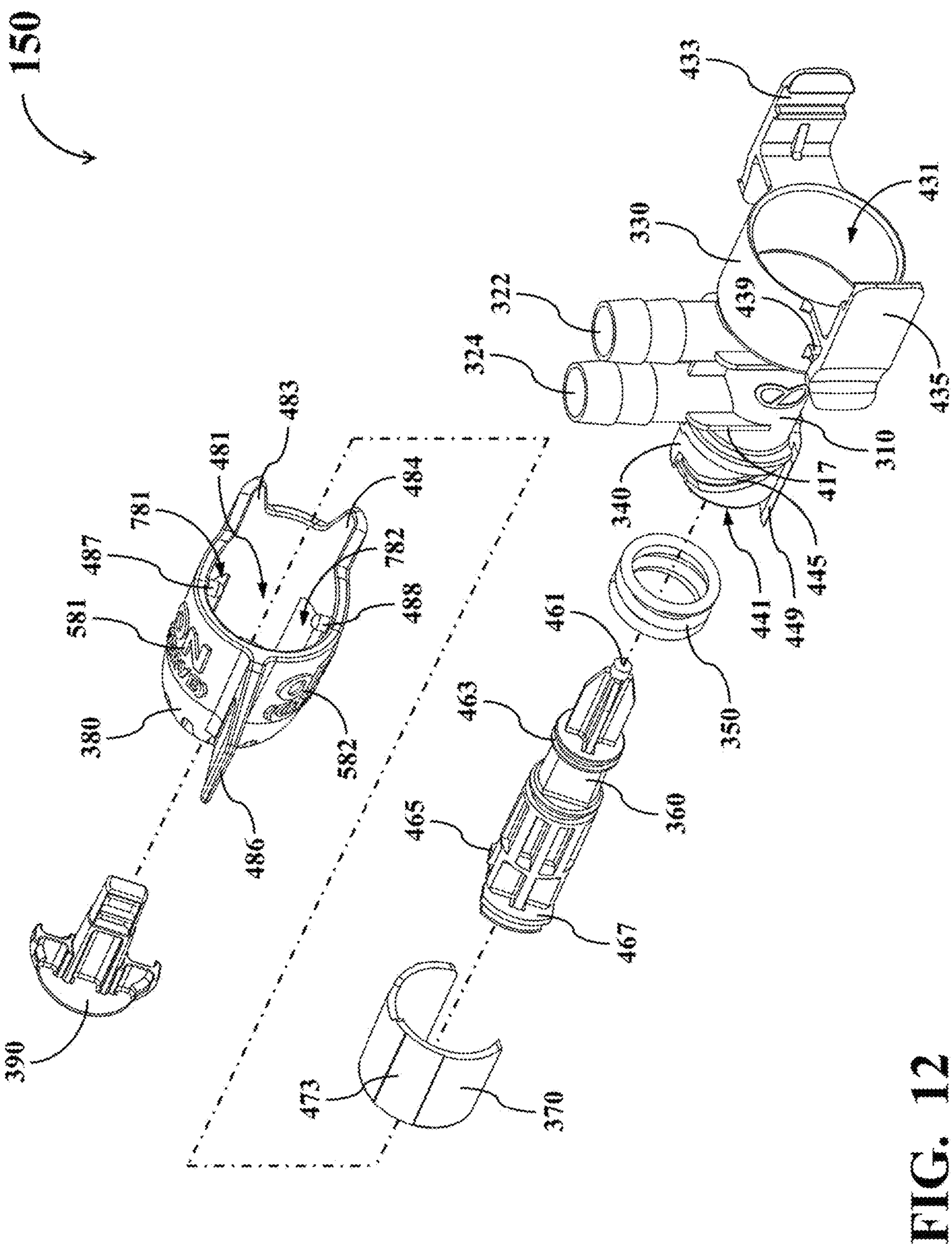

FIG. 5 and FIG. 6 show simplified schematic diagrams of the dual-mode fluid connector 150 operating in the serve mode from different viewing angles. FIG. 7 shows a schematic top view diagram of the dual-mode fluid connector 150 operating in the serve mode. FIG. 8 shows a schematic side view diagram of the dual-mode fluid connector 150 operating in the serve mode. FIG. 9 shows a simplified schematic side view diagram of the dual-mode fluid connector 150 of FIG. 8. FIG. 10 shows a schematic cross-sectional diagram of the dual-mode fluid connector 150 along the direction A-A' of FIG. 7. FIGS. 11~12 show simplified schematic decomposed diagrams of the dual-mode fluid connector 150 from different viewing angles. FIGS. 13~18 show schematic diagrams of assembly process of the dual-mode fluid connector 150 from different viewing angles.

As shown in FIG. 5 through FIG. 18, the dual-mode fluid connector 150 further comprises a rear portion 340, a spring 350, a rod 360, and a bended plate 370. To simplify the drawings, the rod 360, the bended plate 370, and the rotatable element 380 of the dual-mode fluid connector 150 are omitted in the aforementioned FIG. 9 and FIG. 10.

Figure 19:
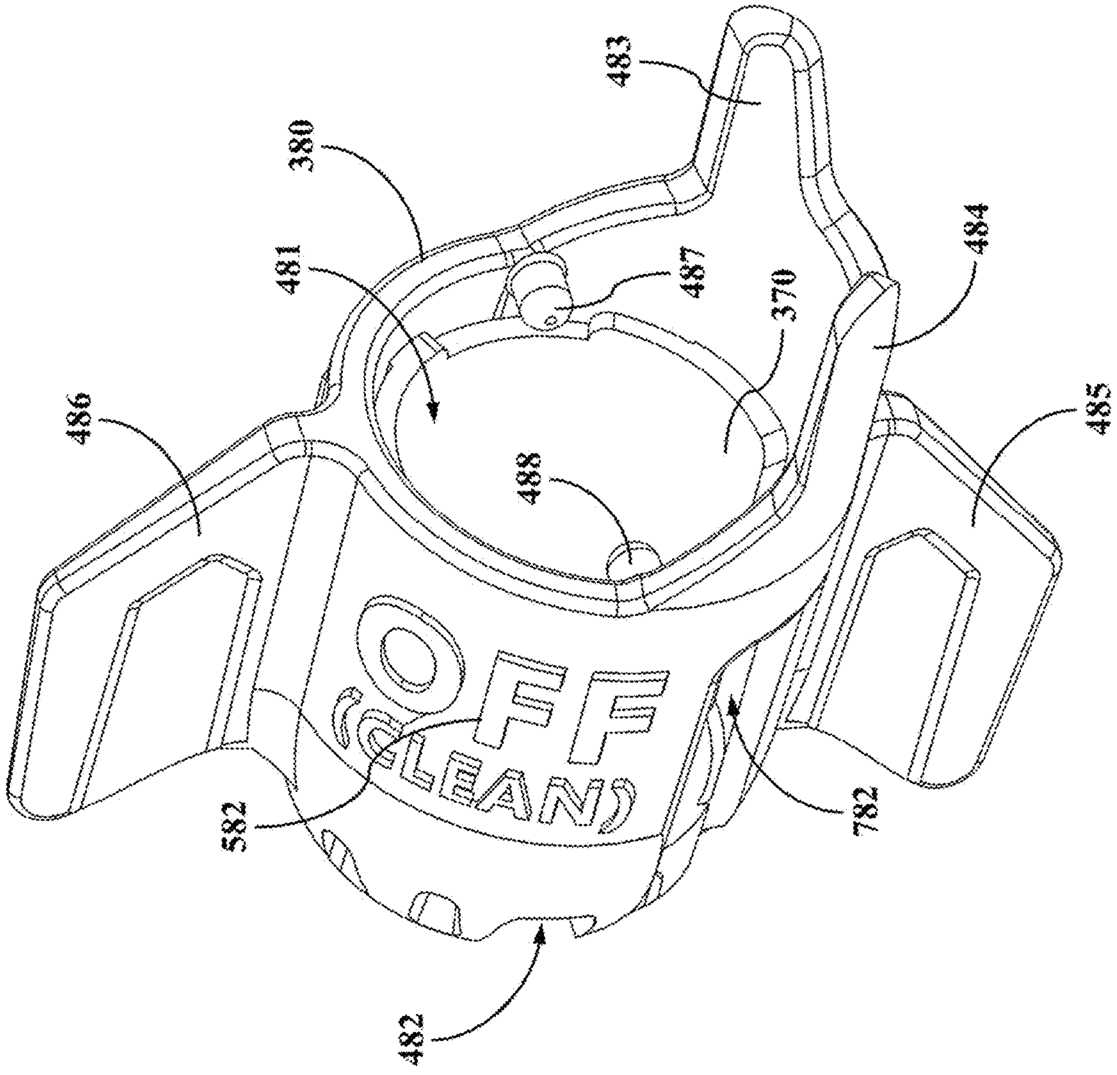
FIGS. 19~20 show schematic assembled diagrams of a rotatable element and a bended plate from different viewing angles according to one embodiment of the present disclosure.
Figure 20:
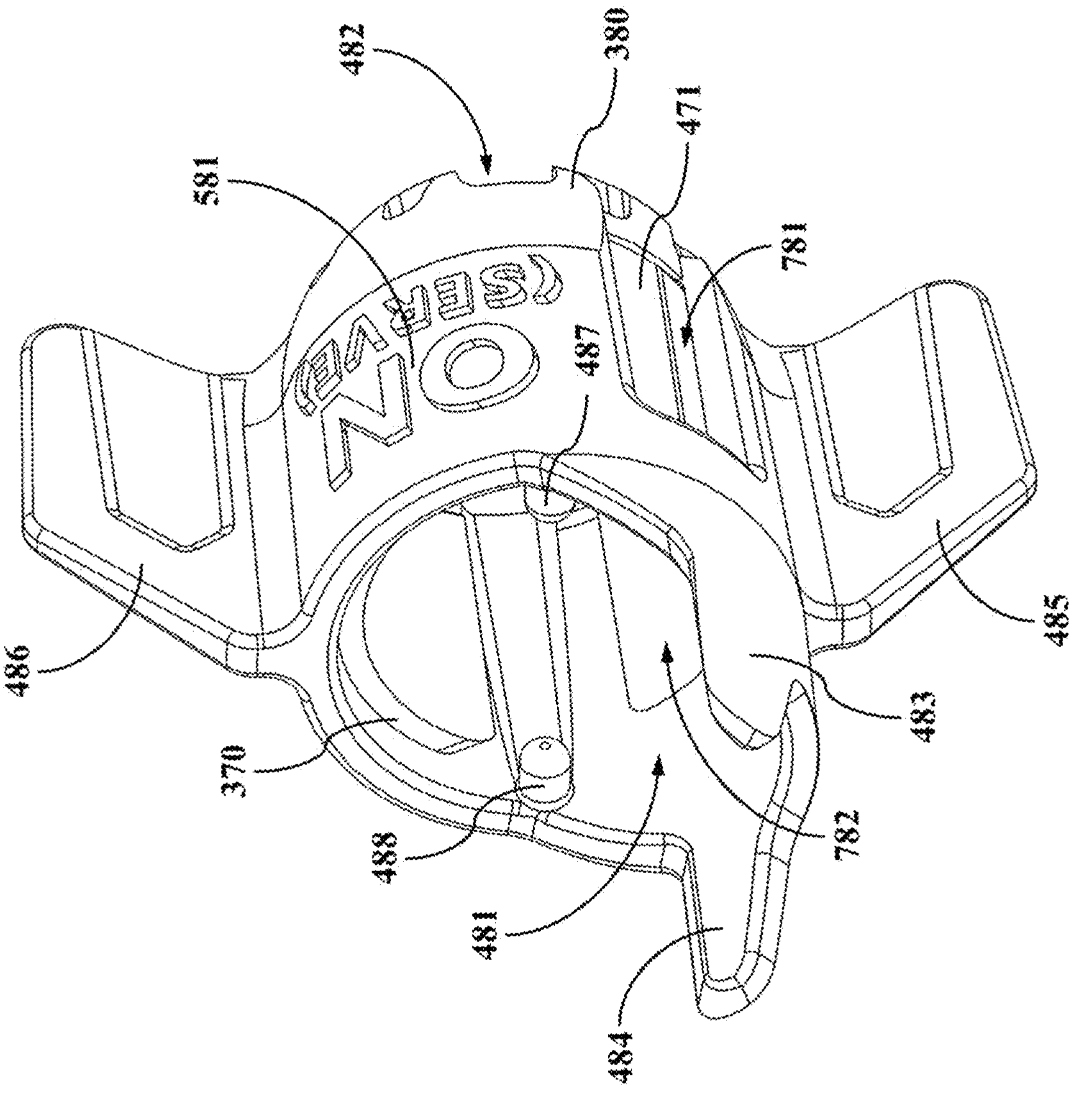
Figure 21:
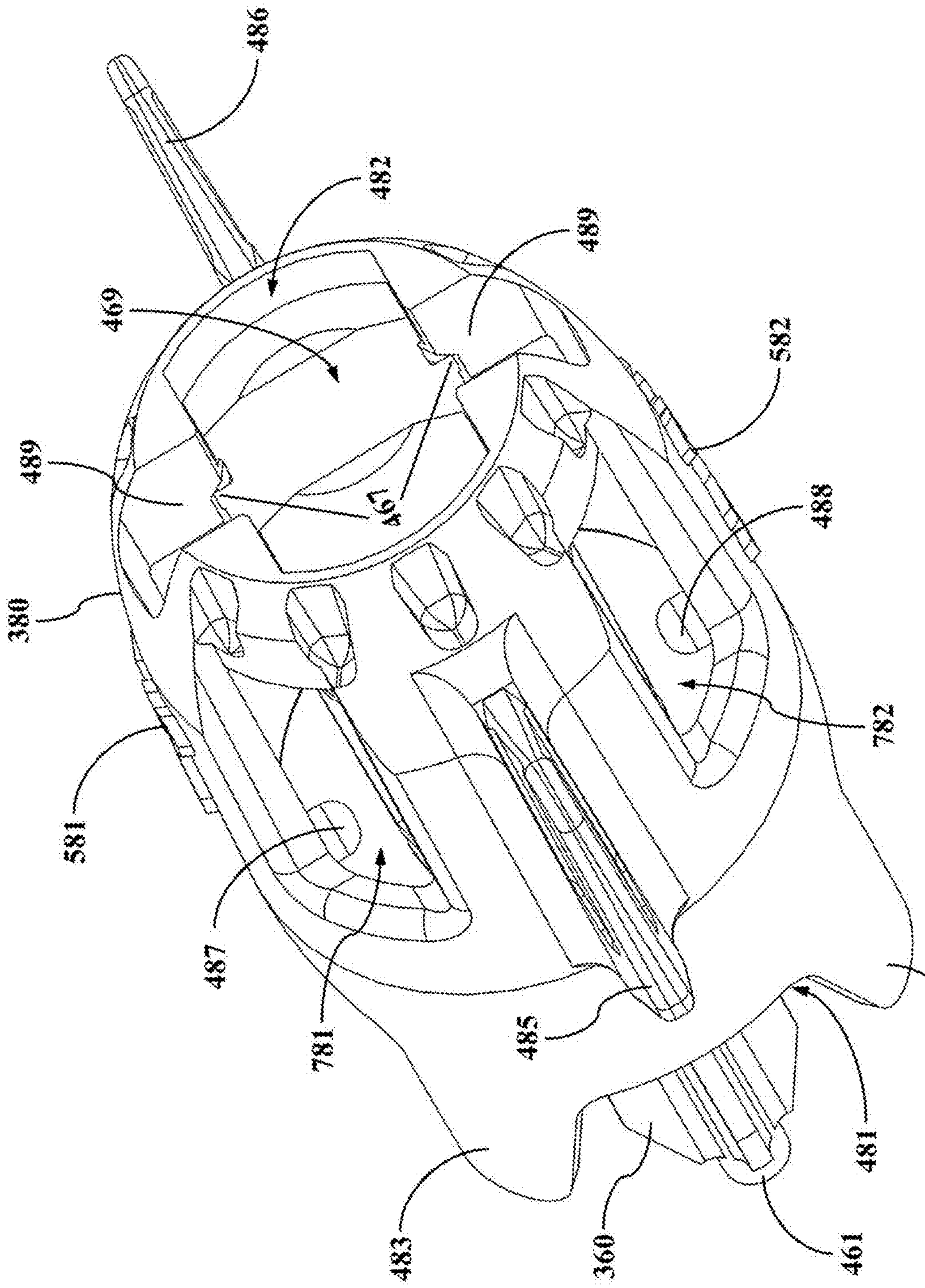
FIG. 21 shows a schematic assembled diagram of the rotatable element and a rod from a first viewing angle according to one embodiment of the present disclosure.
Figure 22:
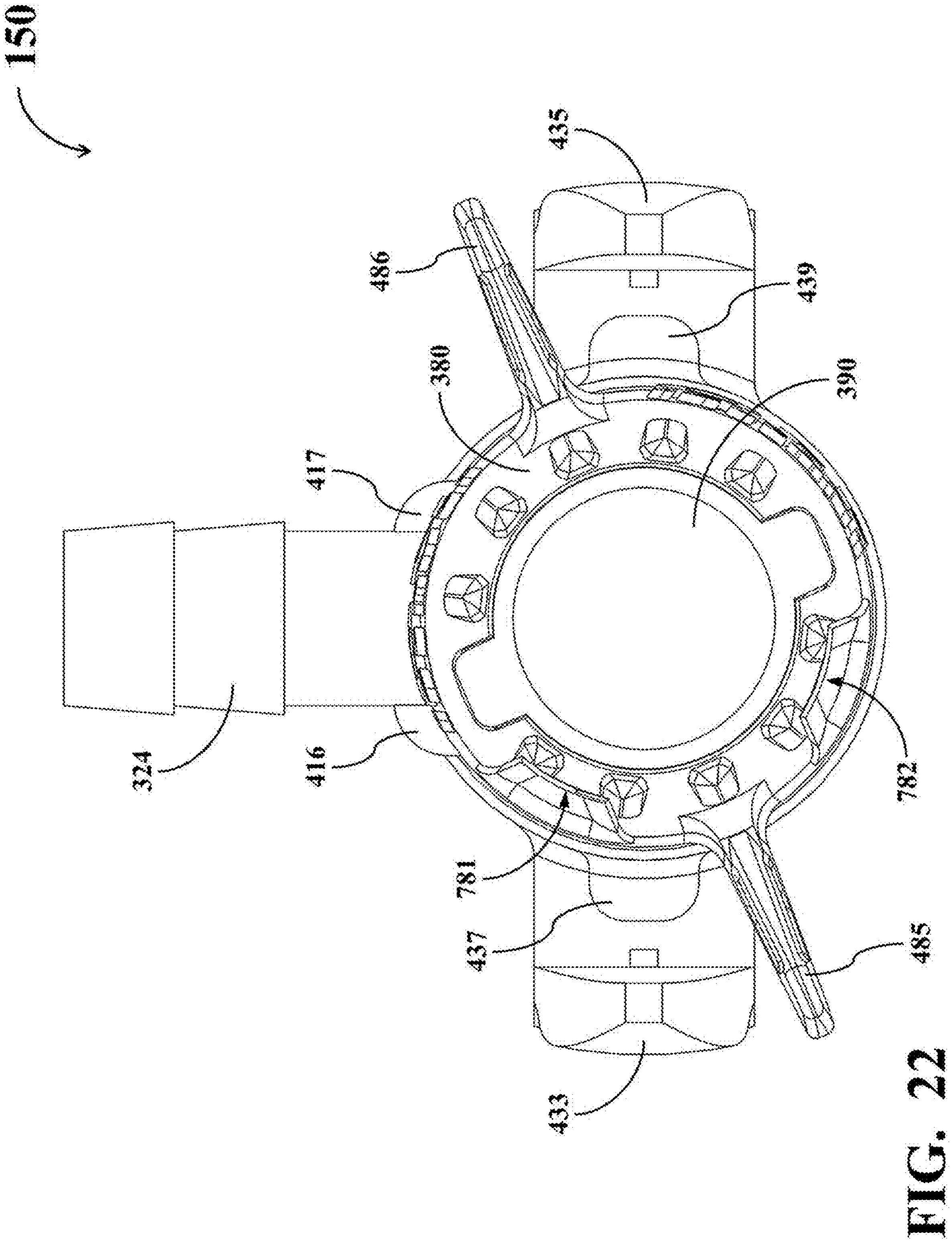
FIG. 22 shows a schematic rear view diagram of the dual-mode fluid connector operating in the serve mode according to one embodiment of the present disclosure.

FIGS. 19~20 show schematic assembled diagrams of the rotatable element 380 and the bended plate 370 from different viewing angles according to one embodiment of the present disclosure. FIG. 21 shows a schematic assembled diagram of the rotatable element 380 and the rod 360 from a first viewing angle according to one embodiment of the present disclosure. FIG. 22 shows a schematic rear view diagram of the dual-mode fluid connector 150 operating in the serve mode according to one embodiment of the present disclosure. To simplify the drawings, the components except for the rotatable element 380 and the bended plate 370 are omitted in the aforementioned FIG. 19 and FIG. 20, and the components except for the rotatable element 380 and the rod 360 are omitted in the aforementioned FIG. 21.

In this embodiment, the hollow connecting element 310 comprises a chamber 411, a block element 415, a first restriction element 416, and a second restriction element 417. As shown in FIG. 10, the chamber 411 is a hollow portion positioned inside the hollow connecting element 310 and penetrating the hollow connecting element 310. The block element 415 is a protuberant structure positioned on an inner surface of the chamber 411, and the block element 415 may divide an interior space of the chamber 411 into a first space 412 and a second space 413.

In addition, it is clearly shown in FIG. 10 that the material tube 322 and the cleaning tube 324 positioned on the hollow connecting element 310 are both connected to the chamber 411. In this embodiment, the material tube 322 is connected to the first space 412 within the chamber 411, and the cleaning tube 324 is connected to the second space 413 within the chamber 411.

The aforementioned block element 415 per se does not isolate or block the transmission channel between the first space 412 and the second space 413. Therefore, when the transmission channel between the first space 412 and the second space 413 is not isolated or blocked by other components, the first space 412 and the second space 413 can be connected to each other, and the first space 412 and the cleaning tube 324 can also be connected to each other through the second space 413. In practice, the block element 415 may be realized with a single ring-shaped element or may be realized with multiple separated protruding structures.

As shown in FIG. 5 through FIG. 7, the first restriction element 416 and a second restriction element 417 are respectively extended outward from an outer surface of the hollow connecting element 310 and respectively positioned on two opposite sides of the cleaning tube 324. In this embodiment, the first restriction element 416 and the second restriction element 417 also act as reinforced ribs positioned on both sides of the cleaning tube 324, and can be utilized to improve the structural strength of the cleaning tube 324 and to reduce the possibility of damage to the cleaning tube 324. Similarly, two reinforced ribs having similar structure to the first restriction element 416 and the second restriction element 417 are respectively arranged on both sides of the material tube 322 to improve the structure strength of the material tube 322 and to reduce the possibility of damage to the material tube 322.

The head portion 330 further comprises a first protruding element 437 and a second protruding element 439. As shown in FIG. 5 through FIG. 7, the first protruding element 437 and the second protruding element 439 are respectively extended outward from the outer surface of the head portion 330, wherein the first protruding element 437 is positioned near a rear portion of the first clamp element 433, and the second protruding element 439 is positioned near a rear portion of the second clamp element 435. In general situations, the first protruding element 437 does not touch the first clamp element 433, and the second protruding element 439 does not touch the second clamp element 435.

When the user wants to connect the dual-mode fluid connector 150 to the outlet check valve 140 of the material container 130, the user may press the rear portion of the first clamp element 433 and the rear portion of the second clamp element 435 to slightly open the front sections of both the first clamp element 433 and the second clamp element 435, and then sleeve the head portion 330 of the dual-mode fluid connector 150 onto the outlet check valve 140. In this embodiment, the caliber of the connecting opening 431 of the head portion 330 is larger than the caliber of the output terminal of the outlet check valve 140, thus the outlet check valve 140 will be inserted into the connecting opening 431 when the head portion 330 is sleeved onto the outlet check valve 140. When the outlet check valve 140 is inserted into the connecting opening 431 for an appropriate distance, the first clamp element 433 and the second clamp element 435 will be aligned with the protruding portion 244 of the outlet check valve 140. In this situation, the user may stop pressing the rear portion of the first clamp element 433 and the rear portion of the second clamp element 435, so that the first clamp element 433 and the second clamp element 435 engage with the protruding portion 244 of the outlet check valve 140, thereby improving the connection stability between the dual-mode fluid connector 150 and the outlet check valve 140.

The aforementioned first protruding element 437 and second protruding element 439 may be utilized to limit the degree of deformation of the rear portions of both the first clamp element 433 and the second clamp element 435, so as to prevent the user from pressing too hard on the rear portions of both the first clamp element 433 and the second clamp element 435. In this way, the possibility of clastic fatigue or damage to the first clamp element 433 and the second clamp element 435 can be reduced.

As shown in FIG. 9 through FIG. 12, the rear portion 340 is positioned on another terminal of the hollow connecting element 310. In this embodiment, the rear portion 340 comprises a through hole 441, a first spiral track 443, a second spiral track 445, a block wall portion 447, and one or more rear-portion restriction elements 449. The first spiral track 443 and the second spiral track 445 are arranged on the outer surface of the rear portion 340, and the block wall portion 447 is positioned on one side of the end section of the first spiral track 443. In practice, the block wall portion 447 may be realized with a structure protruding upward from one side of the end section of the first spiral track 443. In addition, the rear portion 340 of this embodiment comprises two rear-portion restriction elements 449, which are respectively realized with two protruding structures extended backward from the end section of the rear portion 340. In practice, the two rear-portion restriction elements 449 may be instead realized with a single protruding structure. In other words, the rear portion 340 may comprises only one rear-portion restriction element 449.

The rod 360 comprises a rod head 461, a sealing portion 463, an outer flange 465, an outer flange 467, and a slot 469. As shown in FIG. 11 through FIG. 18, the rod head 461 is positioned on the front terminal of the rod 360, and the sealing portion 463 protrudes outward from an outer surface of the rod 360. In practice, the sealing portion 463 may be realized with a ring-shaped protruding structure, and the rod 360 or a portion of the sealing portion 463 may be made by slightly elastic materials, so as to improve the fluid tightness between the sealing portion 463 and other components when the sealing portion 463 abuts other components.

The outer flange 465 and the outer flange 467 are positioned near the rear portion of the rod 360 and respectively extended outward toward opposite directions. The slot 469 may be realized with a gap between the outer flange 465 and the outer flange 467 or may be realized with a grooved structure. In this embodiment, the shape of the slot 469 is configured to operably match the shape of the plug 390, so that the plug 390 can be inserted into the slot 469.

Figure 13:
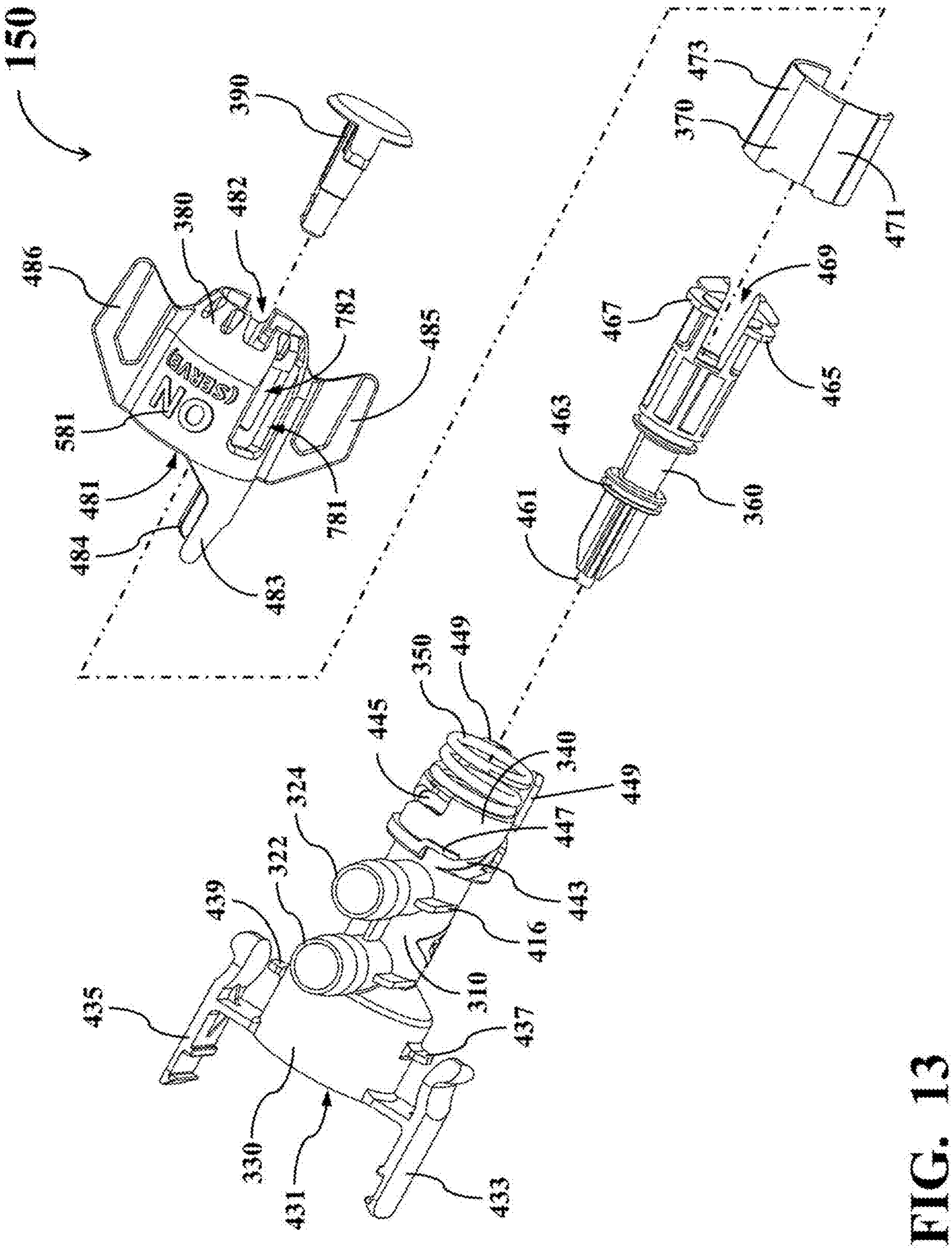
FIGS. 13~18 show schematic diagrams of assembly process of the dual-mode fluid connector from different viewing angles according to one embodiment of the present disclosure.
Figure 14:
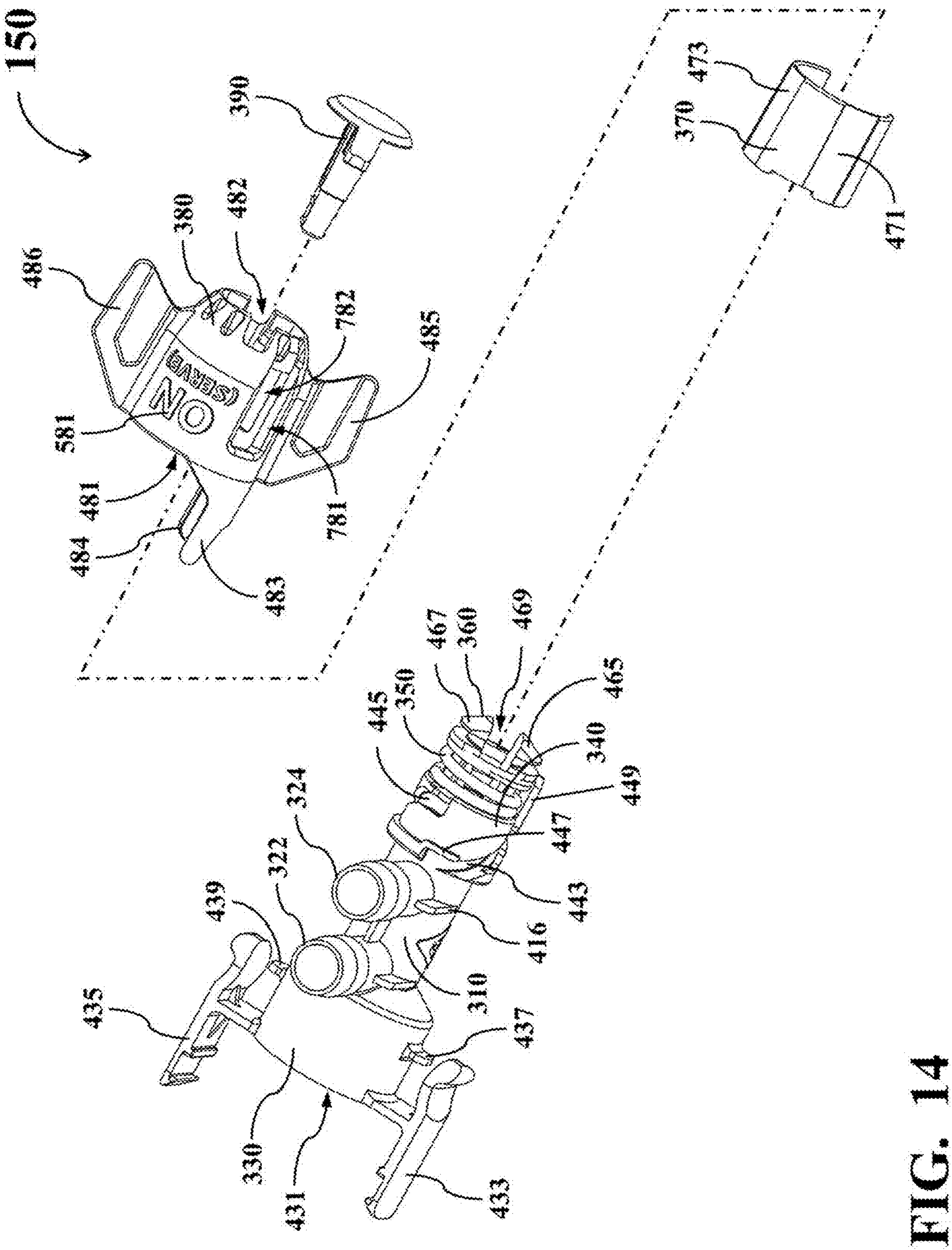
Figure 15:
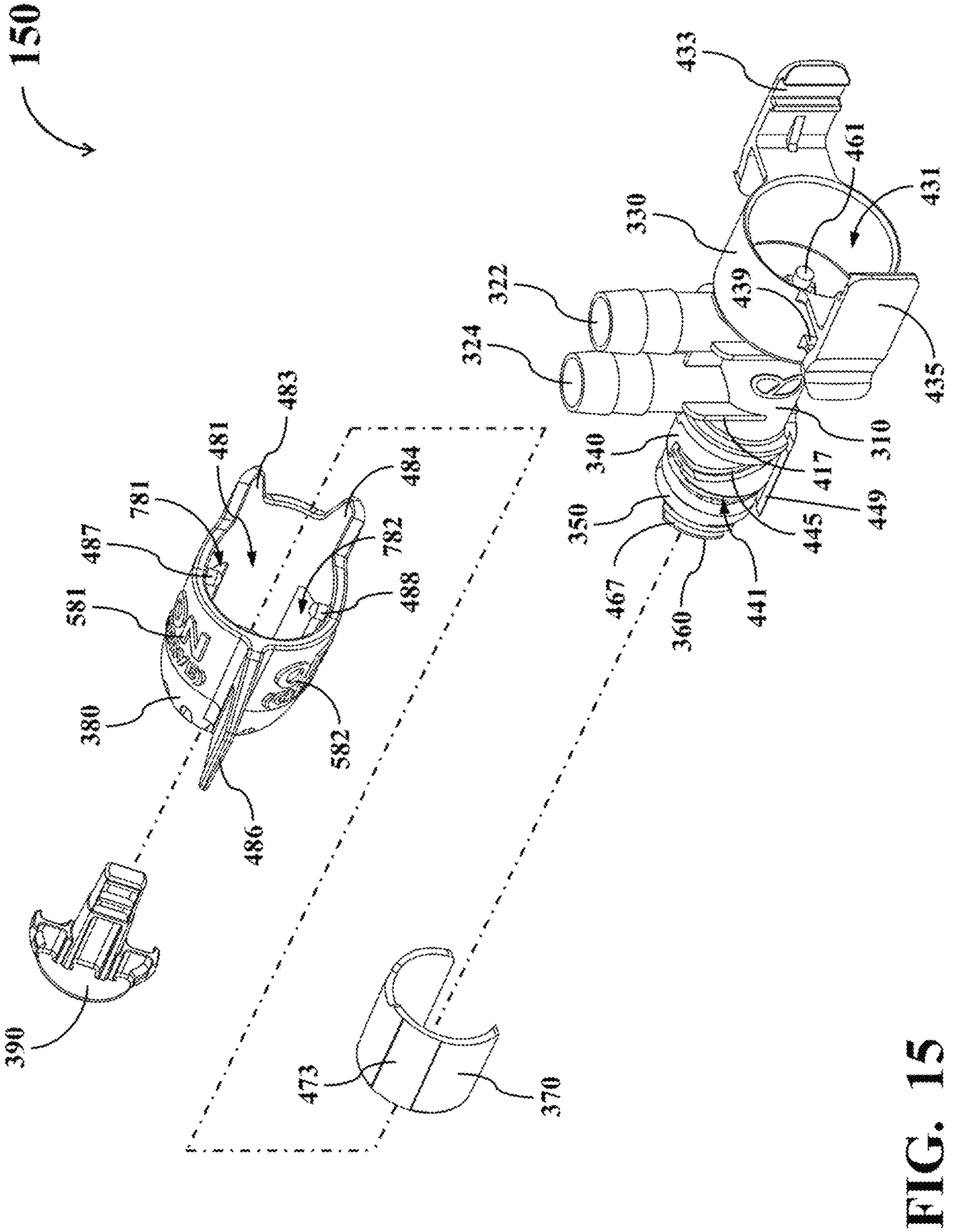
Figure 16:
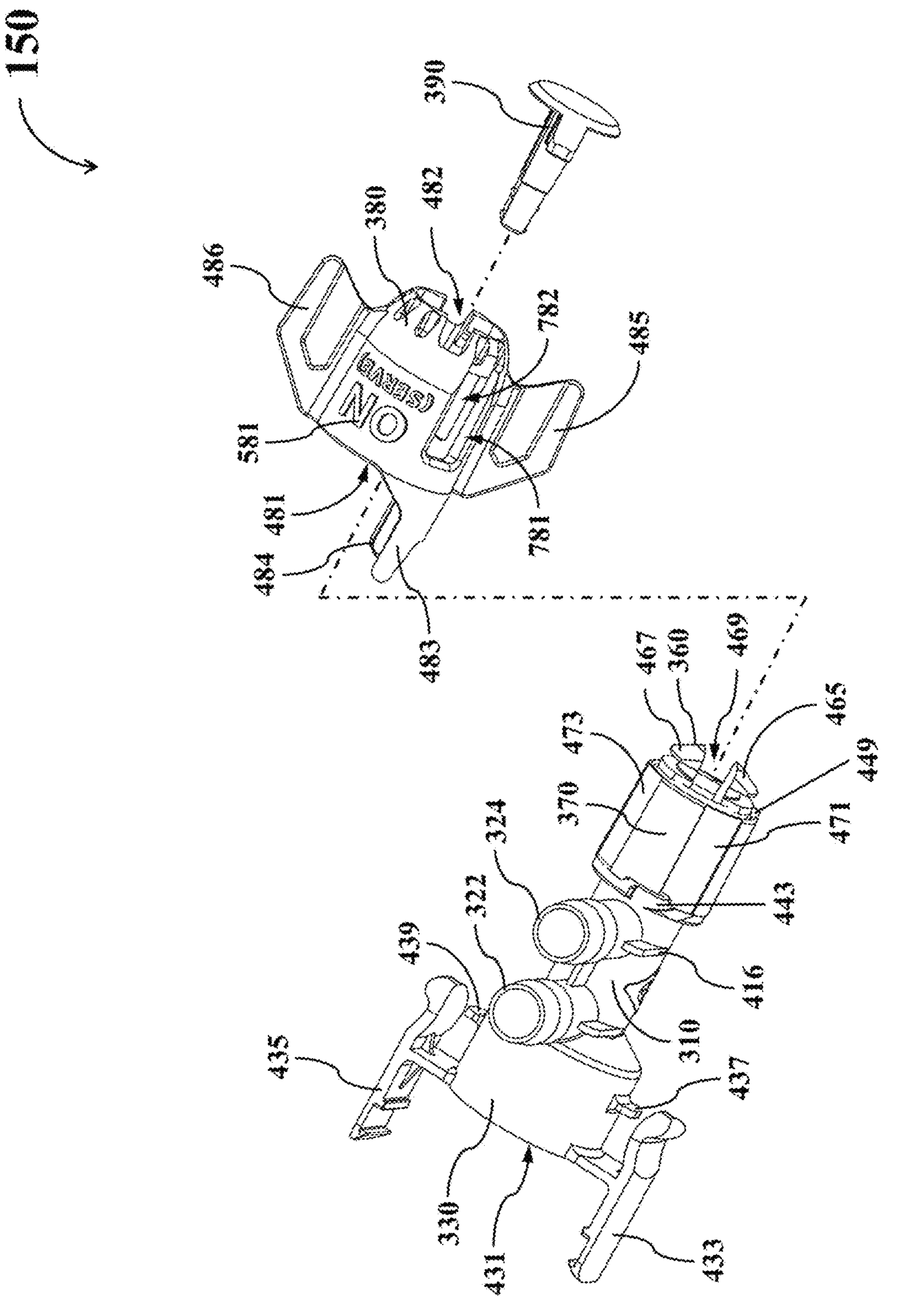
Figure 17:
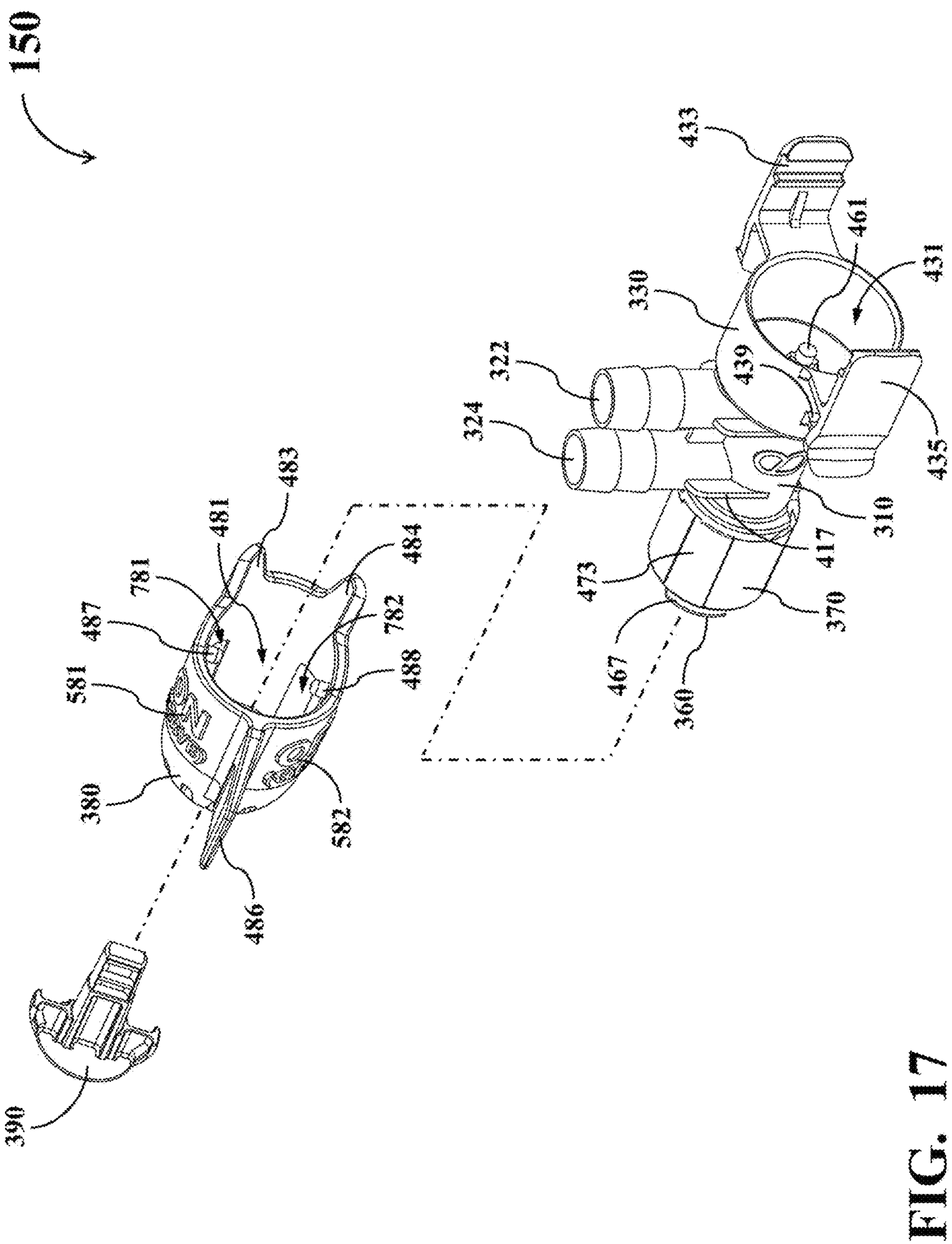

The spring 350 is positioned next to the through hole 441 of the rear portion 340. As shown in FIG. 13 through FIG. 15, the rod 360 can be inserted into the chamber 411 of the hollow connecting element 310 through the through hole 441 of the rear portion 340. In some embodiments, the spring 350 is positioned between the rear portion 340 and the outer flange 465 and the outer flange 467 of the rod 360 after the rod 360 is inserted into the chamber 411. In this situation, when the rod 360 is moved toward the head portion 330 for a certain distance, the outer flange 465 and the outer flange 467 will engage and compress the spring 350.

The bended plate 370 comprises a first marked region 471 and a second marked region 473, wherein the first marked region 471 and the second marked region 473 are partial regions respectively positioned on different positions of the outer surface of the bended plate 370. In this embodiment, the bended plate 370 has a C-shaped appearance from the front view or the rear view of the bended plate 370. When the bended plate 370 is sleeved onto the rear portion 340, two sides of the bended plate 370 abut the outside of the rear-portion restriction element 449 of the rear portion 340 to prevent the bended plate 370 from rotation. As shown in FIG. 5, FIG. 8, and FIG. 11 through FIG. 18, the bended plate 370 is positioned between the rotatable element 380 and the rear portion 340.

In practice, different indication colors, different images, different indication texts, and/or different indication symbols may be respectively arranged on the first marked region 471 and the second marked region 473 to indicate different operation modes of the dual-mode fluid connector 150. For example, the first marked region 471 may be filled in with a first color (e.g., blue, green, purple, or the like) for representing the serve mode, and the second marked region 473 may be filled in with a second color (e.g., yellow, orange, red, or the like) for representing the clean mode. Please note that the aforementioned combinations of colors are merely some embodiments, rather that restrictions to the practical implementations.

For another example, a first image for representing the serve mode may be arranged on the first marked region 471, and a second image for representing the clean mode may be arranged on the second marked region 473.

For yet another example, a first text or letter for representing the serve mode may be arranged on the first marked region 471, and a second text or letter for representing the clean mode may be arranged on the second marked region 473.

The rotatable element 380 comprises a front opening 481, a rear opening 482, a first elongated portion 483, a second elongated portion 484, a first fin 485, a second fin 486, a first guiding element 487, a second guiding element 488, a block portion 489, a first area 581, a second area 582, a first window 781, and a second window 782.

As shown in FIG. 5 through FIG. 8 and FIG. 11 through FIG. 12, when the rotatable element 380 is sleeved onto the rear portion 340, the rotatable element 380 is positioned outside the rear portion 340, covering the rear portion 340, and engages with the rod 360. The front opening 481 of the rotatable element 380 may cover portion or all of the rear portion 340, while the rear opening 482 of the rotatable element 380 allows the plug 390 to insert therethrough.

When the rotatable element 380 is sleeved onto the rear portion 340, the user may utilize the rear portion 340 (or the rod 360) as a rotation axis and rotate the rotatable element 380 clockwise or counterclockwise around the rotation axis.

As shown in FIG. 5 through FIG. 8 and FIG. 11 through FIG. 20, when the rotatable element 380 is sleeved onto the rear portion 340, the bended plate 370 is positioned between the inner surface of the rotatable element 380 and the outer surface of the rear portion 340.

The first elongated portion 483 and the second elongated portion 484 are respectively extended from an edge of the front opening 481 toward the head portion 330. The first elongated portion 483 should have a sufficient length so that the aforementioned first restriction element 416 can block the side of the first elongated portion 483 when the rotatable element 380 rotates to a certain angle. The second elongated portion 484 should have a sufficient length so that the aforementioned second restriction element 417 can block the side of the second elongated portion 484 when the rotatable element 380 rotates to a certain angle. In practice, the lengths and shapes of the first elongated portion 483 and the second elongated portion 484 may be designed to be various patterns capable of realizing the above functionalities, rather than being restricted to the embodiment shown in FIG. 5, FIG. 8, FIG. 19, and FIG. 20.

The first fin 485 and the second fin 486 are respectively positioned on two opposite sides of the outer surface of the rotatable element 380, and can be utilized to facilitate the user to rotate the rotatable element 380. The functionality of the first fin 485 and the second fin 486 is to increase the leverage effect when the user rotates the rotatable element 380. In practice, the positions, shapes, and sizes of the first fin 485 and the second fin 486 may be designed to be various patterns capable of supporting the user to rotate the rotatable element 380, rather than being restricted to the embodiment shown in FIG. 5, FIG. 7, and FIG. 11 through FIG. 22.

The first guiding element 487 and the second guiding element 488 are respectively positioned on different positions of the inner surface of the rotatable element 380. In practice, the first guiding element 487 may be realized with various protruding structures whose shapes can match the aforementioned first spiral track 443, while the second guiding element 488 may be realized with various protruding structures whose shapes can match the aforementioned second spiral track 445. As shown in FIG. 11 through FIG. 21, the first guiding element 487 and the second guiding element 488 are respectively positioned on two opposite sides of the inner surface of the rotatable element 380 in this embodiment.

As described previously, when the rotatable element 380 is sleeved onto the rear portion 340, the user can utilize the rear portion 340 (or the rod 360) as the rotation axis and rotate the rotatable element 380 around the rotation axis. In this situation, the first guiding element 487 engages with the first spiral track 443 and can be moved along the first spiral track 443, while the second guiding element 488 engages with the second spiral track 445 and can be moved along the second spiral track 445. In this embodiment, since the first spiral track 443 and the second spiral track 445 are spiral, when the rotatable element 380 is rotated by the user, the rotatable element 380 will move forward while rotating or move backward while rotating due to the cooperation of the first guiding element 487, the second guiding element 488, the first spiral track 443, and the second spiral track 445.

The block portion 489 is positioned in the interior of the rotatable element 380, and when the rotatable element 380 is sleeved onto the rear portion 340, the block portion 489 may engage with the outer flange 465 and the outer flange 467 of the rod 360 and can prevent the outer flange 465 and the outer flange 467 from penetrating the rear opening 482 of the rotatable element 380. As shown in FIG. 21, in this embodiment, when the rotatable element 380 and the rod 360 are assembled together, the outer flange 465 and the outer flange 467 positioned near the rear portion of the rod 360 will be blocked by the block portion 489 of the rotatable element 380, thereby preventing the rod 360 from detaching from the rotatable element 380 through the rear opening 482.

The block portion 489 also drives the outer flange 465 and the outer flange 467 to rotate together. Therefore, when the rotatable element 380 is rotated by the user, the rotatable element 380 not only moves forward while rotating or moves backward while rotating due to the aforementioned cooperation of the first guiding element 487, the second guiding element 488, the first spiral track 443, and the second spiral track 445, but also drives the rod 360 to rotate together and to move forward or backward together.

Figure 18:
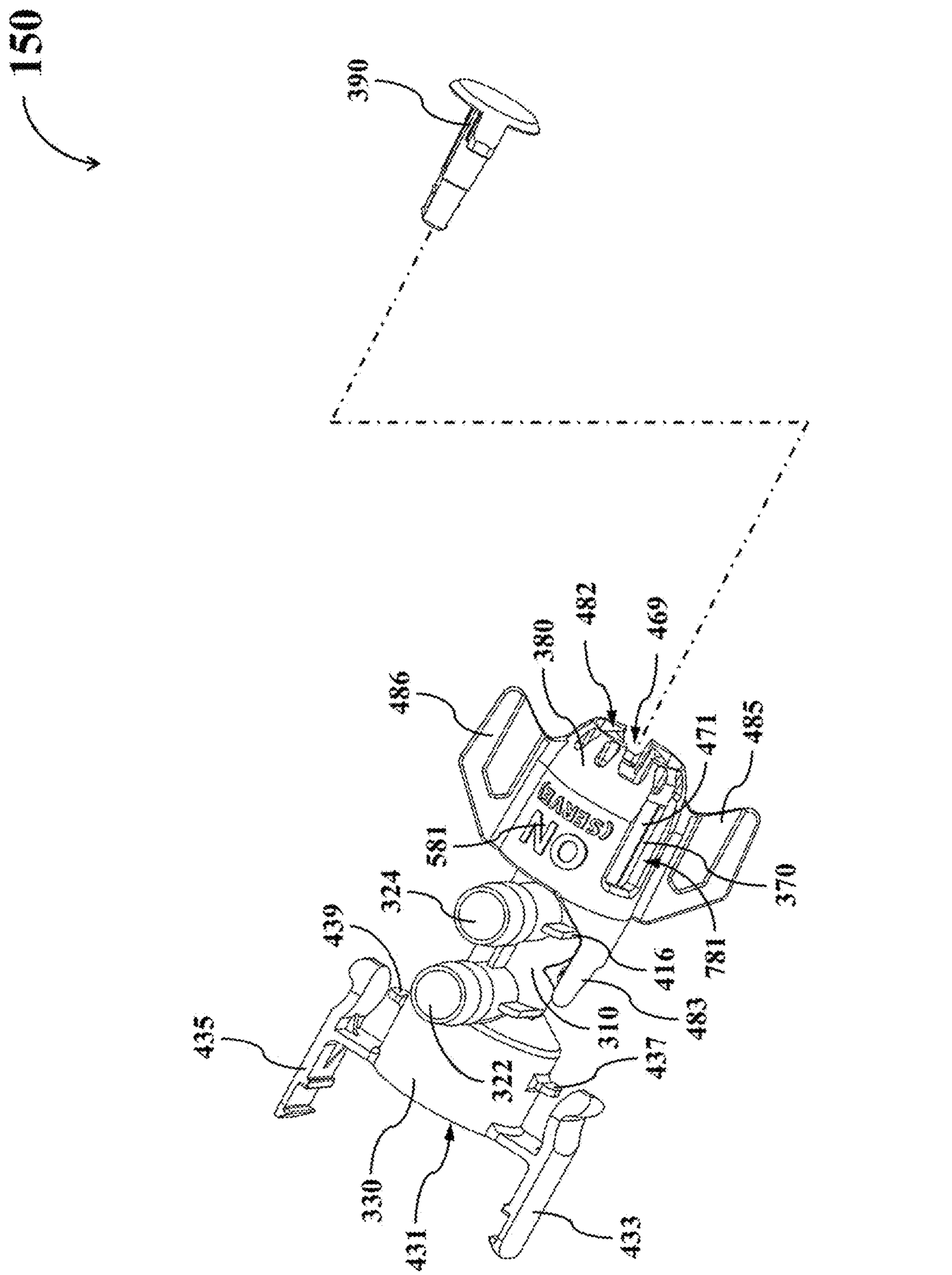

In addition, as shown in FIG. 18, when assembling the dual-mode fluid connector 150, the plug 390 may be inserted into the rotatable element 380 through the rear opening 482 of the rotatable element 380 and plugged in the slot 469 between the outer flange 465 and the outer flange 467 of the rod 360. In this situation, the plug 390 slightly squeezes the outer flange 465 and the outer flange 467 outward, so that the outer flange 465 and the outer flange 467 are more tightly pressed against the block portion 489. Therefore, the plug 390 plugged into the slot 469 not only prevents the outer flange 465 and the outer flange 467 from detaching from the block portion 489, but also further improves the connection stability between the rotatable element 380 and the rod 360.

In some embodiments, the spring 350 is positioned between the rear portion 340 and the block portion 489 in the interior of the rotatable element 380 after the rotatable element 380 is sleeved onto the rear portion 340. In this situation, when the rotatable element 380 is moved toward the head portion 330 for a certain distance, the block portion 489 will engage and compress the spring 350.

The first area 581 and the second area 582 are respectively positioned on two opposite sides of the outer surface of the rotatable element 380. In practice, different indication texts, different indication symbols, different images, and/or different indication colors may be respectively arranged on the first area 581 and the second area 582 to indicate different operation modes of the dual-mode fluid connector 150.

In this embodiment, the first area 581 and the second area 582 are respectively positioned on two opposite sides of the outer surface of the rotatable element 380. The indication texts "ON" and "SERVE" for representing the serve mode are arranged on the first area 581, and the indication texts "OFF" and "CLEAN" for representing the clean mode are arranged on the second area 582. When the rotatable element 380 is rotated to a status where the first area 581 faces upward, it represents that the dual-mode fluid connector 150 is switched to the serve mode. When the rotatable element 380 is rotated to a status where the second area 582 faces upward, it represents that the dual-mode fluid connector 150 is switched to the clean mode. Please note that the aforementioned combinations of texts are merely some embodiments, rather than restrictions to the practical implementations.

For example, a first symbol (or a first group of symbols) for representing the serve mode may be arranged in the first area 581, and a second symbol (or a second group of symbols) for representing the clean mode may be arranged in the second area 582.

For another example, a first color (e.g., blue, green, purple, or the like) for representing the serve mode may be filled in part or all of the first area 581, and a second color (e.g., yellow, orange, red, or the like) for representing the clean mode may be filled in part or all of the second area 582.

The first window 781 and the second window 782 are respectively positioned on different portions of the rotatable element 380. In practice, each of the first window 781 and the second window 782 may be realized with an opening or a notch with appropriate shape and size. In this embodiment, for example, the first window 781 and the second window

782 are realized with openings respectively located near the left side and the right side of the first fin 485 as shown in FIG. 8 and FIG. 21.

As described previously, the bended plate 370 is positioned between the inner surface of the rotatable element 380 and the outer surface of the rear portion 340 when the dual-mode fluid connector 150 is completely assembled. Therefore, a part of the outer surface of the bended plate 370 is exposed from the first window 781 and/or the second window 782, so that the user can see the part of the outer surface of the bended plate 370 through the first window 781 and/or the second window 782.

In addition, when the rotating direction and rotating angle of the rotatable element 380 vary, different area of the outer surface of the bended plate 370 will be exposed from the first window 781 and/or the second window 782.

In this embodiment, for example, when the user rotates the rotatable element 380 to a status where the first window 781 faces upward, the first marked region 471 of the bended plate 370 will be exposed from the first window 781, and when the user rotates the rotatable element 380 to a status where the second window 782 faces upward, the second marked region 473 of the bended plate 370 will be exposed from the second window 782.

As can be appreciated from the foregoing descriptions, when the dual-mode fluid connector 150 is completely assembled, the spring 350 is positioned between the rear portion 340 and the outer flange 465 and the outer flange 467 of the rod 360, the rod 360 engages with the rotatable element 380, the bended plate 370 is positioned between the rear portion 340 and the rotatable element 380, the rotatable element 380 covers on the rear portion 340 and the bended plate 370, and the plug 390 is plugged into the slot 469 of the rod 360 and engages with the rear opening 482 of the rotatable element 380.

In addition, a part of the outer surface of the bended plate 370 is exposed from the first window 781 and/or the second window 782 of the rotatable element 380. Moreover, when the rotatable element 380 is rotated by the user, the rotatable element 380 drives the rod 360 to rotate together and to move forward or backward together.

The aforementioned hollow connecting element 310, material tube 322, cleaning tube 324, head portion 330, and rear portion 340 collectively form a connector main body of the dual-mode fluid connector 150. In practice, the hollow connecting element 310, the material tube 322, the cleaning tube 324, the head portion 330, and the rear portion 340 may be integrally formed to increase the structural rigidity of the connector main body of the dual-mode fluid connector 150.

As described previously, the dual-mode fluid connector 150 has two operation modes, which are the serve mode and the clean mode. The user (e.g., the cleaner or the operator of the fluid material dispensing apparatus 100) may rotate the rotatable element 380 to easily switch the dual-mode fluid connector 150 between the serve mode and the clean mode.

When the user wants to set the dual-mode fluid connector 150 to the serve mode, the user may rotate the rotatable element 380 toward a first predetermined direction (e.g., a clockwise direction). In this situation, the rotatable element 380 moves forward while rotating and drives the rod 360 to move forward together, so that the sealing portion 463 of the rod 360 abuts the block element 415 in the chamber 411 and causes the rod head 461 to push the stopper 242 of the outlet check valve 140 inward. As described previously, while the rod 360 or the rotatable element 380 moves toward the head portion 330, the outer flange 465 and the outer flange 467 of the rod 360 or the block portion 489 inside the rotatable element 380 compresses the spring 350.

In this embodiment, when the rotatable element 380 is rotated to a status where the first area 581 faces upward, the rod 360 will move forward for a predetermined distance due to the driving of the rotatable element 380, so as to ensure that the cleaning tube 324 and the first space 412 in the chamber 411 will be separated and isolated with each other by the sealing portion 463 and the block element 415, and to ensure that the rod head 461 of the rod 360 pushes the stopper 242 inward for an enough distance to render the output terminal of the outlet check valve 140 to become the open status.

Figure 23:
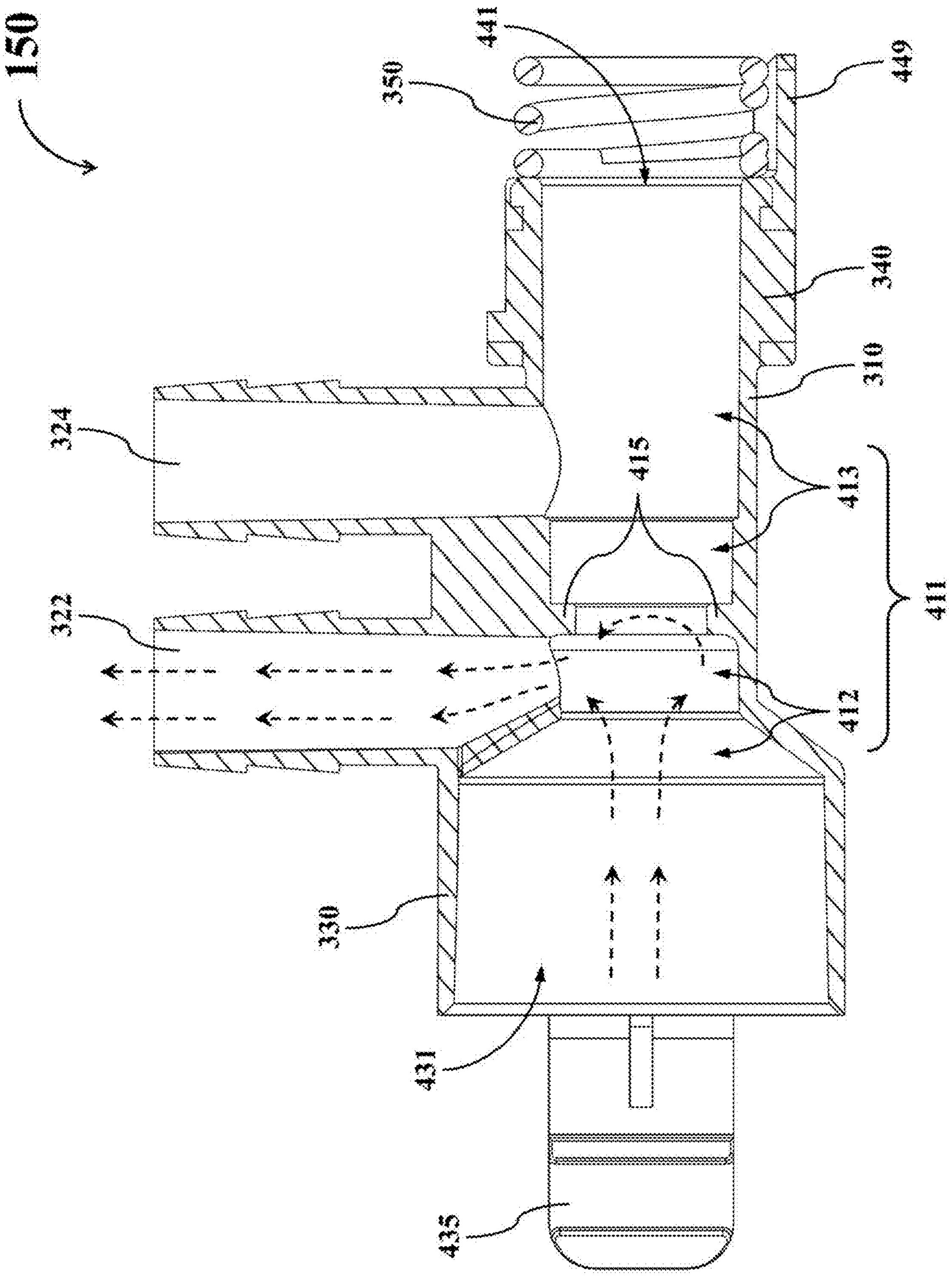
FIG. 23 shows a simplified schematic diagram illustrating the internal liquid flow direction of the dual-mode fluid connector operating in the serve mode according to one embodiment of the present disclosure.

Please refer to FIG. 23, which shows a simplified schematic diagram illustrating the internal liquid flow direction of the dual-mode fluid connector 150 operating in the serve mode according to one embodiment of the present disclosure. The broken lines are utilized to show the possible flow direction of the fluid material in the dual-mode fluid connector 150 in FIG. 23.

As shown in FIG. 23, when the dual-mode fluid connector 150 operates in the serve mode, the fluid materials in the material container 130 is enabled to flow into the first space 412 of the hollow connecting element 310 through the outlet check valve 140, but the fluid materials in the material container 130 cannot flow into the second space 413 of the hollow connecting element 310 due to the blocking of the sealing portion 463 of the rod 360. Therefore, the fluid material received by the dual-mode fluid connector 150 can only flow into the material tube 322 and the material transmission pipe 152 connected to the material tube 322 through the hollow connecting element 310, but cannot flow into the second space 413 in the chamber 411, the cleaning tube 324, and the detergent transmission pipe 154 connected to the cleaning tube 324 through the hollow connecting element 310.

In this situation, even if there is residual cleaning solution in the cleaning tube 324 and the detergent transmission pipe 154, the residual cleaning solution will not contaminate the fluid material in the first space 412 of the hollow connecting element 310, thus the cleaning solution will not affect the fluid material output by the material tube 322.

In addition, as described previously, the block wall portion 447 is positioned on the end section of the first spiral track 443 of the rear portion 340. When the rotatable element 380 drives the rod 360 to move forward and renders the sealing portion 463 to abut the block element 415, the first guiding element 487 of the rotatable element 380 will enter the end section of the first spiral track 443 and render the block wall portion 447 to engage with the first guiding element 487. In practice, the end section of the first spiral track 443 may be designed to be a straight track. In this situation, the block wall portion 447 positioned on the end section of the first spiral track 443 has a planar appearance. Since the block wall portion 447 blocks the first guiding element 487, the clastic restoring force of the spring 350 is unable to push the rod 360 backward. Therefore, the presence of the block wall portion 447 can effectively prevent the sealing portion 463 of the rod 360 from detaching from the block element 415 due to the impact of the fluid material. In this way, it can be ensured that when the dual-mode fluid connector 150 operates in the serve mode, the first space 412 and the second space 413 in the chamber 411 can be kept isolated, so as to prevent the fluid material from erroneously flowing into the cleaning tube 324.

On the other hand, when the user rotates the rotatable element 380 toward the aforementioned first predetermined direction to a certain extent, the first elongated portion 483 of the rotatable element 380 will engage with the first restriction element 416 of the hollow connecting element 310 to avoid the rotatable element 380 from continuing to rotate toward the first predetermined direction. Such design can prevent the rotatable element 380 from being over-rotated by the user, thereby preventing the rod 360 from moving forward excessively.

If the rod 360 moves forward excessively, it may cause the sealing portion 463 of the rod 360 to be stuck in the opening formed by the block element 415 or even to penetrate the opening formed by the block element 415. Once the sealing portion 463 of the rod 360 is stuck in the opening formed by the block element 415 or penetrates the opening formed by the block element 415, it may cause malfunction of the dual-mode fluid connector 150 or may cause damage to the sealing portion 463.

Therefore, the cooperation of the aforementioned first elongated portion 483 and first restriction element 416 can effectively restrict the rotation angle of the rotatable element 380, thereby limiting the forward distance of the rod 360. In this way, it can prevent the user's improper manipulation of over-rotating the rotatable element 380, thus reducing the possibility of malfunction of the dual-mode fluid connector 150 or the possibility of damaging the scaling portion 463.

Similar to the traditional machine, the fluid material dispensing apparatus 100 also requires to conduct cleaning procedure, disinfectant procedure, and/or sterilization procedure at appropriate time points, so as to prevent the components, pipes, and/or connectors of the fluid material dispensing apparatus 100 from growing bacteria or generating toxins.

As described previously, when cleaning the traditional beverage preparing machine, the cleaner has to manually remove multiple connectors from different material containers one by one and then to manually clean or utilize other assisting equipment to clean the related components, multiple pipes, and multiple connectors. When the cleaning procedure is completed, multiple connectors shall be manually connected between corresponding material containers and pipes by the cleaner one by one. The aforementioned approach of manually removing multiple connectors one by one and finally connecting the multiple connectors back one by one not only consumes a lot of labor time, but also easily makes the surrounding environment dirty during removing the connectors, and usually causes the connectors to be scratched or even damaged.

In order to prevent the aforementioned problems, the dual-mode fluid connector 150 is designed to enable the user to perform the cleaning procedure, disinfectant procedure, and/or sterilization procedure on the dual-mode fluid connector 150 and the fluid material dispensing apparatus 100 without removing the dual-mode fluid connector 150 from the outlet check valve 140 of the material container 130.

Figure 24:
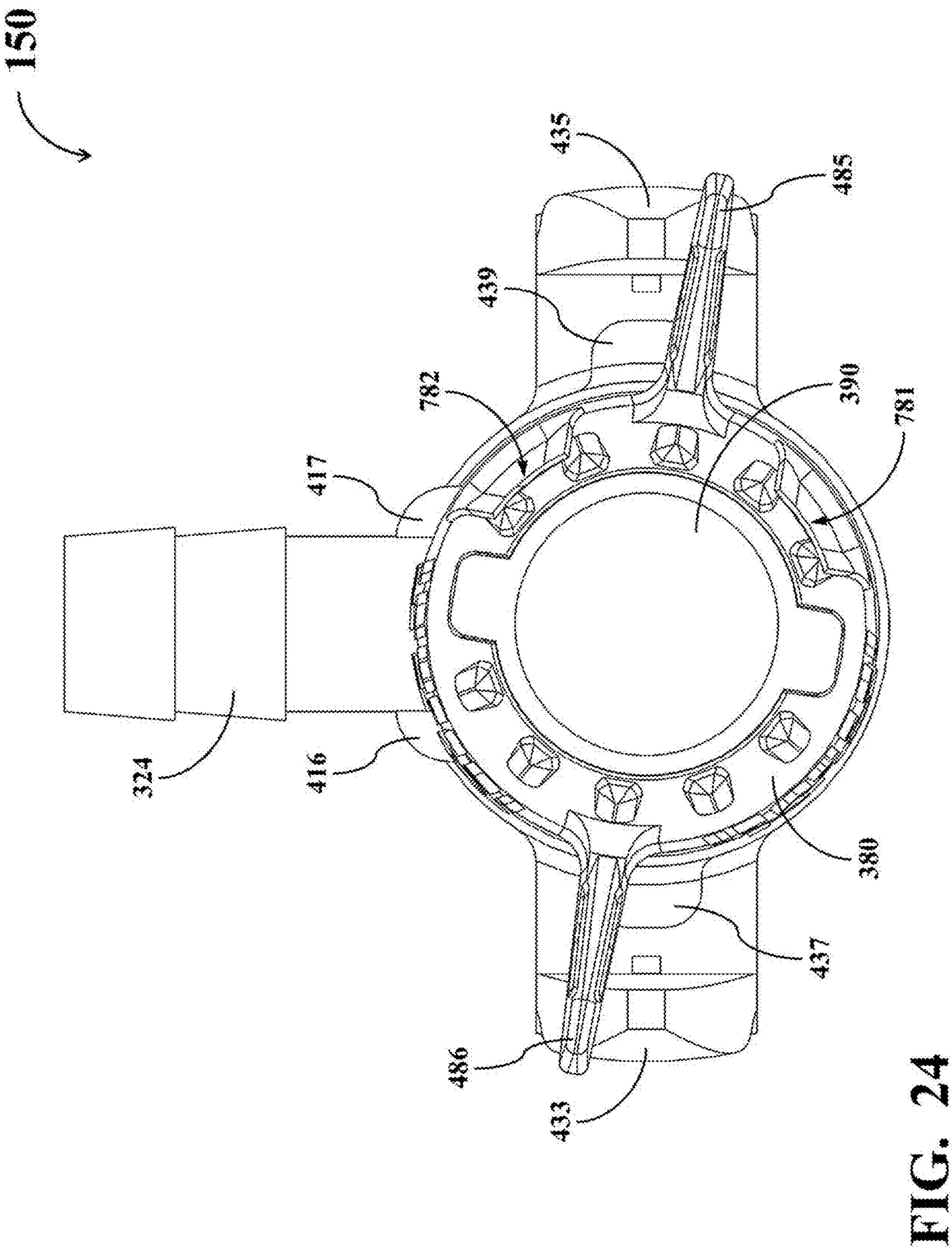
FIG. 24 shows a schematic rear view diagram of the dual-mode fluid connector operating in a clean mode according to one embodiment of the present disclosure.
Figure 25:
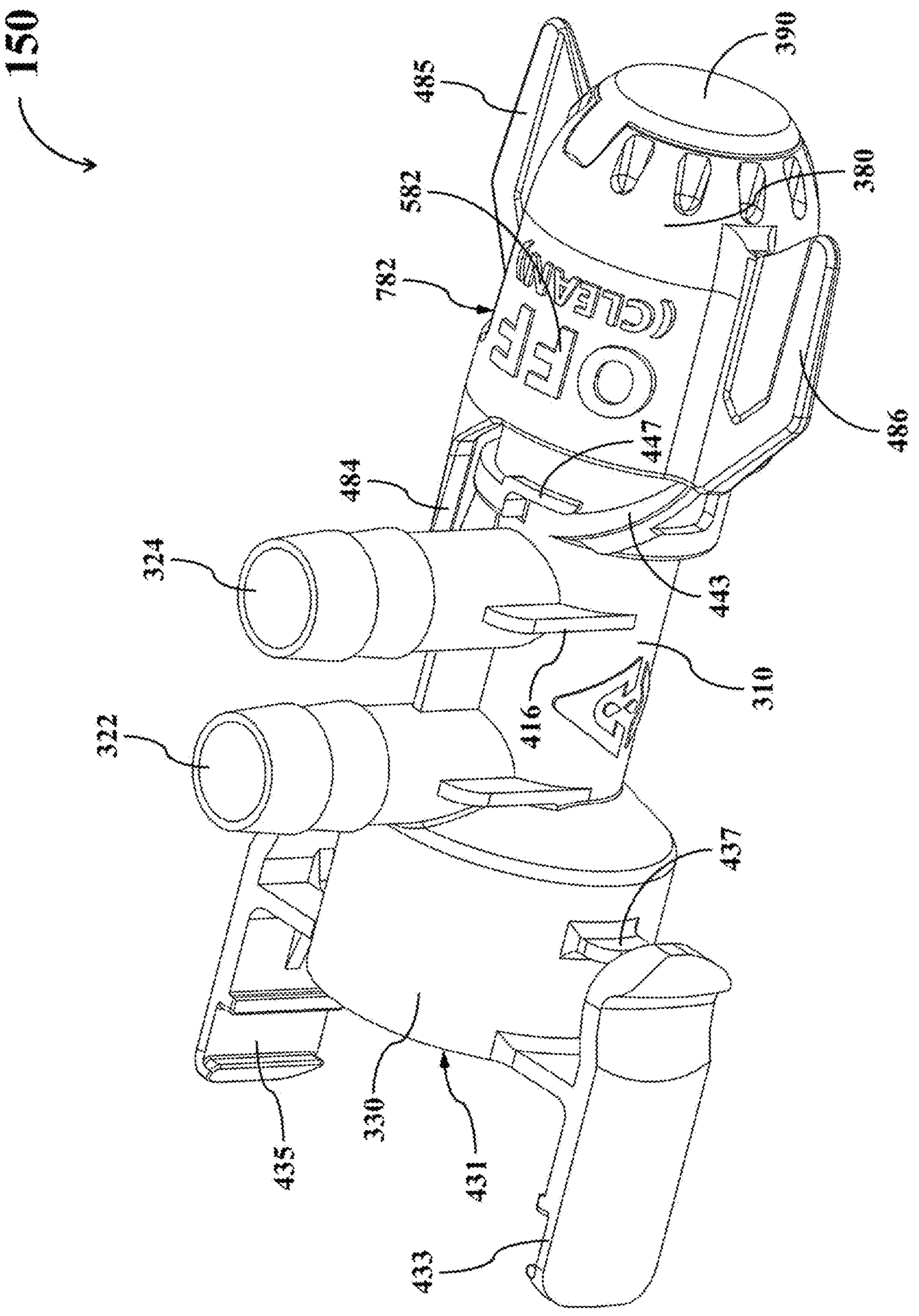
FIG. 25 and FIG. 26 show simplified schematic diagrams of the dual-mode fluid connector operating in the clean mode from different viewing angles according to one embodiment of the present disclosure.
Figure 26:
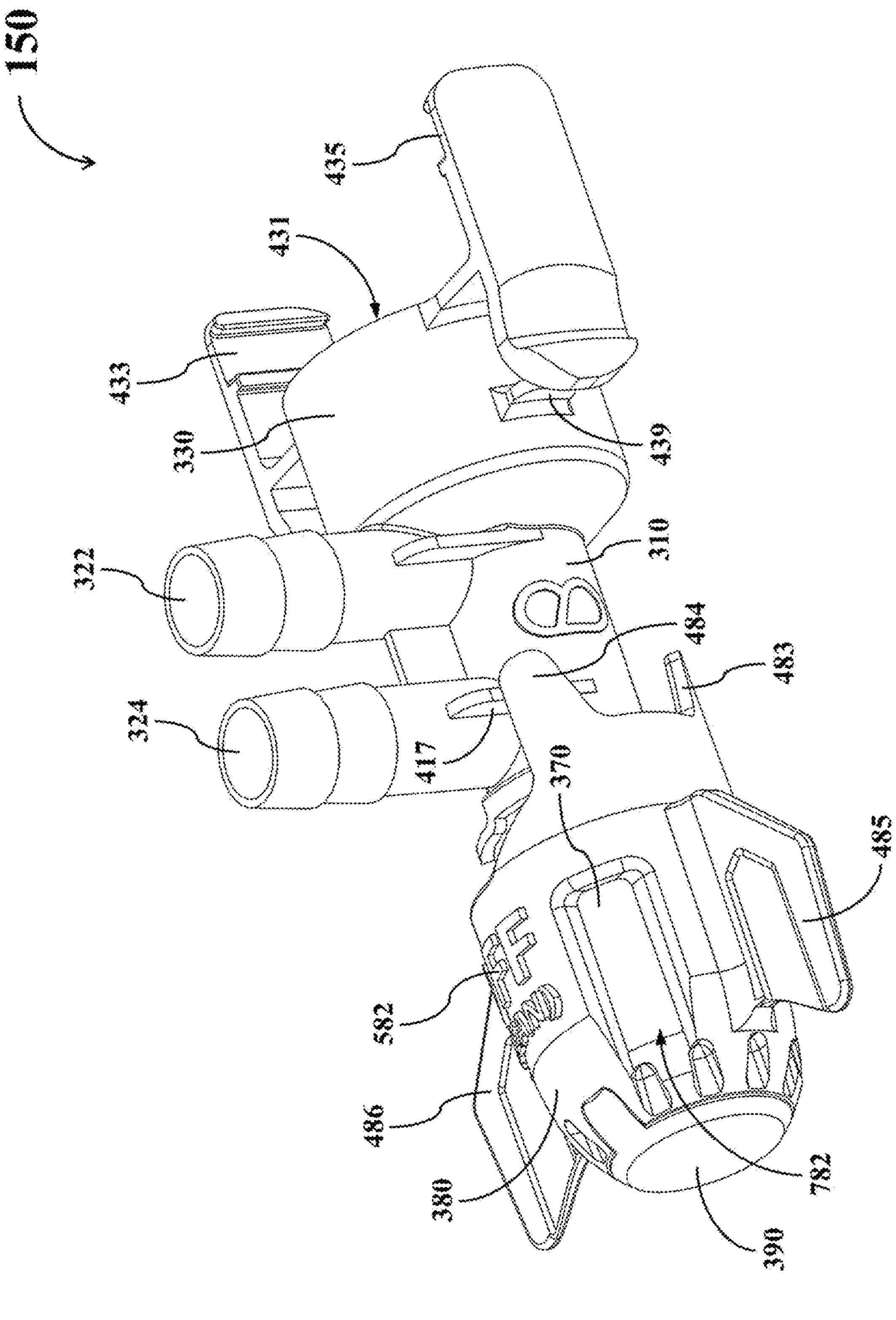
Figure 27:
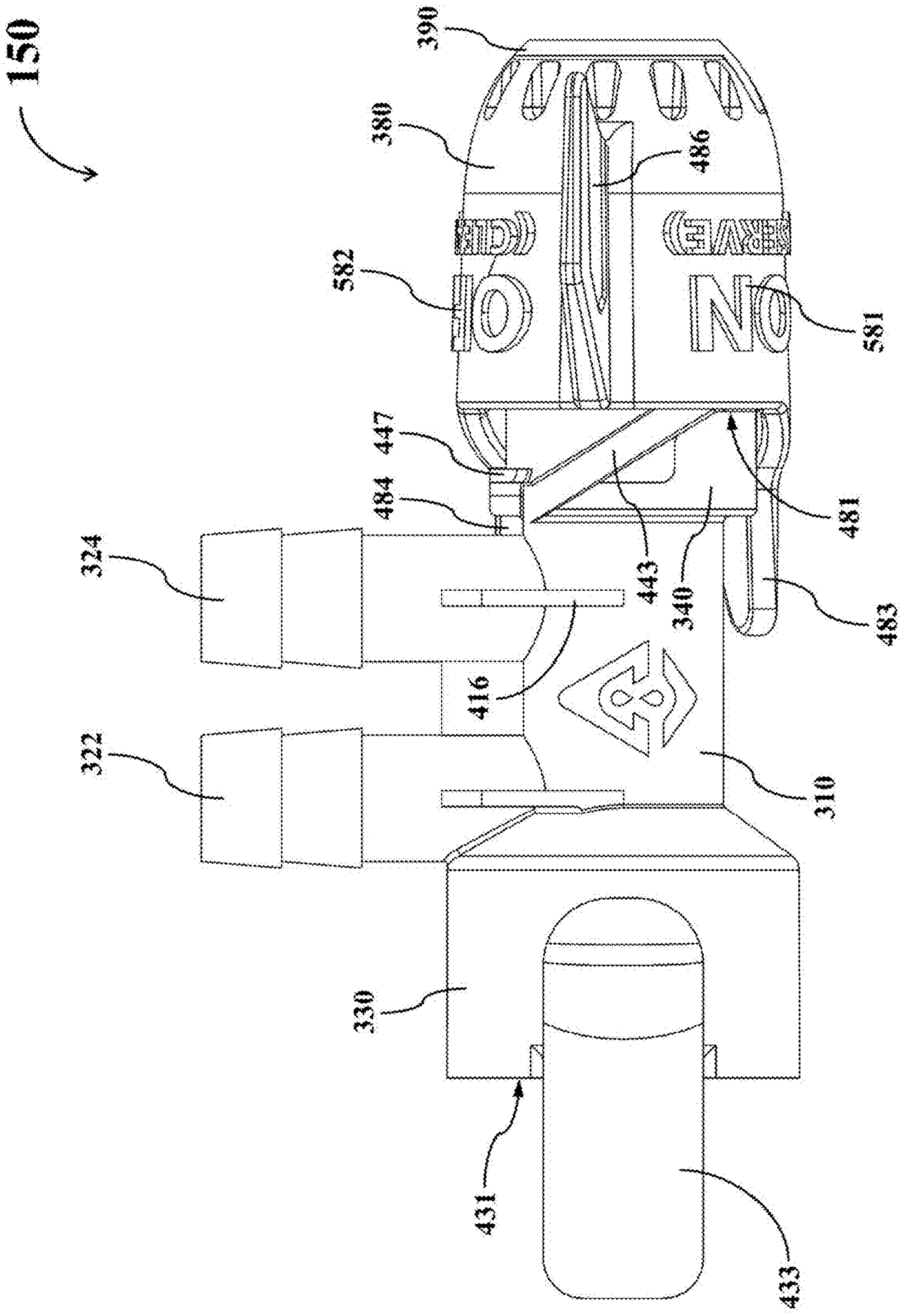
FIG. 27 shows a schematic side view diagram of the dual-mode fluid connector operating in the clean mode according to one embodiment of the present disclosure.
Figure 28:
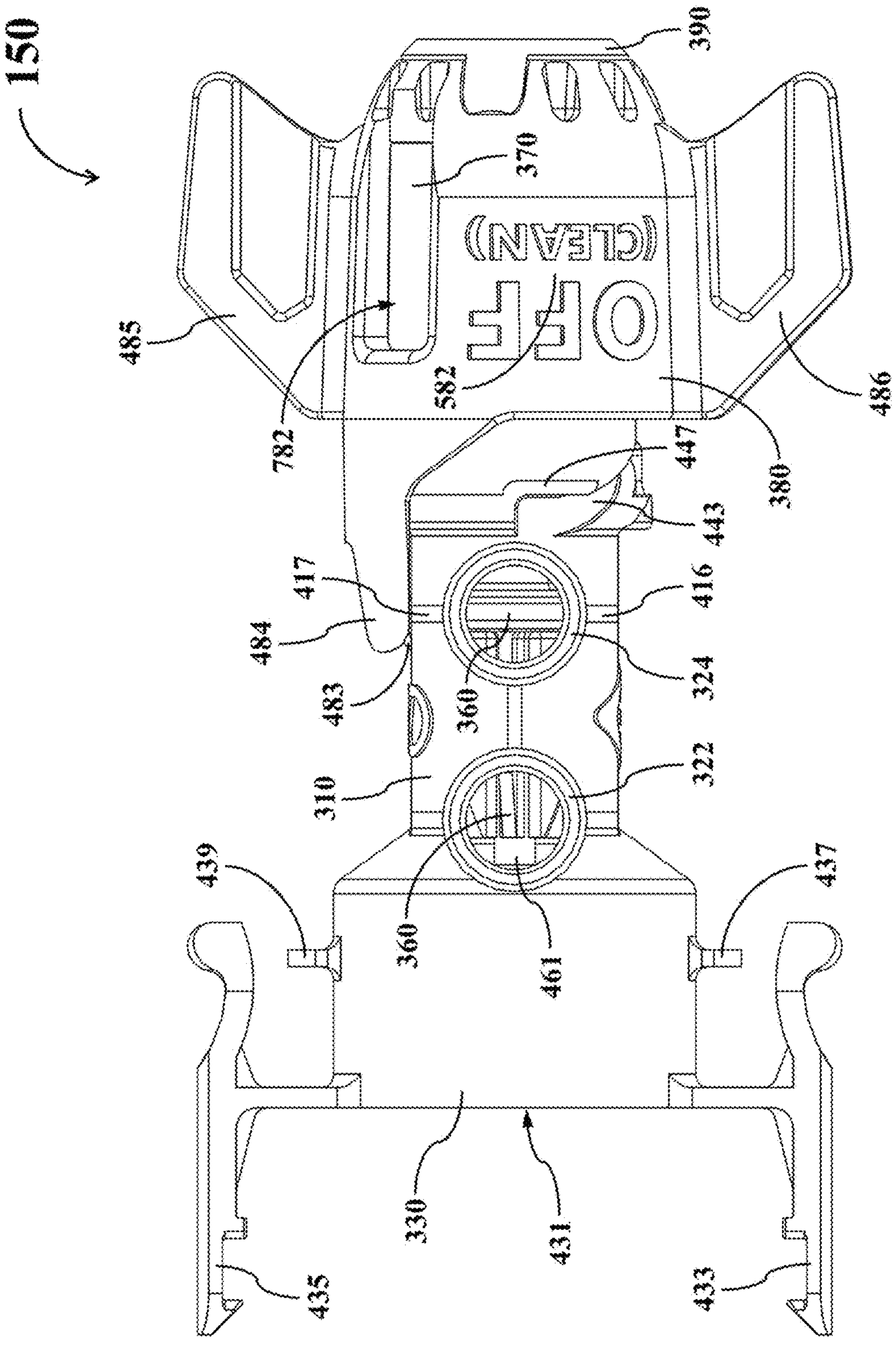
FIG. 28 shows a schematic top view diagram of the dual-mode fluid connector operating in the clean mode according to one embodiment of the present disclosure.

The operations of setting the dual-mode fluid connector 150 to the clean mode will be further described below by reference to FIG. 24 through FIG. 30. FIG. 24 shows a schematic rear view diagram of the dual-mode fluid connector 150 operating in a clean mode according to one embodiment of the present disclosure. FIG. 25 and FIG. 26 show simplified schematic diagrams of the dual-mode fluid connector 150 operating in the clean mode from different viewing angles according to one embodiment of the present disclosure. FIG. 27 shows a schematic side view diagram of the dual-mode fluid connector 150 operating in the clean mode according to one embodiment of the present disclosure. FIG. 28 shows a schematic top view diagram of the dual-mode fluid connector 150 operating in the clean mode according to one embodiment of the present disclosure.

As shown in FIG. 24, when the user wants to set the dual-mode fluid connector 150 in the clean mode, the user may rotate the rotatable element 380 toward a second predetermined direction (e.g., a counterclockwise direction). In this situation, the rotatable element 380 moves backward while rotating and drives the rod 360 to move backward together, so that the rod head 461 of the rod 360 disengages the stopper 242 of the outlet check valve 140 and causes the scaling portion 463 of the rod 360 to detach from the block element 415 in the chamber 411.

After the rod head 461 disengages the stopper 242, the spring (not shown in the figures) inside the outlet check valve 140 resumes the stopper 242 to its original position so that the output terminal of the outlet check valve 140 resumes to the close status. In addition, after the sealing portion 463 is detached from the block element 415 for a predetermined distance, the first space 412 in the chamber 411 and the cleaning tube 324 will be enabled to connect to each other through the second space 413.

As shown in FIG. 25 through FIG. 28, when the rotatable element 380 is rotated to a status where the second area 582 faces upward, the rod 360 will move backward for a predetermined distance due to the driving of the rotatable element 380, so as to ensure that the rod head 461 of the rod 360 disengages the stopper 242, and to ensure that the sealing portion 463 and the block element 415 are separated for enough distance, so that the cleaning solution, bactericide, disinfectant solution, water, or the like, is enabled to flow smoothly between the first space 412 and the second space 413 in the chamber 411.

Figure 29:
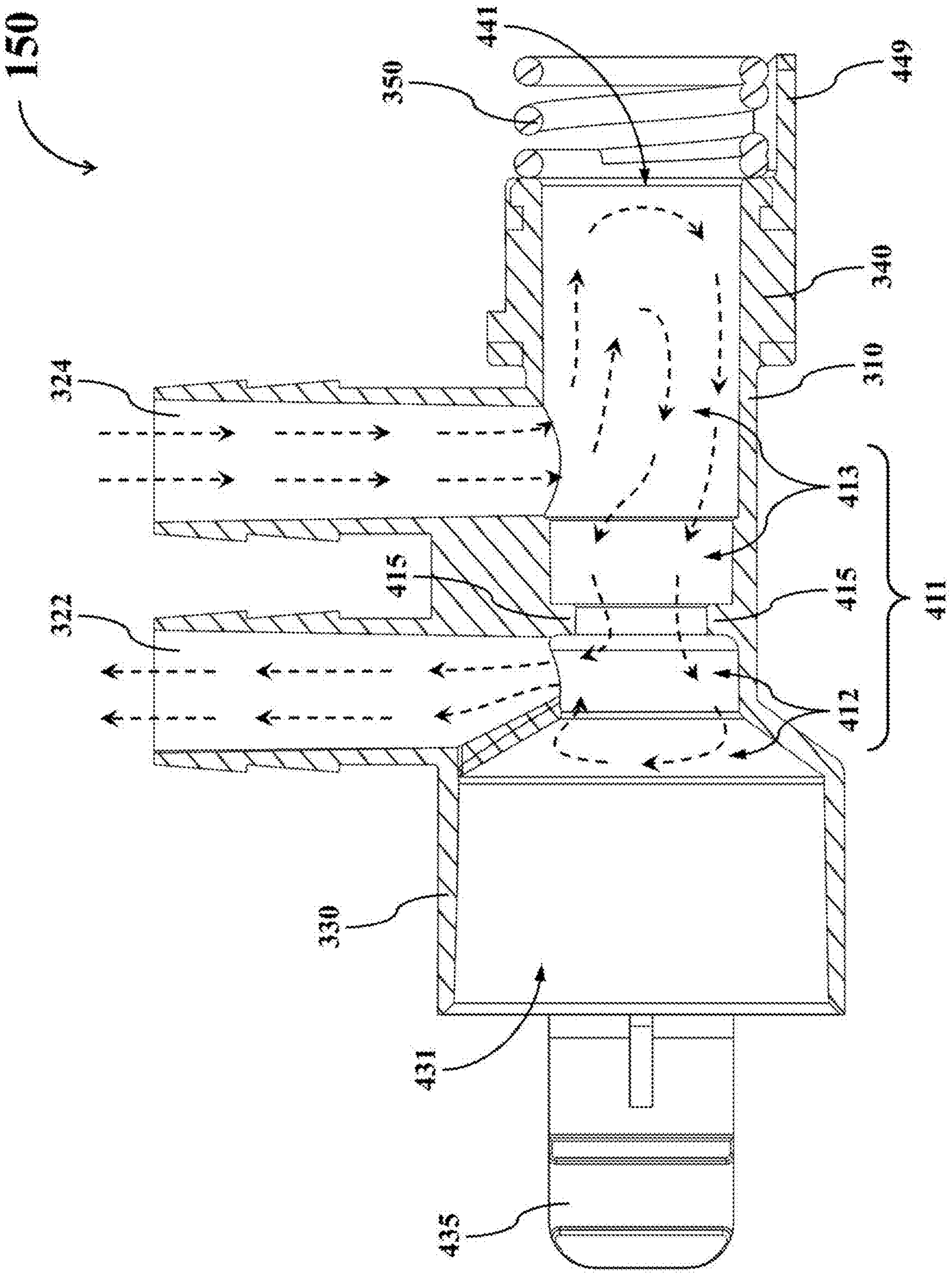
FIG. 29 shows a simplified schematic diagram illustrating the internal liquid flow direction of the dual-mode fluid connector operating in the clean mode according to one embodiment of the present disclosure.
Figure 30:
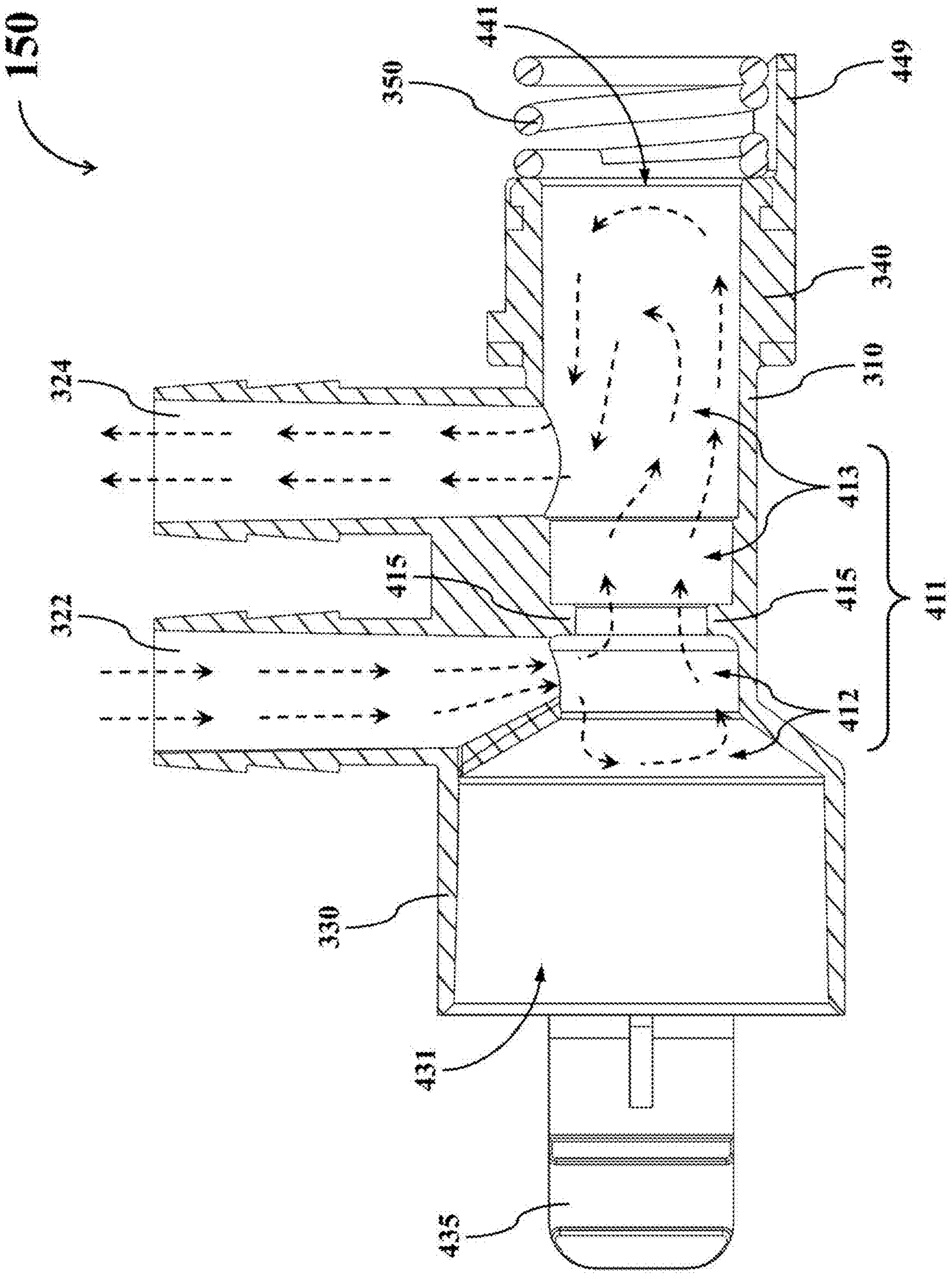
FIG. 30 shows a simplified schematic diagram illustrating the internal liquid flow direction of the dual-mode fluid connector operating in the clean mode according to another embodiment of the present disclosure.

Please refer to FIG. 29 and FIG. 30. FIG. 29 shows a simplified schematic diagram illustrating the internal liquid flow direction of the dual-mode fluid connector 150 operating in the clean mode according to one embodiment of the present disclosure. FIG. 30 shows a simplified schematic diagram illustrating the internal liquid flow direction of the dual-mode fluid connector 150 operating in the clean mode according to another embodiment of the present disclosure. To simplify the drawings, the rod 360, the bended plate 370, and the rotatable element 380 of the dual-mode fluid connector 150 are omitted in FIG. 29 and FIG. 30. The broken lines shown in FIG. 29 and FIG. 30 are utilized to show the possible flow direction of the liquid, such as cleaning solution, bactericide, disinfectant solution, water, or the like, in the dual-mode fluid connector 150.

In the embodiment of FIG. 29, when the dual-mode fluid connector 150 operates in the clean mode, the liquid, such as cleaning solution, bactericide, disinfectant solution, water, or the like, is enabled to flow into the second space 413 of the hollow connecting element 310 through the cleaning tube 324. The liquid, such as cleaning solution, bactericide, disinfectant solution, water, or the like, entered into the second space 413 may flow into the first space 412 through the opening formed by the block element 415, and then may flow into the material tube 322 and the material transmission pipe 152 connected to the material tube 322 through the first space 412.

In the embodiment of FIG. 30, when the dual-mode fluid connector 150 operated in the clean mode, the liquid, such as cleaning solution, bactericide, disinfectant solution, water, or the like, is enabled to flow into the first space 412 of the hollow connecting element 310 through the material tube 322. The liquid, such as cleaning solution, bactericide, disinfectant solution, water, or the like, entered into the first space 412 may flow into the second space 413 through the opening formed by the block element 415, and then may flow into the cleaning tube 324 and the detergent transmission pipe 154 connected to the cleaning tube 324 through the second space 413.

In other words, in the embodiment of FIG. 29 and FIG. 30, when the dual-mode fluid connector 150 is switched to the clean mode, the material tube 322, the material transmission pipe 152, the cleaning tube 324, the detergent transmission pipe 154, and the dual-mode fluid connector 150 are enabled to collectively form a cleaning loop.

In this situation, the fluid material dispensing apparatus 100 may utilize related internal components to deliver and circulate the liquid, such as cleaning solution, bactericide, disinfectant solution, water, or the like, in the aforementioned cleaning loop, so as to conduct the cleaning procedure, disinfectant procedure, and/or sterilization procedure to the dual-mode fluid connector 150 and the related pipes, components, and connectors in the fluid material dispensing apparatus 100. When the aforementioned cleaning procedure, disinfectant procedure, and/or sterilization procedure is completed, the fluid material dispensing apparatus 100 may utilize appropriate pipes to discharge related waste liquid. In this way, it can achieve an automatic self-cleaning procedure, an automatic self-disinfectant procedure, and/or an automatic self-sterilization procedure for the dual-mode fluid connector 150 and the related pipe, components, and connectors in the fluid material dispensing apparatus 100.

In practice, the operation of delivering and circulating the liquid, such as cleaning solution, bactericide, disinfectant solution, water, or the like, in the aforementioned cleaning loop may be performed simply in accordance with the liquid flow direction shown in FIG. 29, may be performed simply in accordance with the liquid flow direction shown in FIG. 30, may be performed in accordance with the liquid flow direction shown in FIG. 29 and the liquid flow direction shown in FIG. 30 in turns, and may be performed alternatively in accordance with the liquid flow direction shown in FIG. 29 and FIG. 30. The detailed operation of the automatic self-cleaning procedure, the automatic self-disinfectant procedure, and/or the automatic self-sterilization procedure conducted by the fluid material dispensing apparatus 100 will be further described in the following descriptions.

If the dual-mode fluid connector 150 is replaced with a traditional one-way connector, it will be difficult for the fluid material dispensing apparatus 100 to conduct the aforementioned automatic self-cleaning procedure, automatic self-disinfectant procedure, and automatic self-sterilization procedure. Obviously, the presence of the aforementioned dual-mode fluid connector 150 is very helpful in realizing the functionalities of automatic self-cleaning, automatic self-disinfection, and/or automatic self-sterilization for the fluid material dispensing apparatus 100.

Please note that during the whole cleaning procedure, disinfectant procedure, and/or sterilization procedure elaborated above, the user does not need to detach the material tube 322 of the dual-mode fluid connector 150 from the currently connected pipe, and does not need to detach the cleaning tube 324 of the dual-mode fluid connector 150 from the currently connected pipe, nor does the user need to detach the dual-mode fluid connector 150 from the outlet check valve 140 of the material container 130.

Therefore, when the cleaning procedure, disinfectant procedure, and/or sterilization procedure is completed, the user does not need to reconnect the material tube 322 of the dual-mode fluid connector 150 to the corresponding pipe, and does not need to reconnect the cleaning tube 324 of the dual-mode fluid connector 150 to the corresponding pipe, nor does the user need to reconnect the dual-mode fluid connector 150 to the outlet check valve 140 of the corresponding material container 130.

As can be appreciated from the foregoing descriptions, such mechanism not only significantly reduces the burden of the user, but also prevents fouling the surrounding environment, and reduces the possibility of that the dual-mode fluid connector 150 is scratched or even damaged.

As described previously, indication texts (e.g., "ON" and "SERVE"), indication symbols, indication images, and/or indication colors (e.g., blue, green, purple, or the like) for representing the serve mode may be arranged on the first area 581, while indication texts (e.g., "OFF" and "CLEAN"), indication symbols, indication images, and/or indication colors (e.g., yellow, orange, red, or the like) for representing the clean mode may be arranged on the second area 582. As can be appreciated from the foregoing descriptions, when the user rotates the rotatable element 380 to a status where the first area 581 faces upward, the dual-mode fluid connector 150 operates in the serve mode as shown in FIG. 5 through FIG. 8. When the user rotates the rotatable element 380 to a status where the second area 582 faces upward, the dual-mode fluid connector 150 operates in the clean mode as shown in FIG. 25 through FIG. 28.

Therefore, when the user sees that the rotatable element 380 is in the status where the first area 581 faces upward, the user can quickly understand that the current operation mode of the dual-mode fluid connector 150 is the serve mode. Similarly, when the user sees that the rotatable element 380 is in the status where the second area 582 faces upward, the user can quickly understand that the current operation mode of the dual-mode fluid connector 150 is the clean mode.

On the other hand, as described previously, indication texts, indication symbols, indication images, and/or indication color (e.g., blue, green, purple, or the like) for representing the serve mode may be arranged on the first marked region 471 of the bended plate 370, while indication texts, indication symbols, indication images, and/or indication color (e.g., yellow, orange, red, or the like) for representing the clean mode may be arranged on the second marked region 473. When the rotation direction and rotation angle of the rotatable element 380 varies, different regions of the outer surface of the bended plate 370 will be exposed from the first window 781 and/or the second window 782.

As shown in FIG. 5, FIG. 7 and FIG. 8, when the user rotates the rotatable element 380 to the status where the first window 781 faces upward, the first marked region 471 is exposed from the first window 781, and the dual-mode fluid connector 150 operates in the serve mode. As shown in FIG. 25, FIG. 26, and FIG. 28, when the user rotates the rotatable element 380 to the status where the second window 782 faces upward, the second marked region 473 is exposed from the second window 782, and the dual-mode fluid connector 150 operates in the clean mode.

Therefore, when the user sees that the rotatable element 380 is in the status where the first window 781 faces upward and the first marked region 471 is exposed from the first window 781, the user can quickly understand that the current operation mode of the dual-mode fluid connector 150 is the serve mode. Similarly, when the user sees that the rotatable element 380 is in the status where the second window 782 faces upward and the second marked region 473 is exposed from the second window 782, the user can quickly understand that the current operation mode of the dual-mode fluid connector 150 is the clean mode.

In this embodiment, the aforementioned spring 350 has another functionality. As described previously, when the user wants to set the dual-mode fluid connector 150 to the clean mode, the user may rotate the rotatable element 380 toward the aforementioned second predetermined direction. After the user rotates the rotatable element 380 to cause the first guiding element 487 to depart from the block wall portion 447, if the user releases the rotatable element 380 and does not continue to rotate the rotatable element 380 toward the aforementioned second predetermined direction, the elastic restoring force of the spring 350 will automatically push the rod 360 or the rotatable element 380 backward, so that the rotatable element 380 moves backward while rotating until the second elongated portion 484 engages with the second restriction element 417. Accordingly, after the first guiding element 487 departs from the block wall portion 447, if the user does not continue to manipulate the rotatable element 380, then the elastic restoring force of the spring 350 will automatically rotate the rotatable element 380 to the status where the second area 582 faces upward (or to the status where the second window 782 faces upward and the second marked region 473 is exposed from the second window 782).

In other words, after the first guiding element 487 departs from the block wall portion 447, if the user does not continue to manipulate the rotatable element 380, the spring 350 of this embodiment will utilize its elastic restoring force to automatically switch the dual-mode fluid connector 150 to the clean mode. Such mechanism can effectively avoid the dual-mode fluid connector 150 from operating in a grey area between the serve mode and the clean mode due to that the user did not rotate the rotatable element 380 to an appropriate angle.

On the other hand, as shown in FIG. 26 and FIG. 28, when the user or the spring 350 rotates the rotatable element 380 toward the aforementioned second predetermined direction to a certain extent, the second elongated portion 484 of the rotatable element 380 engages with the second restriction element 417 on the hollow connecting element 310 to prevent the rotatable element 380 from continuing to rotate toward the second predetermined direction. Such design can prevent the rotatable element 380 from being over-rotated by the user or the spring 350, thereby preventing the rod 360 from moving backward excessively.

If the rod 360 moves backward excessively, it may cause the rotatable element 380 to detach from the rear portion 340. Once the rotatable element 380 detaches from the rear portion 340, it may cause the liquid in the chamber 411 of the dual-mode fluid connector 150 to leak out from the through hole 441 of the rear portion 340.

Therefore, the cooperation of the aforementioned second elongated portion 484 and second restriction element 417 can effectively restrict the rotation angle of the rotatable element 380, thereby preventing the rotatable element 380 from accidentally detaching from the rear portion 340. As a result, it can prevent the user's improper manipulation of over-rotating the rotatable element 380, thereby reducing the problem of that the liquid in the chamber 411 leaks out from the through hole 441 of the rear portion 340.

As can be appreciated from the foregoing descriptions, the design of the aforementioned dual-mode fluid connector 150 enables the user to easily switch the dual-mode fluid connector 150 between two different operation modes by rotating the rotatable element 380. Such design is not only convenient in operation, but also very intuitive.

During the cleaning procedure, disinfectant procedure, and/or sterilization procedure of the dual-mode fluid connector 150, the user does not need to detach the material tube 322 of the dual-mode fluid connector 150 from the currently connected pipe, and does not need to detach the cleaning tube 324 of the dual-mode fluid connector 150 from the currently connected pipe, nor does the user need to detach the dual-mode fluid connector 150 from the outlet check valve 140 of the material container 130.

Therefore, when the cleaning procedure, disinfectant procedure, and/or sterilization procedure is completed, the user does not need to reconnect the material tube 322 to the corresponding pipe, and does not need to reconnect the cleaning tube 324 to the corresponding pipe, nor does the user need to reconnect the dual-mode fluid connector 150 to the outlet check valve 140 of the corresponding material container 130. Therefore, it can effectively save a lot of labor time, and would not easily foul the surrounding environment, and can effectively prevent the connector from being scratched or even damaged.

In addition, when the dual-mode fluid connector 150 is switched to the clean mode, the material tube 322, the material transmission pipe 152, the cleaning tube 324, the detergent transmission pipe 154, and the dual-mode fluid connector 150 are enabled to collectively form a cleaning loop. In this situation, the fluid material dispensing apparatus 100 may deliver and circulate the liquid, such as cleaning solution, bactericide, disinfectant solution, water, or the like, in the aforementioned cleaning loop, so as to conduct the cleaning procedure, disinfectant procedure, and/or sterilization procedure to the dual-mode fluid connector 150 and the related pipes, components, and connectors in the fluid material dispensing apparatus 100. In this way, an automatic self-cleaning procedure, an automatic self-disinfectant procedure, and/or an automatic sterilization procedure for the dual-mode fluid connector 150 and the related pipes, components, and connectors in the fluid material dispensing apparatus 100 can be achieved.

If the dual-mode fluid connector 150 is replaced with a traditional one-way connector, it will be difficult for the fluid material dispensing apparatus 100 to conduct the aforementioned automatic self-cleaning procedure, automatic self-disinfectant procedure, and automatic sterilization procedure. Obviously, the presence of the aforementioned dual-mode fluid connector 150 is very helpful in realizing the functionalities of automatic self-cleaning, automatic self-disinfection, and/or automatic sterilization for the fluid material dispensing apparatus 100.

Please note that the quantity, shape, or position of some components in the aforementioned dual-mode fluid connector 150 may be modified depending on the requirement of practical applications, rather than being restricted to the pattern shown in the aforementioned embodiments.

For example, the shape, width, and/or diameter of the aforementioned hollow connecting element 310, head portion 330, and rear portion 340 may be modified depending on the requirement of practical applications. In some embodiments, the diameter and inner diameter of the hollow connecting element 310 may be designed to be the same as the diameter or inner diameter of the head portion 330, or may be designed to be larger than the diameter or inner diameter of the head portion 330. In other embodiments, the diameter or inner diameter of the hollow connecting element 310 may be designed to be larger than the diameter or inner diameter of the rear portion 340, or may be designed to be smaller than the diameter or inner diameter of the rear portion 340.

For another example, in some embodiments, the spring 350 may be omitted.

For yet another example, the rod 360 may be directly integrated in the rotatable element 380 by using various appropriate approaches. In this situation, the block portion 489 of the rotatable element 380 may be omitted.

For yet another example, the plug 390 may be directly integrated in the rotatable element 380 by using various appropriate approaches. In this situation, the rear opening 482 and the block portion 489 of the rotatable element 380 may be omitted.

For yet another example, the aforementioned first restriction element 416 and/or the second restriction element 417 of the hollow connecting element 310 may be omitted. In this situation, it may simply utilize the cleaning tube 324 to act as the first restriction element 416 and/or the second restriction element 417.

For yet another example, the shape, length, and/or width of the aforementioned first clamp element 433 and second clamp element 435 may be modified depending on the requirement of practical applications.

For yet another example, the aforementioned first clamp element 433 and second clamp element 435 may be instead connected to the outside of the hollow connecting element 310.

For yet another example, the aforementioned first clamp element 433 or second clamp element 435 may be omitted. In this situation, the corresponding first protruding element 437 or second protruding element 439 may be omitted.

For yet another example, in some embodiments where the connection stability between the head portion 330 and the outlet check valve 140 is sufficient, the aforementioned first clamp element 433 and second clamp element 435 may be omitted. In this situation, the corresponding first protruding element 437 and second protruding element 439 may be omitted.

For yet another example, the aforementioned first protruding element 437 and/or second protruding element 439 on the head portion 330 may be omitted. In this situation, the rear portion of the corresponding first clamp element 433 or second clamp element 435 may be shortened or omitted.

For yet another example, the aforementioned first spiral track 443 on the rear portion 340 may be modified to be a first straight track perpendicular to the block wall portion 447, the aforementioned second spiral track 445 may be modified to be a second straight track parallel to the first straight track, and the first straight track and the second straight track may be respectively arranged on two opposite sides of the outer surface of the rear portion 340. In this embodiment, when the user wants to set the dual-mode fluid connector 150 to the serve mode, the user may push the rotatable element 380 toward the head portion 330. In this situation, the first guiding element 487 and the second guiding element 488 of the rotatable element 380 are respectively moved forward along the first straight track and the second straight track, and the rotatable element 380 drives the rod 360 to move straight forward at the same time, so that the sealing portion 463 of the rod 360 abuts the block element 415 in the chamber 411 and renders the rod head 461 to push the stopper 242 of the outlet check valve 140 inward. While the rod 360 or the rotatable element 380 moves toward the head portion 330, the outer flange 465 and the outer flange 467 of the rod 360 or the block portion 489 inside the rotatable element 380 compresses the spring 350. When the first guiding element 487 of the rotatable element 380 reaches a position beside the block wall portion 447, the user may rotate the rotatable element 380 so that the block wall portion 447 engages with the first guiding element 487. In this way, it can be ensured that when the dual-mode fluid connector 150 operates in the serve mode, the first space 412 and the second space 413 of the chamber 411 can be kept isolated, so as to prevent the liquid material from erroneously flowing into the cleaning tube 324.

For yet another example, the aforementioned second spiral track 445 and/or second straight track of the rear portion 340 may be omitted. In this situation, the second guiding element 488 of the rotatable element 380 may be omitted.

For yet another example, the aforementioned outer flange 465 and/or outer flange 467 of the rod 360 may be omitted.

For yet another example, the aforementioned slot 469 of the rod 360 may be omitted. In this situation, the shape of the plug 390 may be adaptively modified, or the rear opening 482 of the rotatable element 380 may be omitted.

For yet another example, the aforementioned first elongated portion 483 and/or second elongated portion 484 of the rotatable element 380 may be omitted.

For yet another example, the aforementioned first fin 485 and/or second fin 486 of the rotatable element 380 may be omitted.

For yet another example, the aforementioned first area 581 and/or second area 582 of the rotatable element 380 may be omitted.

For yet another example, the aforementioned first window 781 or second window 782 of the rotatable element 380 may be omitted. In this situation, the first marked region 471 or the second marked region 473 of the bended plate 370 may be omitted.

For yet another example, the aforementioned first window 781 and second window 782 of the rotatable element 380 may be omitted. In this situation, the first marked region 471 and the second marked region 473 of the bended plate 370 may be omitted, or the entire bended plate 370 may be omitted.

As described previously, the disclosed fluid material dispensing apparatus 100 is enabled to conduct the automatic self-cleaning procedure, the automatic self-disinfectant procedure, and/or the automatic sterilization procedure so as to prevent the components, pipes, and/or connectors of the fluid material dispensing apparatus 100 from growing bacteria or generating toxins.

When conducting the cleaning procedure, the disinfectant procedure, and/or the sterilization procedure, the fluid material dispensing apparatus 100 may simultaneously conduct the related automatic self-cleaning procedure, automatic self-disinfectant procedure, and/or automatic sterilization procedure to the components, pipes, and/or connectors connected to all of the outlet connectors 110. Alternatively, the fluid material dispensing apparatus 100 may conduct the automatic self-cleaning procedure, the automatic self-disinfectant procedure, and/or the automatic sterilization procedure to only the components, pipes, and/or connectors connected to part of the outlet connectors 110 according to the user's manipulation (e.g., the manipulation made by the cleaner or the operator of the fluid material dispensing apparatus 100).

In order to further demonstrate the usage flexibility of the fluid material dispensing apparatus 100, an application scenario where the user requires the fluid material dispensing apparatus 100 to conduct the automatic self-cleaning procedure, the automatic self-disinfectant procedure, and/or the automatic sterilization procedure to only the components, pipes, and/or connectors connected to part of the outlet connectors 110 will be described in the following.

The user may switch the related dual-mode fluid connectors 150 corresponding to the pipes to be cleaned into the clean mode, and may place a diversion device 890 on a predetermined position of the working platform 102 (e.g., a position beneath the aforementioned multiple outlet connectors 110). In addition, the user may select the outlet connector 110 or pipe to be cleaned by manipulating the control panel 109, may put an appropriate amount or a specific amount of detergent (e.g., cleaning powder, cleaning lozenge, cleaning capsule, cleaning concentrate, or the like) into the cleaning sink 170, and may put an appropriate amount or a specific amount of disinfectant (e.g., disinfectant powder, disinfectant lozenge, disinfectant capsule, disinfectant concentrate, or the like) into the disinfectant container 172.

Then, the fluid material dispensing apparatus 100 may begin to conduct the automatic self-cleaning procedure, the automatic self-disinfectant procedure, and/or the automatic sterilization procedure to the components, pipes, and/or connectors connected to the selected outlet connectors 110.

Figure 31:
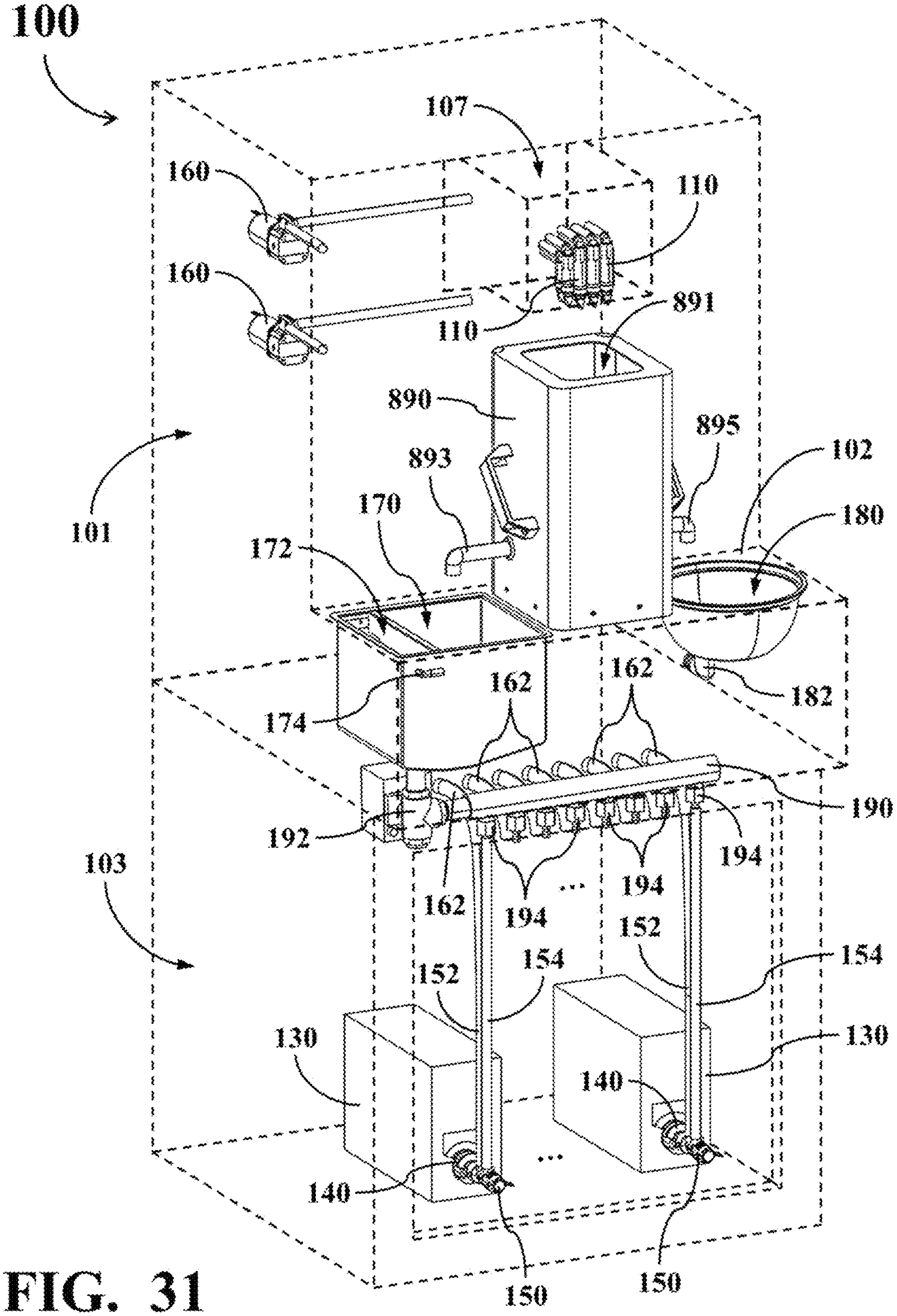
FIG. 31 shows a simplified schematic perspective diagram of the fluid material dispensing apparatus of FIG. 1 when conducting an automatic self-cleaning procedure.
Figure 32:
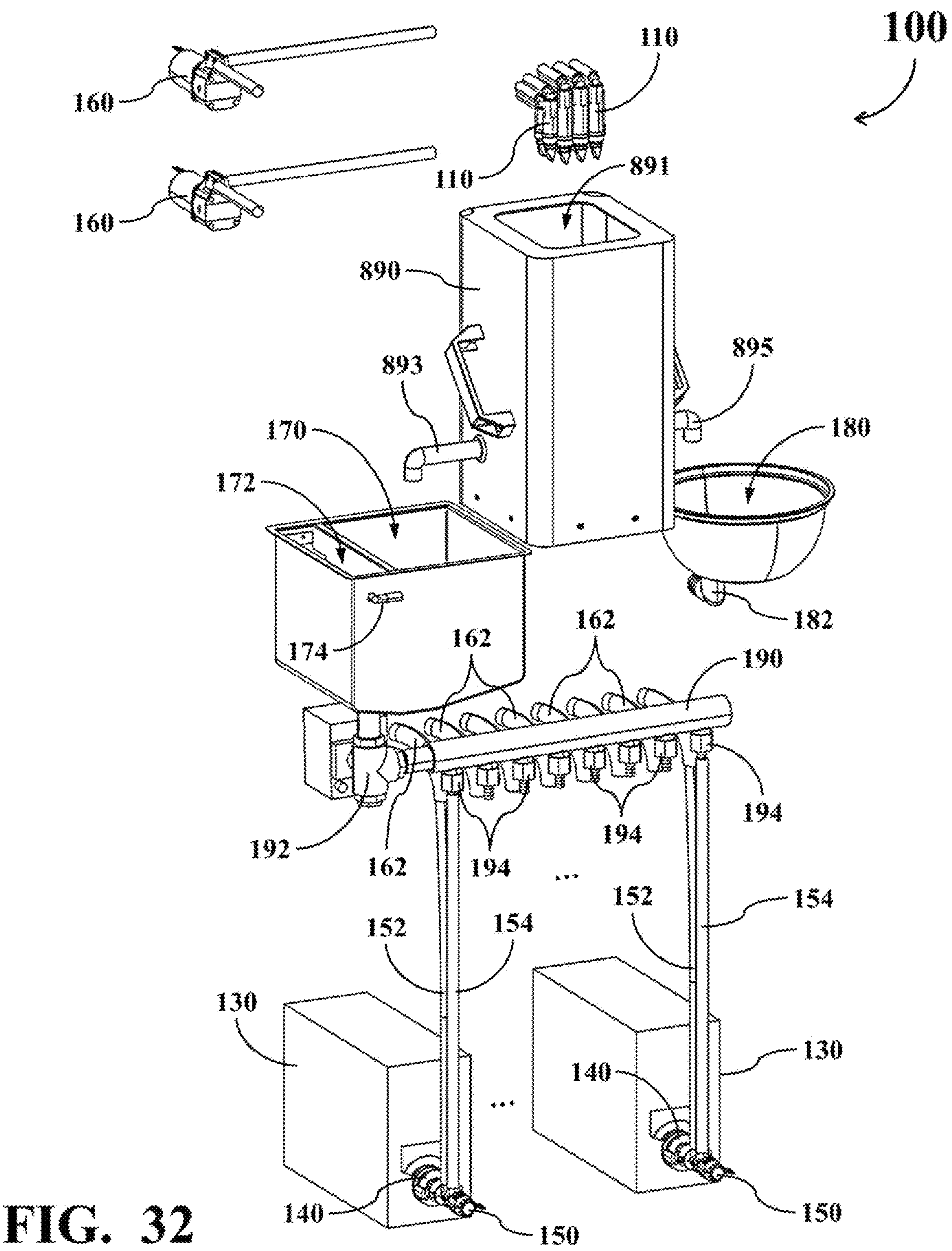
FIGS. 32-35 show simplified schematic diagrams of a spatial arrangement of some components involving in the automatic self-cleaning procedure from different viewing angles.

Please refer to FIG. 31 through FIG. 35. FIG. 31 shows a simplified schematic perspective diagram of the fluid material dispensing apparatus 100 when conducting the automatic self-cleaning procedure. FIG. 32 through FIG. 35 show simplified schematic diagrams of a spatial arrangement of some components involving in the automatic self-cleaning procedure from different viewing angles.

As shown in FIG. 31 through FIG. 35, the diversion device 890 of this embodiment comprises a fluid inlet 891, a first fluid outlet 893, and a second fluid outlet 895. The fluid inlet 891 may be utilized to receive liquid outputted from one or more outlet connectors 110 above the diversion device 890. The first fluid outlet 893 faces the cleaning sink 170 and may discharge the liquid in the diversion device 890 into the cleaning sink 170. The second fluid outlet 895 faces the drainage sink 180 and may discharge liquid in the diversion device 890 into the drainage sink 180.

In operations, the diversion device 890 may selectively direct a fluid output direction of the diversion device 890 to either the cleaning sink 170 or the drainage sink 180 under the control of the control panel 109 or the control circuit inside the fluid material dispensing apparatus 100.

For example, when the diversion device 890 sets the first fluid outlet 893 to a drainable status, the diversion device 890 will set the second fluid outlet 895 to a close status, so that the liquid in the diversion device 890 can be discharged into the cleaning sink 170 through the first fluid outlet 893, but not be discharged into the drainage sink 180 through the second fluid outlet 895. In other words, the fluid output direction of the diversion device 890 at this time is directed to the cleaning sink 170, not the drainage sink 180.

On the contrary, when the diversion device 890 sets the second fluid outlet 895 to the drainable status, the diversion device 890 will set the first fluid outlet 893 to the close status, so that the liquid in the diversion device 890 can be discharged into the drainage sink 180 through the second fluid outlet 895, but not be discharged into the cleaning sink 170 the first fluid outlet 893. In other words, the fluid output direction of the diversion device 890 at this time is directed to the drainage sink 180, not the cleaning sink 170.

In practice, various suitable components may be arranged in the diversion device 890 to realize the aforementioned functionality of selectively switching the fluid output direction. For example, an electric three-way valve connected to the first fluid outlet 893 and the second fluid outlet 895 may be arranged at bottom of the diversion device 890. For another example, two electric valves, two switches, two electric gates, or other components with similar functionality respectively corresponding to the first fluid outlet 893 and the second fluid outlet 895 may be arranged inside the diversion device 890.

In addition, the switching operation of the fluid output direction of the diversion device 890 may instead be controlled by other devices other than the fluid material dispensing apparatus 100.

For example, the switching operation of the fluid output direction of the diversion device 890 may instead be controlled by a wireless communication device (e.g., a cell phone or a laptop) or a remote control manipulated by the user. In this situation, a circuit capable of receiving control signal generated by the aforementioned wireless communication device or remote control has to be arranged within the diversion device 890.

For another example, a control button, a control switch, a control interface, or a control panel may be arranged on the diversion device 890, and the switching operation of the fluid output direction of the diversion device 890 may instead be controlled by the aforementioned control button, control switch, control interface, or control panel. In this situation, the user is enabled to manipulate the aforementioned control button, control switch, control interface, or control panel to control the switching operation of the fluid output direction of the diversion device 890.

Figure 33:
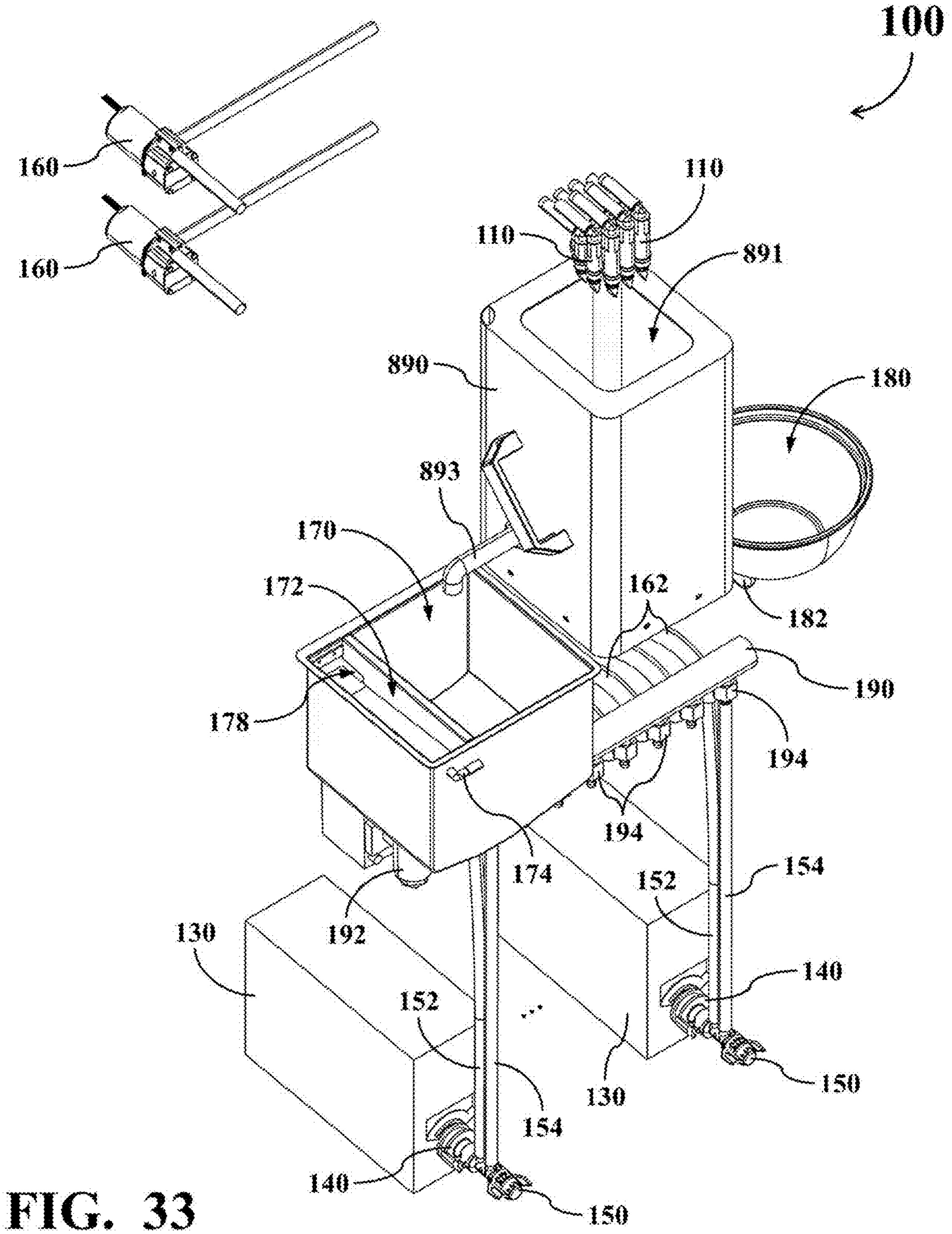
Figure 34:
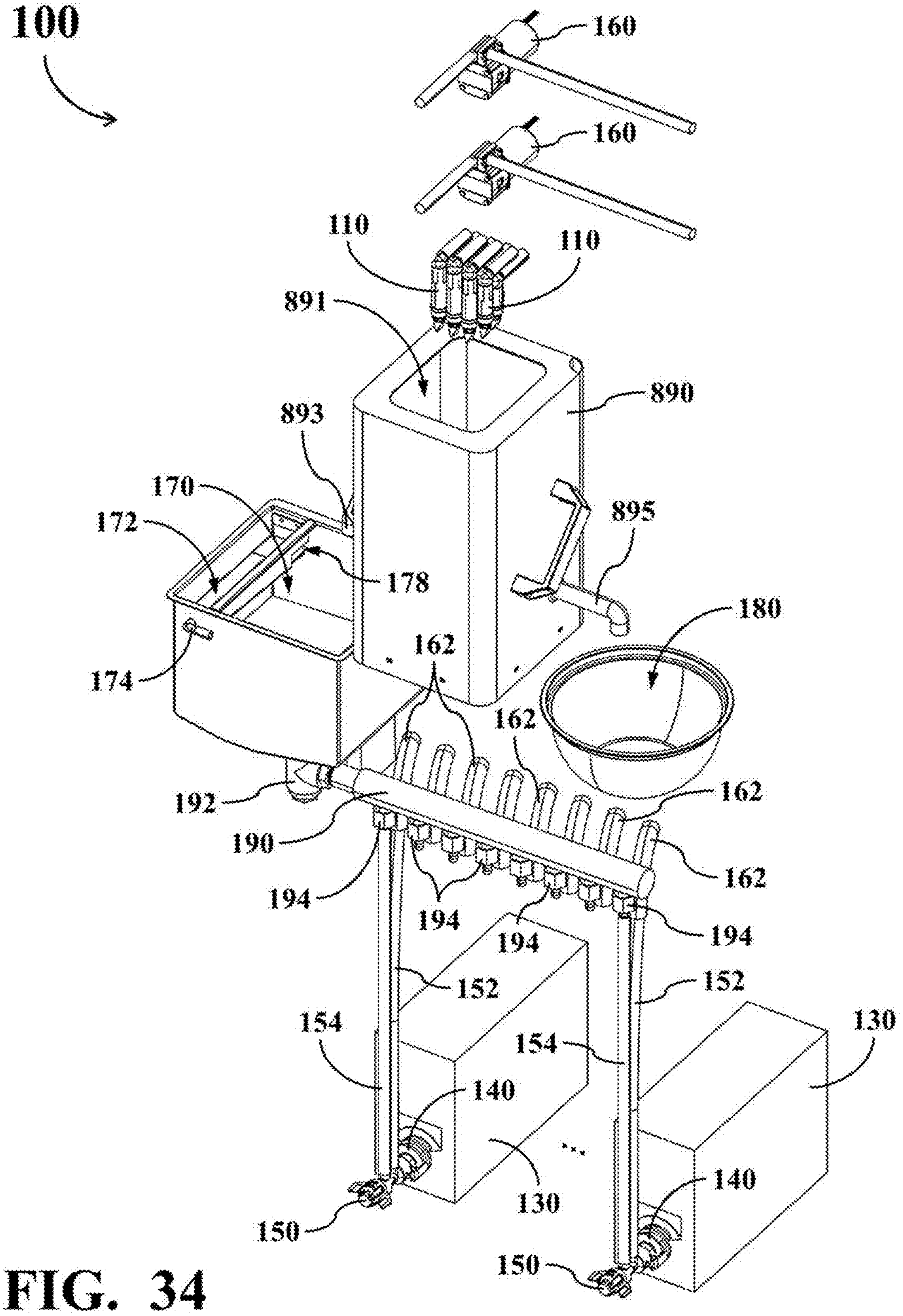
Figure 35:
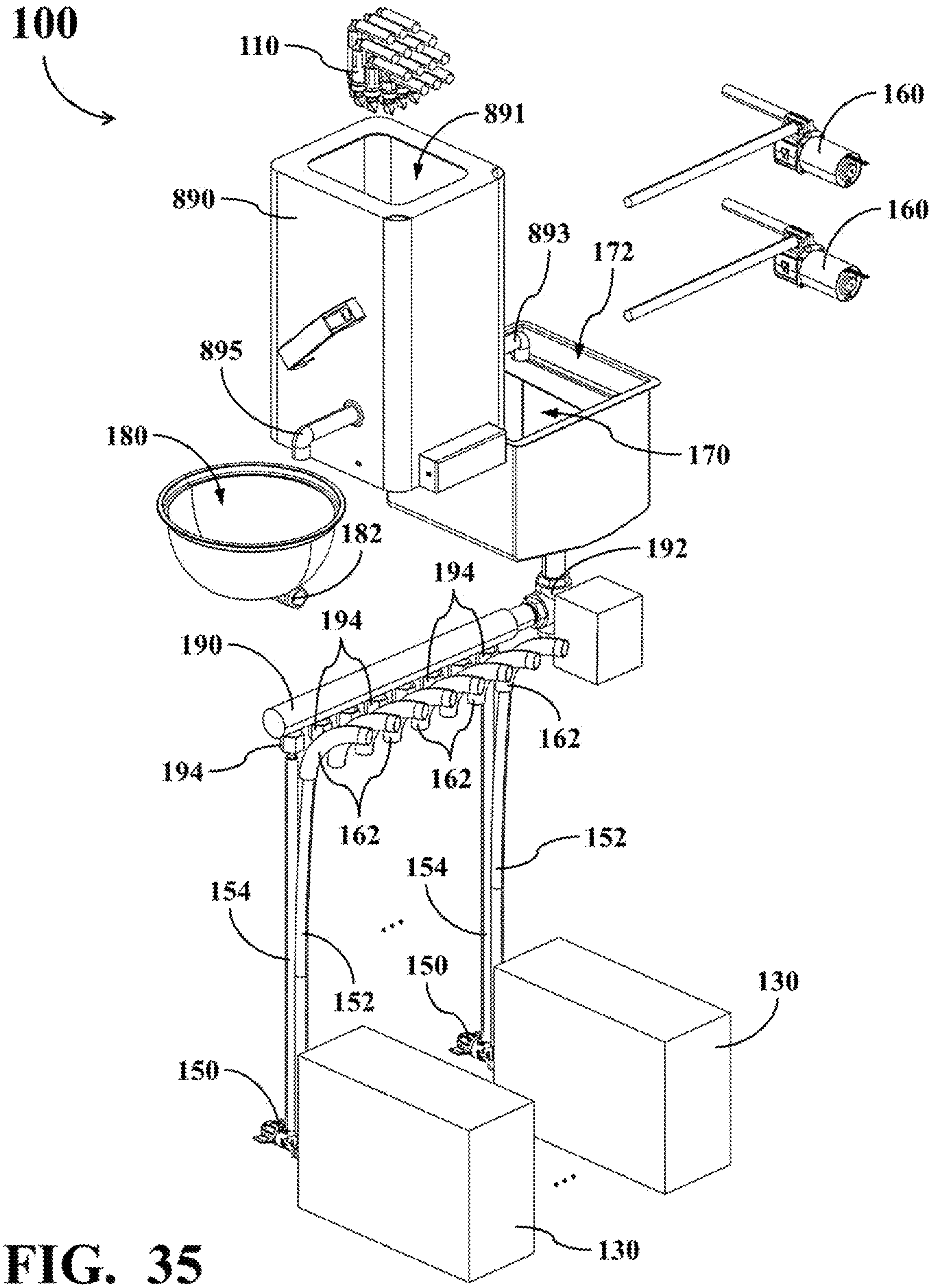

As shown in FIG. 33 and FIG. 34, the disinfectant container 172 comprises a connection hole 178, so that liquid in the disinfectant container 172 can be flow into the cleaning sink 170 through the connection hole 178. In practice, the connection hole 178 may be arranged on the side wall or at the bottom of the disinfectant container 172.

Figure 36:
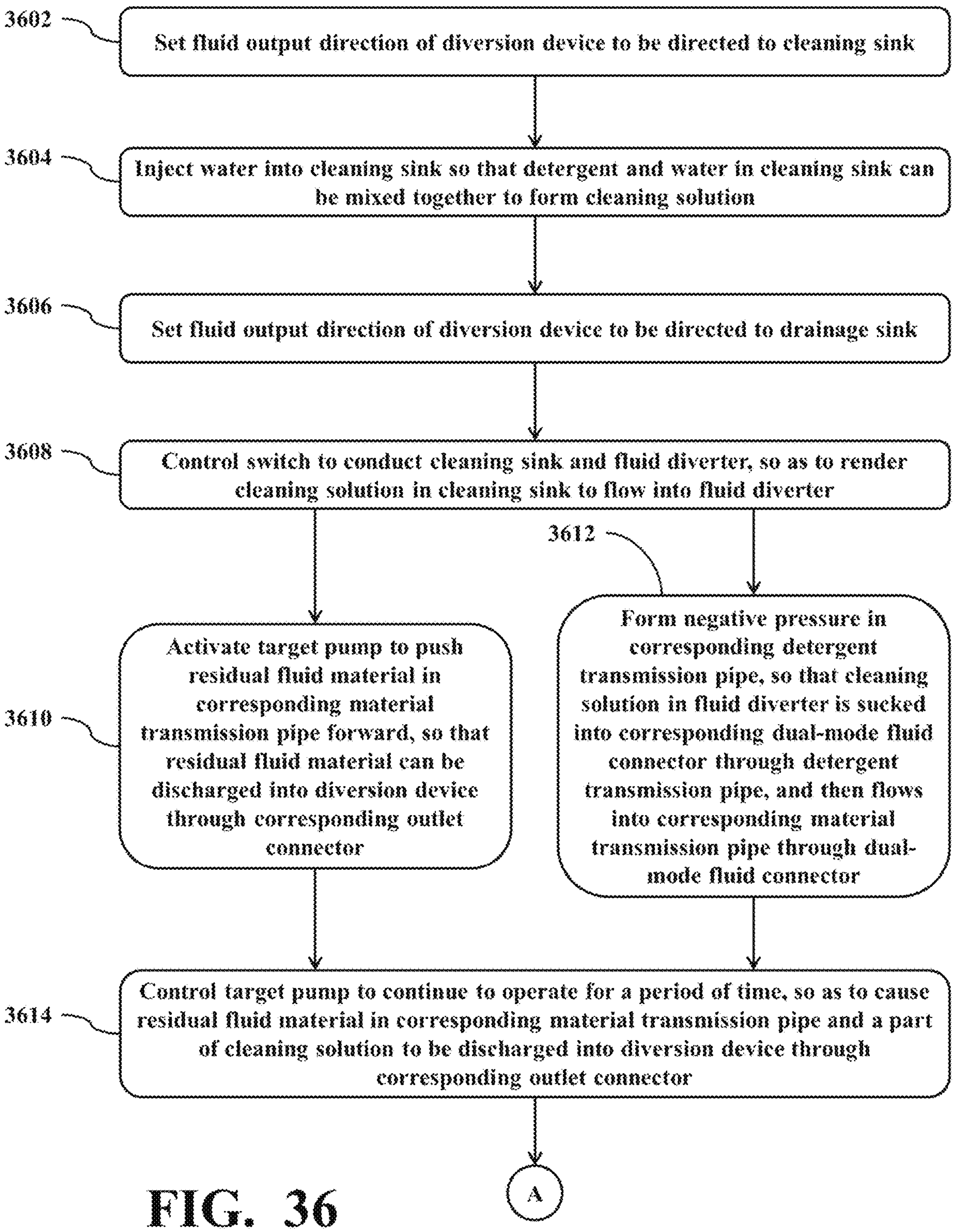
FIG. 36 through FIG. 37 collectively show a simplified flowchart of an automatic self-cleaning method adopted by the fluid material dispensing apparatus according to one embodiment of the present disclosure.
Figure 37:
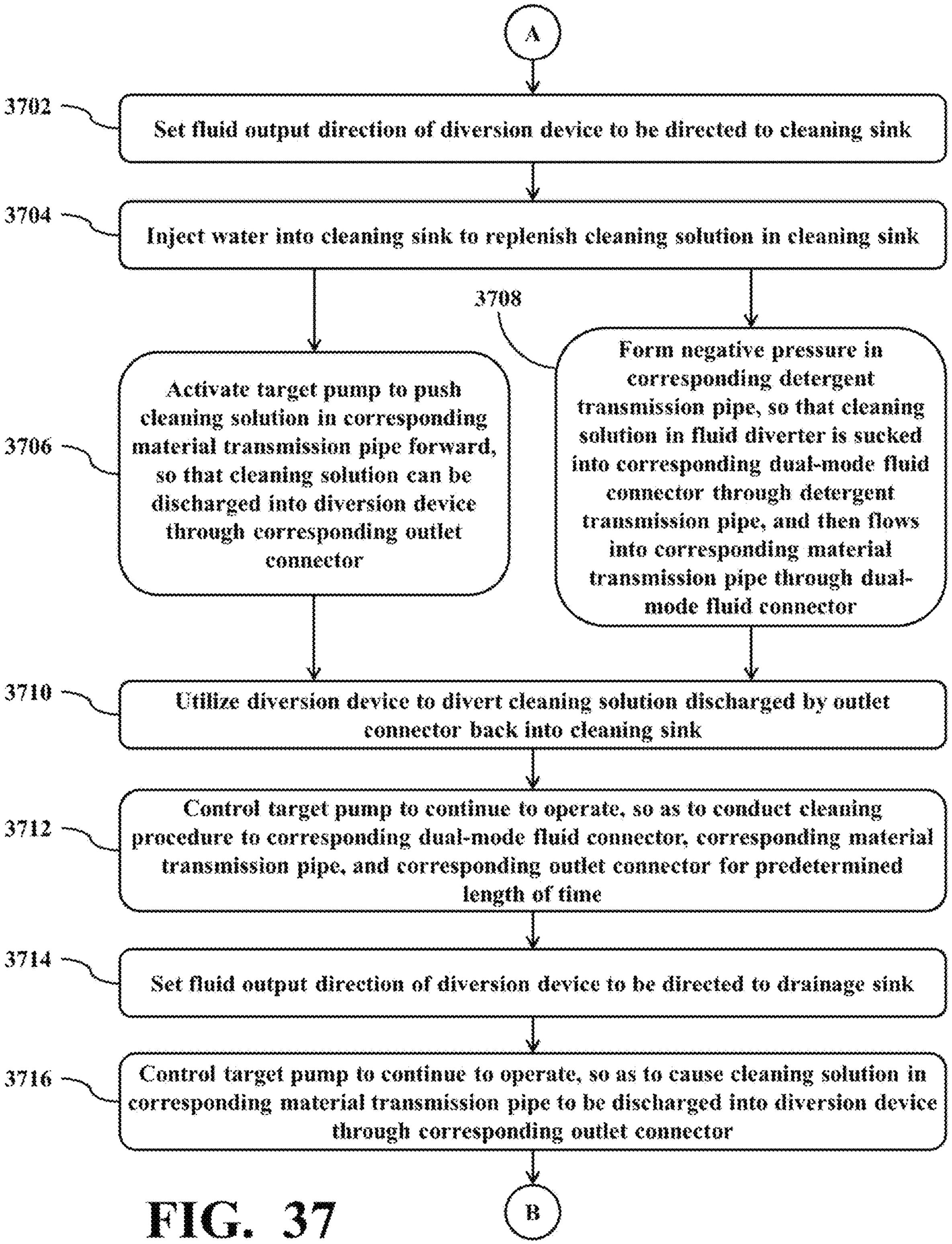
Figure 38:
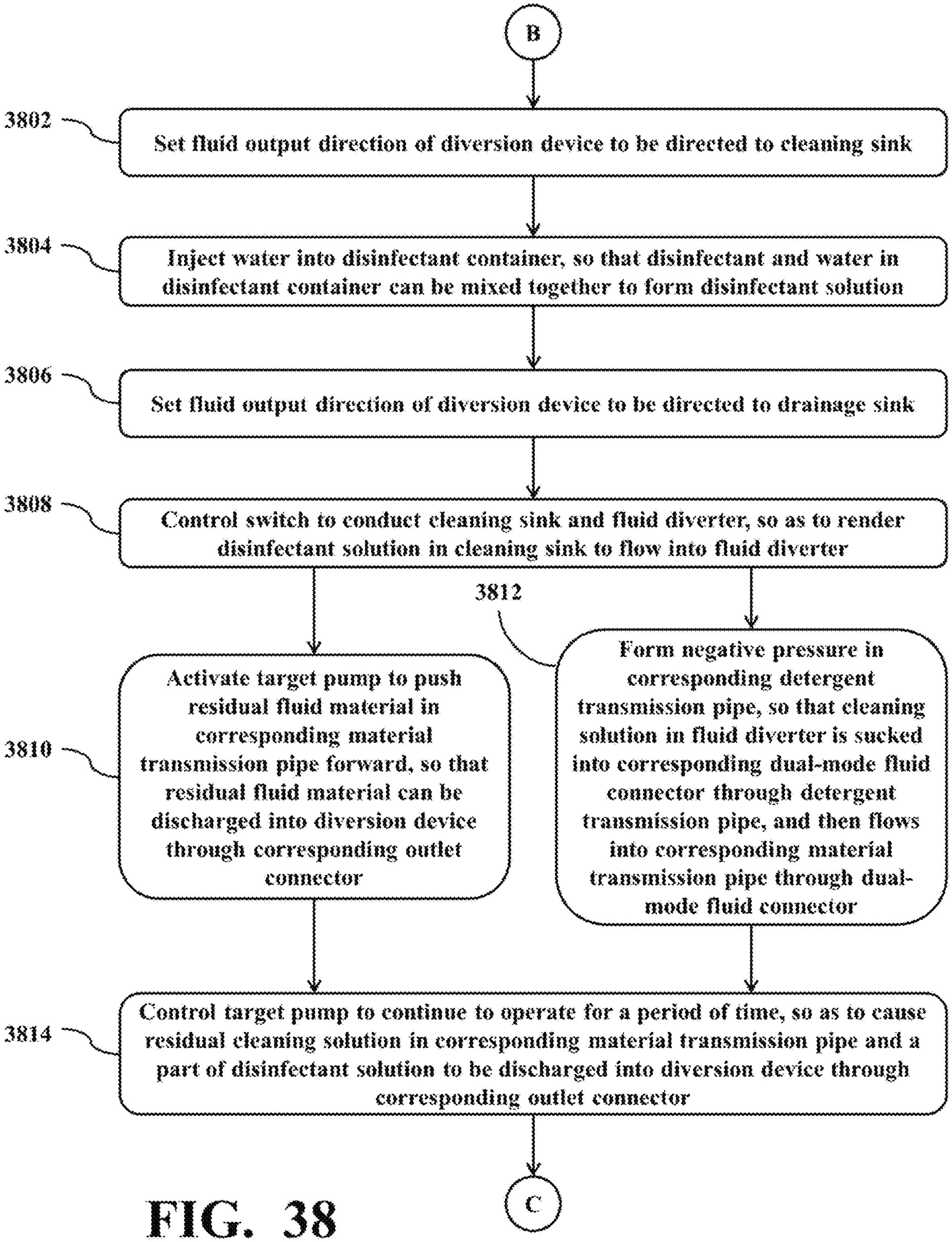
FIG. 38 through FIG. 39 collectively show a simplified flowchart of an automatic self-disinfection method adopted by the fluid material dispensing apparatus according to one embodiment of the present disclosure.
Figure 39:
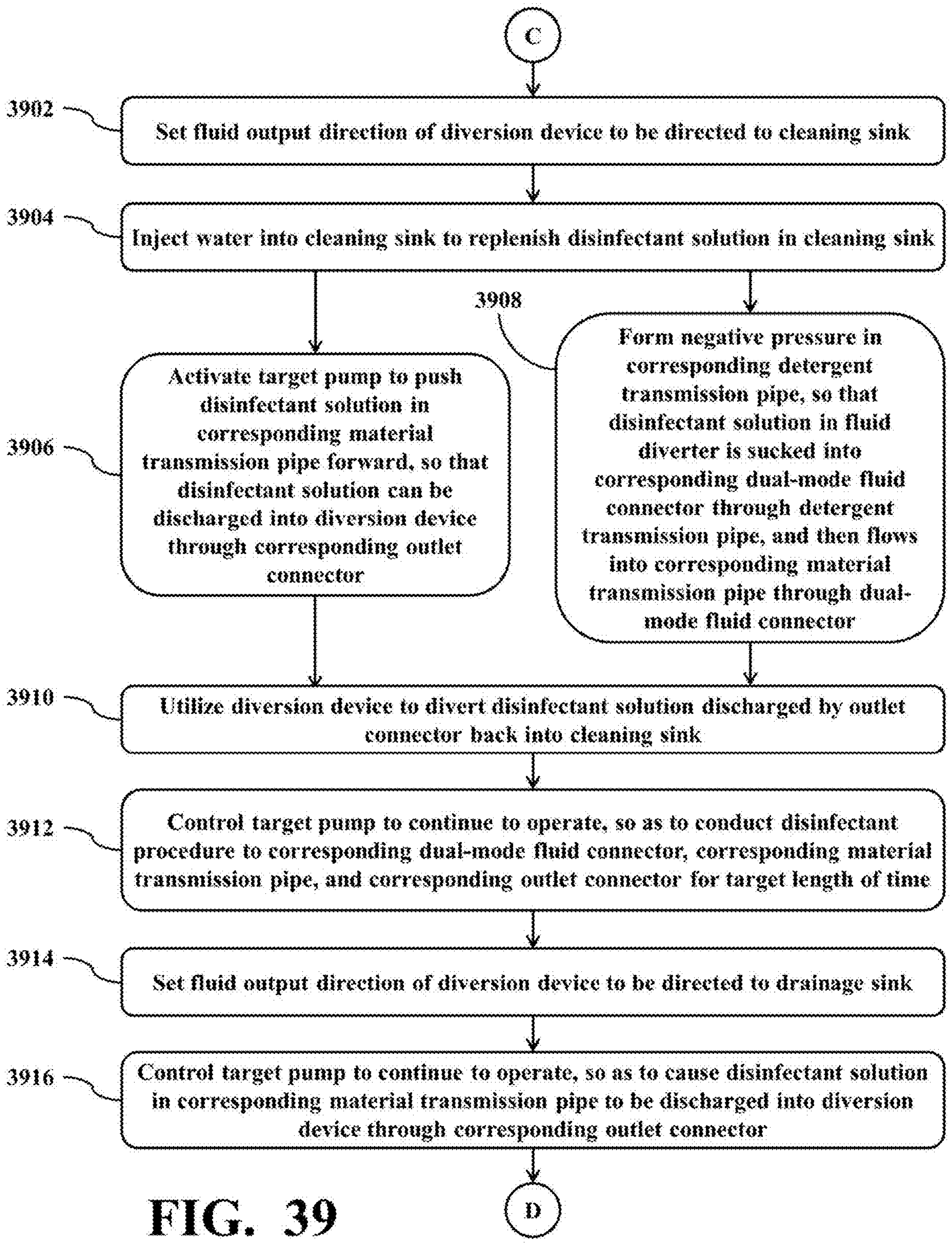

The operation of the fluid material dispensing apparatus 100 when conducting the automatic self-cleaning procedure, the automatic self-disinfectant procedure, and the automatic sterilization procedure will be further described below by reference to FIG. 36 through FIG. 39. FIG. 36 through FIG. 37 collectively show a simplified flowchart of an automatic self-cleaning method adopted by the fluid material dispensing apparatus 100 according to one embodiment. FIG. 38 through FIG. 39 collectively show a simplified flowchart of an automatic self-disinfection method adopted by the fluid material dispensing apparatus 100 according to one embodiment.

As described previously, after the user placed the diversion device 890 on the predetermined position of the working platform 102, put the detergent into the cleaning sink 170, put the disinfectant into the disinfectant container 172, switched the related dual-mode fluid connectors 150 to the clean mode, and selected the outlet connector 110 or the pipes to be cleaned and disinfected through the control panel 109, the fluid material dispensing apparatus 100 begins to conduct the automatic self-cleaning procedure, the automatic self-disinfectant procedure, and the automatic sterilization procedure to the components, pipes, and/or connectors which are connected to the selected outlet connector 110.

For the convenience of description, the selected outlet connector 110 is hereinafter referred to as the target outlet connector 110, the pump 160 corresponding to the target outlet connector 110 is hereinafter referred to as the target pump 160, the material transmission pipe 152 coupled with the target pump 160 is hereinafter referred to as the target material transmission pipe 152, the dual-mode fluid connector 150 coupled with the target material transmission pipe 152 is hereinafter referred to as the target dual-mode fluid connector 150, the detergent transmission pipe 154 coupled with the target dual-mode fluid connector 150 is hereinafter referred to as the target detergent transmission pipe 154, the check valve 194 coupled with the target detergent transmission pipe 154 is hereinafter referred to as the target check valve 194.

In this situation, the fluid material dispensing apparatus 100 may operate by adopting the automatic self-cleaning method shown in FIG. 36 and FIG. 37.

In the operation 3602, the control panel 109 or the internal control circuit of the fluid material dispensing apparatus 100 may set the fluid output direction of the diversion device 890 to be directed to the cleaning sink 170. As described previously, the control panel 109 or the internal control circuit of the fluid material dispensing apparatus 100 may control the diversion device 890 to set the first fluid outlet 893 to the drainable status and to set the second fluid outlet 895 to the close status.

In the operation 3604, the fluid material dispensing apparatus 100 may inject water into the cleaning sink 170 so that the detergent and the water in the cleaning sink 170 can be mixed together to form the cleaning solution. In operations, the fluid material dispensing apparatus 100 may inject water into the diversion device 890 through one or more outlet connectors 110, and may utilize the diversion device 890 to divert the water into the cleaning sink 170, so that the detergent and the water in the cleaning sink 170 can be mixed together to form the cleaning solution. If the user has not yet put disinfectant in the disinfectant container 172 at that time, the fluid material dispensing apparatus 100 may instead inject water into the disinfectant container 172 within the cleaning sink 170 through the water injection connector 174 in the operation 3604. In this situation, the water in the disinfectant container 172 will flow into the cleaning sink 170 through the connection hole 178 so that the detergent and the water in the cleaning sink 170 can be mixed together to form the cleaning solution.

When the water injected into the cleaning sink 170 reaches a first predetermined amount, or when the water injection time reaches a first predetermined time, the fluid material dispensing apparatus 100 may perform the operation 3606.

In the operation 3606, the control panel 109 or the internal control circuit of the fluid material dispensing apparatus 100 may set the fluid output direction of the diversion device 890 to be directed to the drainage sink 180. As described previously, the control panel 109 or the internal control circuit of the fluid material dispensing apparatus 100 may control the diversion device 890 to switch the first fluid outlet 893 to the close status and to switch the second fluid outlet 895 to the drainable status.

In the operation 3608, the control panel 109 or the internal control circuit of the fluid material dispensing apparatus 100 may control the switch 192 to conduct the cleaning sink 170 and the fluid diverter 190, so as to render the cleaning solution in the cleaning sink 170 to flow into the fluid diverter 190 through a liquid outlet of the cleaning sink 170 and a liquid input terminal of the fluid diverter 190.

In the operation 3610, the control panel 109 or the internal control circuit of the fluid material dispensing apparatus 100 may activate the target pump 160 corresponding to the target outlet connector 110 to push residual fluid material in the corresponding target material transmission pipe 152 forward, so that the residual fluid material can be discharged into the diversion device 890 through the target outlet connector 110.

In the operation 3612, the fluid material dispensing apparatus 100 may form a negative pressure in a target detergent transmission pipe 154 corresponding to the target material transmission pipe 152, so that the cleaning solution in the fluid diverter 190 is sucked into a corresponding target dual-mode fluid connector 150 through the target detergent transmission pipe 154, and then flows into the target material transmission pipe 152 through the target dual-mode fluid connector 150.

As described previously, the target material transmission pipe 152 and the corresponding target detergent transmission pipe 154 are both coupled with the target dual-mode fluid connector 150. In addition, when the target dual-mode fluid connector 150 is switched to the clean mode, the target material transmission pipe 152 and the target detergent transmission pipe 154 can communicate with each other through the target dual-mode fluid connector 150.

When the target pump 160 pushes the residual fluid material in the target material transmission pipe 152 forward, a negative pressure will be formed in the target detergent transmission pipe 154, so that the cleaning solution in the fluid diverter 190 is sucked into the target dual-mode fluid connector 150 through the target detergent transmission pipe 154, and then flows into the target material transmission pipe 152 through the target dual-mode fluid connector 150.

In other words, the fluid material dispensing apparatus 100 of this embodiment may perform the operation 3610 and the operation 3612 at the same time.

Then, the fluid material dispensing apparatus 100 performs the operation 3614.

In the operation 3614, the control panel 109 or the internal control circuit of the fluid material dispensing apparatus 100 may control the target pump 160 to continue to operate for a period of time, so as to cause the residual fluid material in the corresponding target material transmission pipe 152 and a part of the cleaning solution to be discharged into the diversion device 890 through the corresponding target outlet connector 110. The fluid output direction of the diversion device 890 at this time is set to be directed to the drainage sink 180, thus the fluid material and the cleaning solution discharged by the target outlet connector 110 will be outputted to the drainage sink 180 through the second fluid outlet 895 of the diversion device 890 as waste liquid. The waste liquid will then be discharged out of the fluid material dispensing apparatus 100 through the drainage pipe 182 of the drainage sink 180.

As a result, with the operation of the target pump 160, the residual fluid material in the target dual-mode fluid connector 150 and the target material transmission pipe 152 can be discharged into the diversion device 890 through the target outlet connector 110 and then be diverted to the drainage sink 180 as waste liquid.

Afterward, the fluid material dispensing apparatus 100 may perform the operation 3702 of FIG. 37.

In the operation 3702, the control panel 109 or the internal control circuit of the fluid material dispensing apparatus 100 may set the fluid output direction of the diversion device 890 to be directed to the cleaning sink 170 again. As described previously, the control panel 109 or the internal control circuit of the fluid material dispensing apparatus 100 may control the diversion device 890 to set the first fluid outlet 893 to the drainable status and to set the second fluid outlet 895 to the close status.

Since the operation in the aforementioned operation 3610 through operation 3614 consumes a part of the cleaning solution in the cleaning sink 170, the fluid material dispensing apparatus 100 may then perform the operation 3704.

In the operation 3704, the fluid material dispensing apparatus 100 may inject water into the cleaning sink 170 to replenish the liquid volume of the cleaning solution in the cleaning sink 170. In operations, the fluid material dispensing apparatus 100 may inject water into the diversion device 890 through one or more outlet connectors 110, and utilize the diversion device 890 to divert the water into the cleaning sink 170, so as to replenish the liquid volume of the cleaning solution in the cleaning sink 170. If the user has not yet put disinfectant in the disinfectant container 172 at that time, the fluid material dispensing apparatus 100 may instead inject water into the disinfectant container 172 within the cleaning sink 170 through the water injection connector 174 in the operation 3704. In this situation, the water in the disinfectant container 172 will flow into the cleaning sink 170 through the connection hole 178 and thereby replenishing the liquid volume of the cleaning solution in the cleaning sink 170.

When the water replenished into the cleaning sink 170 reaches a second predetermined amount, or when the water injection time reaches a second predetermined time, the fluid material dispensing apparatus 100 may perform the operation 3706.

In the operation 3706, the control panel 109 or the internal control circuit of the fluid material dispensing apparatus 100 may activate the target pump 160 to push the cleaning solution in the corresponding target material transmission pipe 152 forward, so that the cleaning solution can be discharged into the diversion device 890 through the corresponding target outlet connector 110.

In the operation 3708, the fluid material dispensing apparatus 100 may form a negative pressure in the target detergent transmission pipe 154 corresponding to the target material transmission pipe 152, so that the cleaning solution in the fluid diverter 190 is sucked into the corresponding target dual-mode fluid connector 150 through the target detergent transmission pipe 154, and then flows into the target material transmission pipe 152 through the target dual-mode fluid connector 150.

As described previously, when the target pump 160 pushes the cleaning solution in the target material transmission pipe 152 forward, a negative pressure will be formed in the target detergent transmission pipe 154, so that the cleaning solution in the fluid diverter 190 is sucked into the target dual-mode fluid connector 150 through the target detergent transmission pipe 154, and then flows into the target material transmission pipe 152 through the target dual-mode fluid connector 150.

In other words, the fluid material dispensing apparatus 100 of this embodiment may perform the operation 3706 and the operation 3708 at the same time.

On the other hand, the fluid output direction of the diversion device 890 at this time is set to be directed to the cleaning sink 170, thus the fluid material dispensing apparatus 100 may perform the operation 3710 at the same time to utilize the diversion device 890 to divert the cleaning solution discharged by the target outlet connector 110 back into the cleaning sink 170. In this embodiment, the cleaning solution discharged by the target outlet connector 110 will be outputted to the cleaning sink 170 through the first fluid outlet 893 of the diversion device 890, so that the cleaning solution discharged by the target outlet connector 110 can be reused.

In the operation 3712, the control panel 109 or the internal control circuit of the fluid material dispensing apparatus 100 may control the target pump 160 to continue to operate, so that the cleaning solution in the cleaning sink 170 can be circulated in the aforementioned cleaning loop (e.g., the cleaning sink 170, the fluid diverter 190, the target detergent transmission pipe 154, the target dual-mode fluid connector 150, the target material transmission pipe 152, the target pump 160, and the target outlet connector 110) for multiple times, so as to conduct the cleaning procedure to the corresponding target dual-mode fluid connector 150, the corresponding target material transmission pipe 152, and the corresponding target outlet connector 110 for a predetermined length of time.

In the operation 3714, the control panel 109 or the internal control circuit of the fluid material dispensing apparatus 100 may switch the fluid output direction of the diversion device 890 to be directed to the drainage sink 180 again. As described previously, the control panel 109 or the internal control circuit of the fluid material dispensing apparatus 100 may control the diversion device 890 to set the first fluid outlet 893 to the close status and to set the second fluid outlet 895 to the drainable status.

In the operation 3716, the control panel 109 or the internal control circuit of the fluid material dispensing apparatus 100 may control the target pump 160 to continue to operate for a period of time, so as to cause the cleaning solution in the corresponding target material transmission pipe 152 to be discharged into the diversion device 890 through the corresponding target outlet connector 110. The fluid output direction of the diversion device 890 at this time is set to be directed to the drainage sink 180, thus the cleaning solution discharged by the target outlet connector 110 will be outputted to the drainage sink 180 through the second fluid outlet 895 of the diversion device 890 as waste liquid. The waste liquid will then be discharged out of the fluid material dispensing apparatus 100 through the drainage pipe 182 of the drainage sink 180. In other words, in the operation 3716, the fluid material dispensing apparatus 100 may utilize the diversion device 890 to divert the cleaning solution discharged by the target outlet connector 110 into the drainage sink 180, but does not utilize the diversion device 890 to divert the cleaning solution discharged by the target outlet connector 110 back into the cleaning sink 170.

With the operation of the target pump 160, most of the cleaning solution in the target dual-mode fluid connector 150, the target material transmission pipe 152, and the target detergent transmission pipe 154 can be discharged into the diversion device 890 through the target outlet connector 110 and then be diverted to the drainage sink 180 as waste liquid.

In this way, the fluid material dispensing apparatus 100 can complete the automatic self-cleaning procedure.

As described previously, the multiple check valves 194 in the fluid material dispensing apparatus 100 are respectively coupled with the multiple liquid output terminals of the fluid diverter 190. Each check valve 194 is coupled between one of the liquid output terminals of the fluid diverter 190 and a corresponding detergent transmission pipe 154, and utilized to prevent fluid in the detergent transmission pipe 154 from flowing back into the fluid diverter 190. From another aspect, the fluid diverter 190 is simultaneously coupled with multiple detergent transmission pipes 154, and the aforementioned multiple detergent transmission pipes 154 can communicate with each other through the fluid diverter 190.

When conducting the aforementioned automatic self-cleaning operation, the fluid material dispensing apparatus 100 may conduct the aforementioned automatic self-cleaning procedure to only part of the outlet connectors 110 selected by the user and the related components, pipes, and/or connectors. As can be appreciated from the foregoing descriptions, when the target pump 160 pushes the residual fluid material or the cleaning solution in the target material transmission pipe 152 forward, a negative pressure will be formed in the corresponding target dual-mode fluid connector 150 and the target detergent transmission pipe 154 connected to the target dual-mode fluid connector 150.

If no check valve 194 is arranged between the aforementioned multiple detergent transmission pipes 154 and fluid diverter 190, a negative pressure is likely to be formed in other detergent transmission pipes 154 that are not undergoing the cleaning procedure (hereinafter referred to as the non-selected detergent transmission pipe 154) and related dual-mode fluid connector 150 (hereinafter referred to as non-selected dual-mode fluid connector 150) when the target pump 160 pushes the residual fluid material or the cleaning solution in the target material transmission pipe 152 forward. In this situation, the operation of the target pump 160 may possibly cause the fluid material in the material container 130 connected to the non-selected dual-mode fluid connector 150 to be sucked into the non-selected dual-mode fluid connector 150 and to flow into the fluid diverter 190 through the non-selected detergent transmission pipe 154 due to the negative pressure in the non-selected dual-mode fluid connector 150. This may cause the cleaning solution utilized in the automatic self-cleaning procedure to be contaminated by the aforementioned fluid material flowing into the fluid diverter 190, and thereby significantly affecting the whole cleaning performance.

As can be appreciated from the foregoing descriptions, the multiple check valves 194 arranged between the fluid diverter 190 and the multiple detergent transmission pipes 154 can effectively prevent the cleaning solution utilized in the automatic self-cleaning procedure from being contaminated by the fluid material in other irrelevant dual-mode fluid connectors 150. In other words, the aforementioned multiple check valves 194 can ensure that the automatic self-cleaning procedure of the fluid material dispensing apparatus 100 can be carried out successfully.

In addition, when an appropriate type of the check valve 194 is selected, it can also prevent the cleaning solution in the fluid diverter 190 from flowing into the non-selected detergent transmission pipe 154, thereby preventing the fluid material in the non-selected dual-mode fluid connector 150 from being affected by the cleaning solution.

Afterward, the fluid material dispensing apparatus 100 may adopt the automatic self-disinfection method shown in FIG. 38 and FIG. 39 to conduct the automatic self-disinfectant procedure and the automatic sterilization procedure to the components, pipes, and/or connectors connected to the target outlet connector 110.

In the operation 3802, the control panel 109 or the internal control circuit of the fluid material dispensing apparatus 100 may set the fluid output direction of the diversion device 890 to be directed to the cleaning sink 170. As described previously, the control panel 109 or the internal control circuit of the fluid material dispensing apparatus 100 may control the diversion device 890 to set the first fluid outlet 893 to the drainable status and to set the second fluid outlet 895 to the close status.

In the operation 3804, the fluid material dispensing apparatus 100 may inject water into the disinfectant container 172 within the cleaning sink 170, so that the disinfectant and the water in the disinfectant container 172 can be mixed together to form a disinfectant solution. In this situation, the water in the disinfectant container 172 flows into the cleaning sink 170 through the connection hole 178, so that the disinfectant and the water in the disinfectant container 172 can be mixed together to form the disinfectant solution in the cleaning sink 170.

When the water injected into the cleaning sink 170 reaches a third predetermined amount, or the water injection time reaches a third predetermined time, the fluid material dispensing apparatus 100 may perform the operation 3806.

In the operation 3806, the control panel 109 or the internal control circuit of the fluid material dispensing apparatus 100 may set the fluid output direction of the diversion device 890 to be directed to the drainage sink 180. As described previously, the control panel 109 or the internal control circuit of the fluid material dispensing apparatus 100 may control the diversion device 890 to switch the first fluid outlet 893 to the close status and to switch the second fluid outlet 895 to the drainable status.

In the operation 3808, the control panel 109 or the internal control circuit of the fluid material dispensing apparatus 100 may control the switch 192 to conduct the cleaning sink 170 and the fluid diverter 190, so as to render the disinfectant solution in the cleaning sink 170 to flow into the fluid diverter 190 through the liquid outlet of the cleaning sink 170 and the liquid input terminal of the fluid diverter 190.

In the operation 3810, the control panel 109 or the internal control circuit of the fluid material dispensing apparatus 100 may activate the target pump 160 corresponding to the target outlet connector 110 to push residual cleaning solution in the corresponding target material transmission pipe 152 forward, so that the residual cleaning solution can be discharged into the diversion device 890 through the target outlet connector 110.

In the operation 3812, the fluid material dispensing apparatus 100 may form a negative pressure in the target detergent transmission pipe 154 corresponding to the target material transmission pipe 152, so that the disinfectant solution on the fluid diverter 190 is sucked into the corresponding target dual-mode fluid connector 150 through the target detergent transmission pipe 154, and then flows into the target material transmission pipe 152 through the target dual-mode fluid connector 150.

As described previously, the target material transmission pipe 152 and the corresponding target detergent transmission pipe 154 are both coupled with the target dual-mode fluid connector 150. In addition, when the target dual-mode fluid connector 150 is switched to the clean mode, the target material transmission pipe 152 and the target detergent transmission pipe 154 can communicate with each other through the target dual-mode fluid connector 150.

When the target pump 160 pushes the residual cleaning solution in the target material transmission pipe 152 forward, a negative pressure will be formed in the target detergent transmission pipe 154, so that the disinfectant solution in the fluid diverter 190 is sucked into the target dual-mode fluid connector 150 through the target detergent transmission pipe 154, and then flows into the target material transmission pipe 152 through the target dual-mode fluid connector 150.

In other words, the fluid material dispensing apparatus 100 of this embodiment may perform the operation 3810 and the operation 3812 at the same time.

Then, the fluid material dispensing apparatus 100 performs the operation 3814.

In the operation 3814, the control panel 109 or the internal control circuit of the fluid material dispensing apparatus 100 may control the target pump 160 to continue to operate for a period of time, so as to cause the residual cleaning solution in the corresponding target material transmission pipe 152 and a part of the disinfectant solution to be discharged into the diversion device 890 through the corresponding target outlet connector 110. The fluid output direction of the diversion device 890 at this time is set to be directed to the drainage sink 180, thus the cleaning solution and the disinfectant solution discharged by the target outlet connector 110 will be outputted to the drainage sink 180 through the second fluid outlet 895 of the diversion device 890 as waste liquid. The waste liquid will then be discharged out of the fluid material dispensing apparatus 100 through the drainage pipe 182 of the drainage sink 180.

As a result, with the operation of the target pump 160, the residual cleaning solution in the target dual-mode fluid connector 150 and the target material transmission pipe 152 can be discharged into the diversion device 890 through the target outlet connector 110 and then be diverted to the drainage sink 180 as waste liquid.

Afterward, the fluid material dispensing apparatus 100 may perform the operation 3902 of FIG. 39.

In the operation 3902, the control panel 109 or the internal control circuit of the fluid material dispensing apparatus 100 may set the fluid output direction of the diversion device 890 to be directed to the cleaning sink 170 again. As described previously, the control panel 109 or the internal control circuit of the fluid material dispensing apparatus 100 may control the diversion device 890 to set the first fluid outlet 893 to the drainable status and to set the second fluid outlet 895 to the close status.

Since the operation in the aforementioned operation 3810 through operation 3814 consumes a part of the disinfectant solution in the cleaning sink 170, the fluid material dispensing apparatus 100 may then perform the operation 3904.

In the operation 3904, the fluid material dispensing apparatus 100 may inject water into the cleaning sink 170 to replenish the liquid volume of the disinfectant solution in the cleaning sink 170. In operations, the fluid material dispensing apparatus 100 may inject water into the diversion device 890 through one or more outlet connectors 110, and utilize the diversion device 890 to divert the water into the cleaning sink 170, so as to replenish the liquid volume of the disinfectant solution in the cleaning sink 170.

Alternatively, the fluid material dispensing apparatus 100 may inject water into the disinfectant container 172 within the cleaning sink 170 through the water injection connector 174. In this situation, the water in the disinfectant container 172 flows into the cleaning sink 170 through the connection hole 178 and thereby replenishing the liquid volume of the disinfectant solution in the cleaning sink 170.

When the water injected into the cleaning sink 170 reaches a fourth predetermined amount, or the water injection time reaches a fourth predetermined time, the fluid material dispensing apparatus 100 may perform the operation 3906.

In the operation 3906, the control panel 109 or the internal control circuit of the fluid material dispensing apparatus 100 may activate the target pump 160 to push the disinfectant solution in the corresponding target material transmission pipe 152 forward, so that the disinfectant solution can be discharged into the diversion device 890 through the corresponding target outlet connector 110.

In the operation 3908, the fluid material dispensing apparatus 100 may form a negative pressure in the target detergent transmission pipe 154 corresponding to the target material transmission pipe 152, so that the disinfectant solution in the fluid diverter 190 is sucked into the corresponding target dual-mode fluid connector 150 through the target detergent transmission pipe 154, and then flows into the target material transmission pipe 152 through the target dual-mode fluid connector 150.

As described previously, when the target pump 160 pushes the disinfectant solution in the target material transmission pipe 152 forward, a negative pressure will be formed in the target detergent transmission pipe 154, so that the disinfectant solution in the fluid diverter 190 is sucked into the target dual-mode fluid connector 150 through the target detergent transmission pipe 154, and then flows into the target material transmission pipe 152 through the target dual-mode fluid connector 150.

In other words, the fluid material dispensing apparatus 100 of this embodiment may perform the operation 3906 and the operation 3908 at the same time.

On the other hand, the fluid output direction of the diversion device 890 at this time is set to be directed to the cleaning sink 170, thus the fluid material dispensing apparatus 100 may perform the operation 3910 at the same time to utilize the diversion device 890 to divert the disinfectant solution discharged by the target outlet connector 110 back into the cleaning sink 170. In this embodiment, the disinfectant solution discharged by the target outlet connector 110 will be outputted to the cleaning sink 170 through the first fluid outlet 893 of the diversion device 890, so that the disinfectant solution discharged by the target outlet connector 110 can be reused.

In the operation 3912, the control panel 109 or the internal control circuit of the fluid material dispensing apparatus 100 may control the target pump 160 to continue to operate, so that the disinfectant solution in the cleaning sink 170 can be circulated in the aforementioned cleaning loop (e.g., the cleaning sink 170, the fluid diverter 190, the target detergent transmission pipe 154, the target dual-mode fluid connector 150, the target material transmission pipe 152, the target pump 160, and the target outlet connector 110) for multiple times, so as to conduct the disinfectant procedure to the corresponding target dual-mode fluid connector 150, the corresponding target material transmission pipe 152, and the corresponding target outlet connector 110 for a target length of time.

In the operation 3914, the control panel 109 or the internal control circuit of the fluid material dispensing apparatus 100 may again switch the fluid output direction of the diversion device 890 to be directed to the drainage sink 180. As described previously, the control panel 109 or the internal control circuit of the fluid material dispensing apparatus 100 may control the diversion device 890 to set the first fluid outlet 893 to the close status and to set the second fluid outlet 895 to the drainable status.

In the operation 3916, the control panel 109 or the internal control circuit of the fluid material dispensing apparatus 100 may control the target pump 160 to continue to operate for a period of time, so as to cause the disinfectant solution in the corresponding target material transmission pipe 152 to be discharged into the diversion device 890 through the corresponding outlet connector 110. The fluid output direction of the diversion device 890 at this time is set to be directed to the drainage sink 180, thus the disinfectant solution discharged by the target outlet connector 110 will be outputted to the drainage sink 180 through the second fluid outlet 895 of the diversion device 890 as waste liquid. The waste liquid will then be discharged out of the fluid material dispensing apparatus 100 through the drainage pipe 182 of the drainage sink 180. In other words, in the operation 3916, the fluid material dispensing apparatus 100 may utilize the diversion device 890 to divert the disinfectant solution discharged by the target outlet connector 110 into the drainage sink 180, but does not utilize the diversion device 890 to divert the disinfectant solution discharged by the target outlet connector 110 back into the cleaning sink 170.

With the operation of the target pump 160, most of the disinfectant solution in the target dual-mode fluid connector 150, the target material transmission pipe 152, and the target detergent transmission pipe 154 can be discharged into the diversion device 890 through the target outlet connector 110 and then be diverted to the drainage sink 180 as waste liquid.

In this way, the fluid material dispensing apparatus 100 can complete the automatic self-disinfectant procedure.

In practice, if the selected disinfectant also has a sterilization capability, the fluid material dispensing apparatus 100 is equivalent to performing an automatic sterilization operation at the same time when the fluid material dispensing apparatus 100 performs the aforementioned automatic self-disinfection operation. Therefore, when the fluid material dispensing apparatus 100 completes the automatic self-disinfectant procedure, it also completes the automatic sterilization procedure at the same time.

As described previously, when conducting the aforementioned automatic self-disinfection operation, the fluid material dispensing apparatus 100 may conduct the aforementioned automatic self-disinfectant procedure to only part of the outlet connectors 110 selected by the user and the related components, pipes, and/or connectors. As can be appreciated from the foregoing descriptions, when the target pump 160 pushes the residual cleaning solution or disinfectant solution in the target material transmission pipe 152 forward, a negative pressure will be formed in the corresponding target dual-mode fluid connector 150 and the target detergent transmission pipe 154 connected to the target dual-mode fluid connector 150.

If no check valve 194 is arranged between the aforementioned multiple detergent transmission pipes 154 and fluid diverter 190, a negative pressure is likely to be formed in other detergent transmission pipes 154 that are not undergoing the disinfectant procedure (hereinafter referred to as the non-selected detergent transmission pipe 154) and related dual-mode fluid connector 150 (hereinafter referred to as the non-selected dual-mode fluid connector 150) when the target pump 160 pushes the residual cleaning solution or the disinfectant solution in the target material transmission pipe 152 forward. In this situation, the operation of the target pump 160 may possibly cause the fluid material in the material container 130 connected to the non-selected dual-mode fluid connector 150 to be sucked into the non-selected dual-mode fluid connector 150 and to flow into the fluid diverter 190 through the non-selected detergent transmission pipe 154 due to the negative pressure in the non-selected dual-mode fluid connector 150. This may cause the disinfectant solution utilized in the automatic self-disinfectant procedure to be contaminated by the aforementioned fluid material flowing into the fluid diverter 190, and thereby significantly affecting the whole disinfectant performance.

As can be appreciated from the foregoing descriptions, the multiple check valves 194 arranged between the fluid diverter 190 and the multiple detergent transmission pipes 154 can effectively prevent the disinfectant solution utilized in the automatic self-disinfectant procedure from being contaminated by the fluid material in other irrelevant dual-mode fluid connectors 150. In other words, the aforementioned multiple check valves 194 can ensure that the automatic self-disinfectant procedure of the fluid material dispensing apparatus 100 can be carried out successfully.

In addition, when an appropriate type of the check valve 194 is selected, it can also prevent the disinfectant solution in the fluid diverter 190 from flowing into the non-selected detergent transmission pipe 154, thereby preventing the fluid material in the non-selected dual-mode fluid connector 150 from being affected by the disinfectant solution.

As can be appreciated from the foregoing descriptions, when the fluid material dispensing apparatus 100 completed the aforementioned automatic self-disinfection/self-sterilization procedure, a small amount of the disinfectant solution may remain in some components in related cleaning loop (e.g., the fluid diverter 190, the target detergent transmission pipe 154, the target dual-mode fluid connector 150, the target material transmission pipe 152, the target pump 160, and/or the target outlet connector 110).

In practical applications, the aforementioned disinfectant is realized with a food-grade disinfectant. Therefore, when the automatic self-disinfectant procedure is completed, even if some disinfectant solution remains in some components in the cleaning loop, it will not cause any negative effect on the safety of the fluid material to be outputted by the fluid material dispensing apparatus 100 afterwards.

In some embodiments, after completing the aforementioned automatic self-disinfectant procedure, the fluid material dispensing apparatus 100 may conduct a resuming procedure to related pipes to further decrease or eliminate the influence of the residual disinfectant solution in related components.

Figure 40:
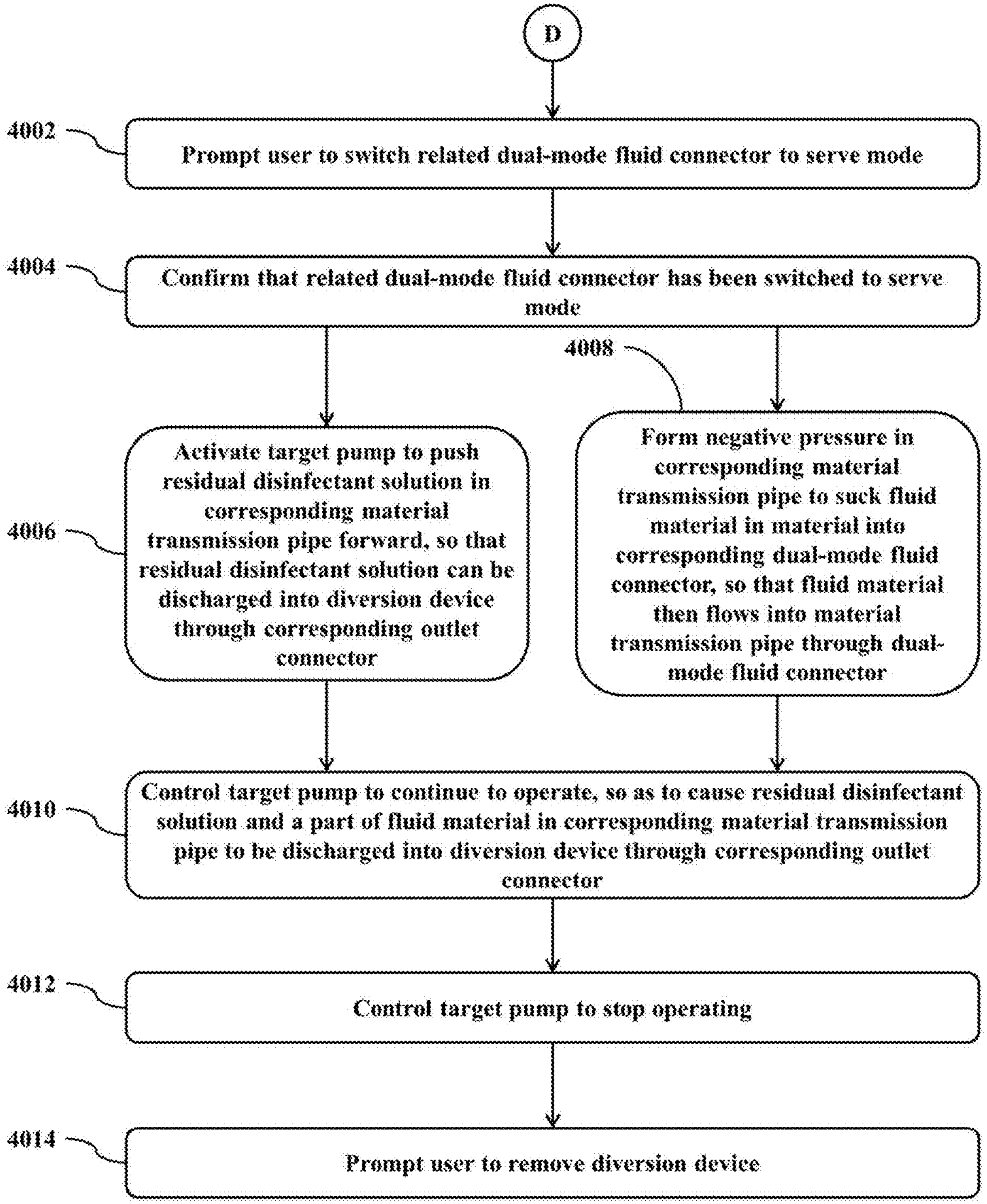
FIG. 40 shows a simplified flowchart of a pipe resuming method adopted by the fluid material dispensing apparatus according to one embodiment of the present disclosure.

Please refer to FIG. 40, which shows a simplified flowchart of a pipe resuming method adopted by the fluid material dispensing apparatus 100 according to one embodiment of the present disclosure.

The fluid material dispensing apparatus 100 may adopt the pipe resuming method shown in FIG. 40 to further decrease or eliminate the influence of the residual disinfectant solution in related components.

In the operation 4002, the fluid material dispensing apparatus 100 may utilize the control panel 109 or other appropriate devices to generate related prompt information, so as to prompt the user to switch the target dual-mode fluid connector 150 that completes the automatic self-cleaning procedure or the automatic self-disinfectant procedure from the clean mode to the serve mode. The aforementioned prompt information may be realized with various content of suitable formats. For example, the prompt information may be realized with a specific color, a specific light signal, an indicative text, an indicative pattern, a specific image, a specific sound, or a hybrid content of the aforementioned various formats.

As can be appreciated from the foregoing descriptions, when the target dual-mode fluid connector 150 is switched to the serve mode, the target material transmission pipe 152 and the target detergent transmission pipe 154 cannot communicate with each other through the target dual-mode fluid connector 150.

In the operation 4004, the fluid material dispensing apparatus 100 may require the user to conduct a specific manipulation (e.g., to press a specific button, to click on a specific graphical option, to enter a specific command, and/or to input a specific voice, or the like) through the control panel 109 or other appropriate device (e.g., a loudspeaker, an indication light, a buzzer, or the like) to confirm that the related dual-mode fluid connector 150 has been switched to the serve mode.

After the fluid material dispensing apparatus 100 confirms that the related dual-mode fluid connector 150 has been switched to the serve mode, the fluid material dispensing apparatus 100 may perform the operation 4006 of FIG. 40 then.

In the operation 4006, the control panel 109 or the internal control circuit of the fluid material dispensing apparatus 100 may activate the target pump 160 to push the residual disinfectant solution in the corresponding target material transmission pipe 152 forward, so that the residual disinfectant solution can be discharged into the diversion device 890 through the corresponding target outlet connector 110. The fluid output direction of the diversion device 890 at this time is set to be directed to the drainage sink 180, thus the disinfectant solution discharged by the target outlet connector 110 will be outputted to the drainage sink 180 through the second fluid outlet 895 of the diversion device 890 as waste liquid. The waste liquid will then be discharged out of the fluid material dispensing apparatus 100 through the drainage pipe 182 of the drainage sink 180.

In the operation 4008, the fluid material dispensing apparatus 100 may form a negative pressure in the target material transmission pipe 152 to suck the fluid material in the material container 130 connected to the target dual-mode fluid connector 150 into the target dual-mode fluid connector 150, so that the fluid material then flows into the target material transmission pipe 152 through the target dual-mode fluid connector 150.

When the target pump 160 pushes the residual disinfectant solution in the target material transmission pipe 152 forward, a negative pressure will be formed in the target material transmission pipe 152 and the target dual-mode fluid connector 150. In this situation, the fluid material in the material container 130 connected to the target dual-mode fluid connector 150 will be sucked into the target dual-mode fluid connector 150 and flows into the target material transmission pipe 152 due to the negative pressure in the target dual-mode fluid connector 150.

In other words, the fluid material dispensing apparatus 100 of this embodiment may perform the operation 4006 and the operation 4008 at the same time.

Afterward, the fluid material dispensing apparatus 100 may perform the operation 4010.

In the operation 4010, the control panel 109 or the internal control circuit of the fluid material dispensing apparatus 100 may control the target pump 160 to continue to operate for a period of time, so as to cause the residual disinfectant solution and a part of the fluid material in the target material transmission pipe 152 to be discharged into the diversion device 890 through the corresponding target outlet connector 110. The fluid output direction of the diversion device 890 at this time is set to be directed to the drainage sink 180, thus the disinfectant solution and the fluid material discharged by the target outlet connector 110 will be outputted to the drainage sink 180 through the second fluid outlet 895 of the diversion device 890 as waste liquid. The waste liquid will then be discharged out of the fluid material dispensing apparatus 100 through the drainage pipe 182 of the drainage sink 180.

With the operation of the target pump 160, the residual disinfectant solution in the target dual-mode fluid connector 150 and the target material transmission pipe 152 can be completely discharged, thereby further decreasing or eliminating the influence of the residual disinfectant solution in the related components.

In the operation 4012, the control panel 109 or the internal control circuit of the fluid material dispensing apparatus 100 may control the target pump 160 to stop operating, so as to prevent the target outlet connector 110 from continuing to discharge the fluid material.

In the operation 4014, the fluid material dispensing apparatus 100 may utilize the control panel 109 or other appropriate devices to generate related prompt information, so as to prompt the user to remove the diversion device 890. Similarly, the aforementioned prompt information may be realized with various content of suitable formats. For example, the prompt information may be realized with a specific color, a specific light signal, an indicative text, an indicative pattern, a specific image, a specific sound, or a hybrid content of the aforementioned various formats.

Afterward, the fluid material dispensing apparatus 100 may enter a standby status where the fluid material dispensing apparatus 100 can perform normal operations at any time.

Please note that when the fluid material dispensing apparatus 100 conducts the pipe resuming operation of FIG. 40, the fluid material dispensing apparatus 100 is not limited to cooperate with the diversion device 890. For example, in some embodiments, the diversion device 890 utilized in the aforementioned operation 4006, operation 4010, and operation 4014 may be replaced by the aforementioned target container 120 or other containers.

As can be appreciated from the foregoing descriptions, the user only needs to perform very few operations (e.g., placing the diversion device 890 on the predetermined position of the working platform 102, putting the detergent into the cleaning sink 170, putting the disinfectant into the disinfectant container 172, switching the related dual-mode fluid connectors 150 to the clean mode, and selecting the outlet connector 110 or the pipes to be cleaned or disinfected through the control panel 109), and the fluid material dispensing apparatus 100 is enabled to conduct the aforementioned automatic self-cleaning procedure, automatic self-disinfectant procedure, and automatic sterilization procedure, which is helpful to prevent the components, pipes, and connectors inside the fluid material dispensing apparatus 100 from growing bacteria or generating toxins.

Before utilizing the fluid material dispensing apparatus 100 to conduct the automatic self-cleaning procedure and/or automatic self-disinfectant procedure, the user does not need to detach the material tube 322 of the dual-mode fluid connector 150 from the currently connected material transmission pipe 152, and does not need to detach the cleaning tube 324 from the currently connected detergent transmission pipe 154, not does the user need to remove the dual-mode fluid connector 150 from the material container 130.

On the other hand, when the fluid material dispensing apparatus 100 completes the automatic self-cleaning procedure and/or automatic self-disinfectant procedure, the user does not need to reconnect the material tube 322 of the dual-mode fluid connector 150 to the corresponding material transmission pipe 152, and does not need to reconnect the cleaning tube 324 to the corresponding detergent transmission pipe 154, nor does the user need to reconnect the dual-mode fluid connector 150 to the corresponding material container 130.

Obviously, by adopting the aforementioned fluid material dispensing apparatus 100 and the aforementioned automatic self-cleaning method/automatic self-disinfection method, it can significantly save a lot of labor time, and would not easily foul the surrounding environment, and can effectively prevent the dual-mode fluid connector 150 from being scratched or even damaged.

In addition, the fluid material dispensing apparatus 100 can utilize the disinfectant solution to conduct the automatic self-disinfectant procedure, so the possibility of that the components, pipes, and connectors inside the fluid material dispensing apparatus 100 grow bacteria or generate toxins can be effectively reduced. Such approach can significantly reduce the frequency of cleaning and disinfection of the fluid material dispensing apparatus 100, and can even allow the user to clean and disinfect the fluid material dispensing apparatus 100 only every other week or even longer.

Please note that the quantity, shape, or position of some components in the aforementioned fluid material dispensing apparatus 100 may be modified depending on the requirement of practical applications, rather than being restricted to the pattern shown in the aforementioned embodiments.

For example, in some embodiments, the aforementioned dual-mode fluid connector 150 may instead be realized with a dual-mode connector having similar functionalities but different structures, or may instead be realized with an electrical dual-mode connector having similar functionalities.

In addition, in the aforementioned embodiments, the cleaning sink 170 and the drainage sink 180 are arranged on the same working platform 102, but this is merely an exemplary embodiment, rather than a restriction to the practical implementations. For example, in some embodiments, the fluid material dispensing apparatus 100 may comprise a plurality of working platforms, and the cleaning sink 170 and the drainage sink 180 may respectively be arranged on different working platforms.

In some other embodiments, the cleaning sink 170 and/or the drainage sink 180 may be arranged outside the fluid material dispensing apparatus 100. In other words, the cleaning sink 170 and/or the drainage sink 180 may instead be realized with external devices.

For another example, in some embodiments, the second fluid outlet 895 of the diversion device 890 may instead be coupled with a drainage pipe. In this situation, the aforementioned drainage sink 180 may be omitted.

For yet another example, in some embodiments, the user may put the detergent and the disinfectant into the cleaning sink 170 at different time point by following the instruction of the fluid material dispensing apparatus 100 or according to the specification of the given standard operating procedure. In this situation, the aforementioned disinfectant container 172 may be omitted.

For yet another example, in some embodiments, the aforementioned cleaning sink 170 and/or the disinfectant container 172 may be integrated into the diversion device 890.

For yet another example, in some embodiments where the fluid material dispensing apparatus 100 does not require the disinfectant procedure, the aforementioned disinfectant container 172 may be omitted.

For yet another example, in some embodiments, the aforementioned, the check valve 194 may be replaced by various solenoid valves.

In addition, the executing method and executing order of the operations in each of the aforementioned flowcharts are merely exemplary embodiments, rather than restrictions to the practical implementations.

For example, in the embodiment where the fluid output direction of the diversion device 890 is manually adjusted by the user, the aforementioned operation 3602, operation 3606, operation 3702, operation 3714, operation 3802, operation 3806, operation 3902, and operation 3914 may be omitted.

For another example, in the embodiment where the water required for producing the cleaning solution is manually injected by the user, the aforementioned operation 3604 and operation 3704 may be omitted.

For yet another example, in the embodiment where the water required for producing the disinfectant solution is manually injected by the user, the aforementioned operation 3804 and operation 3904 may be omitted.

For yet another example, in the embodiment where the second fluid outlet 895 of the diversion device 890 is coupled with a drainage pipe, the aforementioned operation 3606, operation 3714, and operation 3914 may be omitted.

For yet another example, in the embodiment where the aforementioned disinfectant is realized with a food-grade disinfectant, the aforementioned operation 4002 through operation 4014 may be omitted.

In addition, in the aforementioned embodiments, the disclosed fluid material dispensing apparatus 100 will conduct the automatic self-disinfection operation of FIG. 38 through FIG. 39 after conducting the automatic self-cleaning operation of FIG. 36 through FIG. 37, but this is merely an exemplary embodiment, rather than a restriction to the practical implementations.

For example, in some embodiments where the fluid material dispensing apparatus 100 does not require the disinfectant procedure, the fluid material dispensing apparatus 100 may omit the aforementioned operations of FIG. 38 through FIG. 39. In other embodiments, before performing the automatic self-disinfection operation of FIG. 38 through FIG. 39, the fluid material dispensing apparatus 100 may adopt other approaches to conduct the cleaning procedure (e.g., the fluid material dispensing apparatus 100 may be manually cleaned by the user, or may adopt other different automatic self-cleaning procedures), rather than being restricted to performing the automatic self-cleaning operation of FIG. 36 through FIG. 37 in advance.

For another example, in some embodiments, when a specific disinfectant is selected or the liquid volume of the disinfectant solution is sufficient, the fluid material dispensing apparatus 100 may skip the automatic self-cleaning operation of FIG. 36 through FIG. 37 and directly perform the operations of FIG. 38 through FIG. 39. In this situation, the target pump 160 will instead push the residual fluid material in the target material transmission pipe 152 forward in the operation 3810 and the operation 3814. As a result, during the period in which the fluid material dispensing apparatus 100 performs the operation 3810, the operation 3812, and the operation 3814 of FIG. 38, it is equivalent to simultaneously conducting an alternative automatic self-cleaning procedure to the selected target outlet connector 110 and related components, such as related target dual-mode fluid connector 150, related target material transmission pipe 152, related target detergent transmission pipe 154, related target pump 160, or the like.

Certain terms are used throughout the description and the claims to refer to particular components. One skilled in the art appreciates that a component may be referred to as different names. This disclosure does not intend to distinguish between components that differ in name but not in functionality. In the description and in the claims, the term "comprise" is used in an open-ended fashion, and thus should be interpreted to mean "include, but not limited to." The term "couple" is intended to encompass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Throughout the description and claims, the term "element" contains the concept of component, layer, or region.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

For the purpose of explanatory convenience in the specification, spatially relative terms, such as "on," "above," "below," "beneath," "higher," "lower," "upward," "downward," "forward," "backward," and the like, may be used herein to describe the functionality of a particular element or to describe the relationship of one element to another element(s) as illustrated in the drawings. It will be understood that the spatially relative terms are intended to encompass different orientations of the element in use, in operations, or in assembly in addition to the orientation depicted in the drawings. For example, if the element in the drawings is turned over, elements described as "on" or "above" other elements would then be oriented "under" or "beneath" the other elements. Thus, the exemplary term "beneath" can encompass both an orientation of above and beneath. For another example, if the element in the drawings is reversed, the action described as "forward" may become "backward," and the action described as "backward" may become "forward." Thus, the exemplary description "forward" can encompass both an orientation of forward and backward.

Throughout the description and claims, it will be understood that when a component is referred to as being "positioned on," "positioned above," "connected to," "engaged with," or "coupled with" another component, it can be directly on, directly connected to, or directly engaged with the other component, or intervening component may be present. In contrast, when a component is referred to as being "directly on," "directly connected to," or "directly engaged with" another component, there are no intervening components present.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A fluid material dispensing apparatus (100) for outputting fluid material stored in multiple material containers (130) and capable of conducting an automatic self-cleaning operation, the fluid material dispensing apparatus (100) comprising:

an outlet connector (110);

a fluid connector (150), detachably connected to a target material container (130) of the multiple material containers (130), and comprising a material tube (322);

a material transmission pipe (152), coupled between the material tube (322) and the outlet connector (110);

a detergent transmission pipe (154);

a pump (160), coupled between the material transmission pipe (152) and the outlet connector (110); and a fluid diverter (190), comprising a liquid input terminal and multiple liquid output terminals, wherein a target output terminal of the multiple liquid output terminals is coupled with the detergent transmission pipe (154);

wherein the automatic self-cleaning operation comprises:

guiding a cleaning solution to flow into the fluid diverter (190) through the liquid input terminal of the fluid diverter (190);

activating the pump (160) to push residual fluid material in the material transmission pipe (152) forward, so that the residual fluid material is discharged through the outlet connector (110); and guiding the cleaning solution in the fluid diverter (190) to flow into the fluid connector (150) through the detergent transmission pipe (154), and then flows into the material transmission pipe (152) through the material tube (322) of the fluid connector (150).

2. The fluid material dispensing apparatus (100) of claim 1, wherein the automatic self-cleaning operation further comprises:

controlling the pump (160) to continue to operate for a period of time, so that the residual fluid material in the material transmission pipe (152) and a part of the cleaning solution are discharged through the outlet connector (110).

3. The fluid material dispensing apparatus (100) of claim 2, wherein the automatic self-cleaning operation further comprises:

activating the pump (160) to push the cleaning solution in the material transmission pipe (152) forward, so that the cleaning solution in the material transmission pipe (152) is discharged through the outlet connector (110).

4. The fluid material dispensing apparatus (100) of claim 3, wherein the automatic self-cleaning operation further comprises:

controlling the pump (160) to continue to operate, so as to conduct a cleaning procedure to the fluid connector (150), the material transmission pipe (152), and the outlet connector (110) for a predetermined length of time.

5. The fluid material dispensing apparatus (100) of claim 4, wherein the automatic self-cleaning operation further comprises:

after the cleaning procedure is conducted for the predetermined length of time, controlling the pump (160) to continue to operate to cause the cleaning solution in the material transmission pipe (152) to be discharged through the outlet connector (110).

6. The fluid material dispensing apparatus (100) of claim 2, further comprising:

a valve (194), coupled between the target output terminal of the fluid diverter (190) and the detergent transmission pipe (154), and utilized to prevent fluid in the detergent transmission pipe (154) from flowing back into the fluid diverter (190).

7. The fluid material dispensing apparatus (100) of claim 2, wherein the fluid material dispensing apparatus (100) further conducts an automatic self-disinfection operation after the automatic self-cleaning operation is complete;

wherein the automatic self-disinfection operation comprises:

guiding a disinfectant solution to flow into the fluid diverter (190);

activating the pump (160) to push residual cleaning solution in the material transmission pipe (152) forward, so that the residual cleaning solution is discharged through the outlet connector (110); and guiding that the disinfectant solution in the fluid diverter (190) to flow into the fluid connector (150) through the detergent transmission pipe (154), and then flows into the material transmission pipe (152) through the material tube (322) of the fluid connector (150).

8. The fluid material dispensing apparatus (100) of claim 7, wherein the automatic self-disinfection operation further comprises:

controlling the pump (160) to continue to operate for a period of time, so that the residual cleaning solution in the material transmission pipe (152) and a part of the disinfectant solution are discharged through the outlet connector (110).

9. The fluid material dispensing apparatus (100) of claim 8, wherein the automatic self-disinfection operation further comprises:

activating the pump (160) to push the disinfectant solution in the material transmission pipe (152) forward, so that the disinfectant solution in the material transmission pipe (152) is discharged through the outlet connector (110).

10. The fluid material dispensing apparatus (100) of claim 9, wherein the automatic self-disinfection operation further comprises:

controlling the pump (160) to continue to operate, so as to conduct a disinfectant procedure to the fluid connector (150), the material transmission pipe (152), and the outlet connector (110) for a target length of time.

11. The fluid material dispensing apparatus (100) of claim 10, wherein the automatic self-disinfection operation further comprises:

after the disinfectant procedure is conducted for the target length of time, controlling the pump (160) to continue to operate to cause the disinfectant solution in the material transmission pipe (152) to be discharged through the outlet connector (110).

* * * * *